US011703257B2

(12) United States Patent
Liu et al.

(10) Patent No.: US 11,703,257 B2
(45) Date of Patent: Jul. 18, 2023

(54) METHODS FOR TORSIONAL REFRIGERATION BY TWISTED, COILED, AND SUPERCOILED FIBERS AND SYSTEMS THEREOF

(71) Applicant: Board of Regents, The University of Texas System, Austin, TX (US)

(72) Inventors: Zunfeng Liu, Tianjin (CN); Run Wang, Tianjin (CN); Jiuke Mu, Plano, TX (US); Zhong Wang, Dallas, TX (US); Shaoli Fang, Richardson, TX (US); Marcio Dias Lima, Richardson, TX (US); Ali E. Aliev, Plano, TX (US); Na Li, Milwaukee, WI (US); Carter S. Haines, Murphy, TX (US); Ray H. Baughman, Dallas, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 376 days.

(21) Appl. No.: 17/036,018

(22) Filed: Sep. 29, 2020

(65) Prior Publication Data
US 2021/0116152 A1    Apr. 22, 2021

Related U.S. Application Data

(60) Provisional application No. 62/909,018, filed on Oct. 1, 2019.

(51) Int. Cl.
*F25B 23/00* (2006.01)
*D02G 3/44* (2006.01)
(Continued)

(52) U.S. Cl.
CPC ............ *F25B 23/00* (2013.01); *D02G 3/44* (2013.01); *D10B 2401/06* (2013.01);
(Continued)

(58) Field of Classification Search
CPC ....... F25B 23/00; D02G 3/44; D10B 2401/06; F03G 7/0613; F03G 7/0612;
(Continued)

(56) References Cited

U.S. PATENT DOCUMENTS 6,065,934 A * 5/2000 Jacot .................. F03G 7/065
60/527
6,326,707 B1 * 12/2001 Gummin .............. F03G 7/065
310/12.32

(Continued)

OTHER PUBLICATIONS

Androsch, R., et al., "Mesophases in polyethylene, polypropylene, and poly(1-butene)," Polymer 51, 4639-4662 (2010) ("Androsch 2010"). 24 pages.

(Continued)

*Primary Examiner* — Emmanuel E Duke
(74) *Attorney, Agent, or Firm* — Dickinson Wright PLLC; Ross Spencer Garsson

(57) ABSTRACT

Cooling by a twist-untwist process, by a stretch-release process for twisted, coiled, or supercoiled yarns or fibers, and methods and systems thereof. High mechanocaloric cooling results from release of inserted twist or from stretch release for twisted, coiled, or supercoiled fibers, including natural rubber fibers, NiTi wires, and polyethylene fishing line. Twist utilization can increase cooling and cooling efficiencies. A cooler using twist insertion and release can be shorter and smaller in volume than a cooler that requires a large elastomeric elongation. The cooler system can be utilized in mechanochromic textiles and remotely readable tensile and torsional sensors.

20 Claims, 53 Drawing Sheets

(51) Int. Cl.
  *F03G 7/06* (2006.01)
  *H02N 10/00* (2006.01)
(52) U.S. Cl.
  CPC .......... *F03G 7/0612* (2021.08); *F03G 7/0615* (2021.08); *F03G 7/06113* (2021.08); *H02N 10/00* (2013.01); *Y10T 428/2925* (2015.01)
(58) Field of Classification Search
  CPC .......... F03G 7/0615; F03G 7/065; F03G 7/06; H02N 10/00; Y10T 428/2925
  See application file for complete search history.

(56) References Cited

U.S. PATENT DOCUMENTS

| | | | | |
|---|---|---|---|---|
| 8,586,176 | B2* | 11/2013 | Taya | F03G 7/065 428/371 |
| 9,784,249 | B2* | 10/2017 | Li | H02N 11/006 |
| 2007/0119165 | A1* | 5/2007 | Yson | G01K 5/483 60/527 |
| 2019/0376495 | A1* | 12/2019 | Kaneko | H02N 10/00 |

OTHER PUBLICATIONS

Carvalho, A., et al., "Giant room-temperature barocaloric effects in PDMS rubber at low pressures," Eur. Polym. J. 99, 212-221 (2018) ("Carvalhoa 2018"). 2 pages.
Chauhan, A., et al., "A review and analysis of the elasto-caloric effect for solid-state refrigeration devices: Challenges and opportunities," MRS Energy & Sustainability: A Review Journal, 2, E16 (2015) DOI:10.1557/mre.2015.17 ("Chauhan 2015"). 18 pages.
Cong, D., et al., "Colossal elastocaloric effect in ferroelastic Ni—Mn—Ti alloys," Physical Review Letters 122, 255703 (2019) ("Cong 2019"). 7 pages.
Cui, J. et al., "Demonstration of high efficiency elastocaloric cooling with large ΔT using NiTi wires," Appl. Phys. Lett. 101, 073904 (2012) ("Cui 2012"). 5 pages.
Dart, S., et al., "Rise of temperature on fast stretching of synthetics and natural rubbers," Ind. Eng. Chem. 34, 1340-1342 (1942) ("Dart 1942"). 3 pages.
Defay, E., et al., "Enhanced electrocaloric efficiency via energy recovery," Nat. Commun. 9, 1827 (2018) ("Defay 2018"). 9 pages.
Gaur, U., et al., "Heat capacity and other thermodynamic properties of linear macromolecules IV. Polypropylene," J. Phys. Chem. Ref. Data. 10, 1051-1064 (1981) ("Gaur 1981"). 15 pages.
Gottschall, T., et al., "A multicaloric cooling cycle that exploits thermal hysteresis," Nat. Mater. 17, 929-934 (2018) ("Gottschall 2018"). 7 pages.
Gough, J., "A description of a property of caoutchouc or Indian rubber; with some reflections on the cause of the elasticity of this substance," Mem. Lit. Phil. Soc. Manchester 1 (2nd Series), 288, 288-295 (1805) ("Gough 1805"). 6 pages.
Haines, C., et al., "New Twist on Artificial Muscles," Proceedings National Academy of Sciences 113, 11709-11716 (2016) ("Haines 2016"). 10 pages.
Haines, C., et al., "Artificial muscles from fishing line and sewing thread," Science 343, 868-872 (2014) ("Haines 2014"). 112 pages.
Kim, K., et al., "Enhancing the work capacity of electrochemical artificial muscles by coiling plies of twist-released carbon nanotube yarns," ACS Applied Materials & Interfaces 11, 13533-13537 (2019) ("Kim 2019"). 5 pages.
Kim, S., et al., "Harvesting Electrical Energy from Torsional Thermal Actuation Driven by Natural Convection," Scientific Reports, 8(1), 8712, DOI: 10.1038/s41598-018-26983-4 (2018) ("Kim 2018"). 8 pages.
Kim, S. H., et al., "Bio-inspired, Moisture-Powered Hybrid Carbon Nanotube Yarn Muscles," Scientific Reports 6, 23016; DOI: 10.1038/srep23016 (2016) ("Kim 2016"). 8 pages.

Kim, S., et al., "Harvesting temperature fluctuations as electrical energy using torsional and tensile polymer muscles," Energy & Environmental Science 8, 3336-3344 (2015) ("Kim 2015"). 10 pages.
Lee, J., et al., "Electrochemically Powered, Energy-Conserving Carbon Nanotube Artificial Muscles," Advanced Materials 27, 1700870 (2017), DOI: 10.1002/adma.201700870 ("Lee 2017"). 7 pages.
Lee, J., et al., "All Solid State Carbon Nanotube Torsional and Tensile Artificial Muscles," Nano Letters 14, 2664-2669 (2014) ("Lee 2014"). 6 pages.
Li, Y., et al., "Energy-efficient elastocaloric cooling by flexibly and reversibly transferring interface in magnetic shape-memory alloys," ACS Appl. Mater. Inter. 10, 25438-25445 (2018) ("Li 2018"). 8 pages.
Lima, M., et al., "Efficient, Absorption-Powered Artificial Muscles Based on Carbon Nanotube Hybrid Yarns," Small 11, 3113-3118 (2015) ("Lima 2015"). 6 pages.
Lima, M., et al. "Electrically, Chemically, and Photonically Powered Torsional and Tensile Actuation of Hybrid Carbon Nanotube Yarn Muscles," Science 338, 928-932 (2012) ("Lima 2012"). 6 pages.
Liu, Y., et al., "Giant room-temperature elastocaloric effect in ferroelectric ultrathin films," Adv. Mater. 26, 6132-6137 (2014) ("Liu 2014"). 6 pages.
Liu, Z., et al., "Hierarchically buckled sheath-core fibers for superelastic electronics, sensors, and muscles," Science 349, 400-404 (2015) ("Liu 2015"). 6 pages.
Ma, R., et al., "Highly efficient electrocaloric cooling with electrostatic actuation," Science 357, 1130-1134 (2017) ("Ma 2017"). 6 pages.
Mañosa, L., et al., "Materials with giant mechanocaloric effects: cooling by strength," Adv. Mater. 29, 1603607 (2017) ("Mañosa 2017"). 25 pages.
Moya, X., et al., "Caloric materials nearferroic phase transitions," Nat. Mater. 13, 439-450 (2014) ("Moya 2014"). 13 pages.
Mu, J., et al., "Sheath-Run Artificial Muscles," Science, 12, 365(6449), 150-155. doi: 10.1126/science.aaw2403 ("Mu 2019"). 7 pages.
Neese, B., et al., "Large electrocaloric effect in ferroelectric polymers near room temperature," Science 321, 821-823 (2008) ("Neese 2008"). 4 pages.
Olsson, P., et al., "Ab initio investigation of monoclinic phase stability and martensitic transformation in crystalline polyethylene," Phys. Rev. Mater. 2, 075602 (2018) ("Olsson 2018"). 13 pages.
Ossmer, H., et al., "Elastocaloric cooling using shape memory alloy films," J. Phys. Conf. Ser. 476, 012138 (2013) ("Ossmer 2013"). 6 pages.
Pieczyska, E., et al., "Phase-transformation fronts evolution for stress-and strain-controlled tension tests in TiNi shape memory alloy," Exp. Mech. 46, 531-542 (2006) ("Pieczyska 2006"). 12 pages.
Qian, S., et al., "Elastocaloric effect in CuAlZn and CuAlMn shape memory alloys under compression," Phil. Trans. R. Soc. A 374, Mar. 9, 2015 (2016) ("Qian 2016"). 11 pages.
Quarini, J., et al., "Solid state refrigeration: cooling and refrigeration using crystalline phase changes in metal alloys," P. I. Mech. Eng. C-J. Mec. 218, 1175-1179 (2004) ("Quarini 2004"). 5 pages.
Tadokoro, H. "Structure and properties of crystalline polymers," Polymer 25, 147-163 (1984) ("Tadokoro 1984"). 18 pages.
Takeuchi, I., et al., "Solid-state cooling with caloric materials," Phys. Today 68, 48-54 (2015) ("Takeuchi 2015"). 8 pages.
Trček, M., et al., "Electrocaloric and elastocaloric effects in soft materials," Phil. Trans. R. Soc. A 374, Mar. 1, 2015 (2016) ("Trček 2016"). 12 pages.
Tušek, J., et al., "A regenerative elastocaloric heat pump," Nat. Energy 1, 16134 (2016) ("Tušek I 2016"). 7 pages.
Tušek, J., et al., "Elastocaloric effect of a Ni—Ti plate to be applied in a regenerator-based cooling device," Sci. Technol. Built En. 22, 489-499 (2016) ("Tušek II 2016"). 12 pages.
Tušek, J., et al., "Elastocaloric effect of Ni—Ti wire for application in a cooling device," J. Appl. Phys. 117, 124901 (2015) ("Tušek 2015"). 12 pages.

(56) References Cited

OTHER PUBLICATIONS

Xie, Z., et al., "Temperature dependence of the elastocaloric effect in natural rubber," Phys. Lett. A 381, 2112-2116 (2017) ("Xie 2017"). 5 pages.

Yoshida, Y., et al., "Elastocaloric effect in poly(vinylidene fluoride-trifluoroethylenechlorotrifluoroethylene) terpolymer," Appl. Phys. Lett. 108, 242904 (2016) ("Yoshida 2016"). 5 pages.

Young, R., et al., "Twinning and martensitic transformations in oriented high-density polyethylene," Philos. Mag. 29, 1061-1073 (1974) ("Young 1974"). 14 pages.

Zanotti, C., et al., "Thermal diffusivity of Ni—Ti SMAs," J. Alloys Compd. 473, 231-237 (2009) ("Zanotti 2009"). 7 pages.

\* cited by examiner

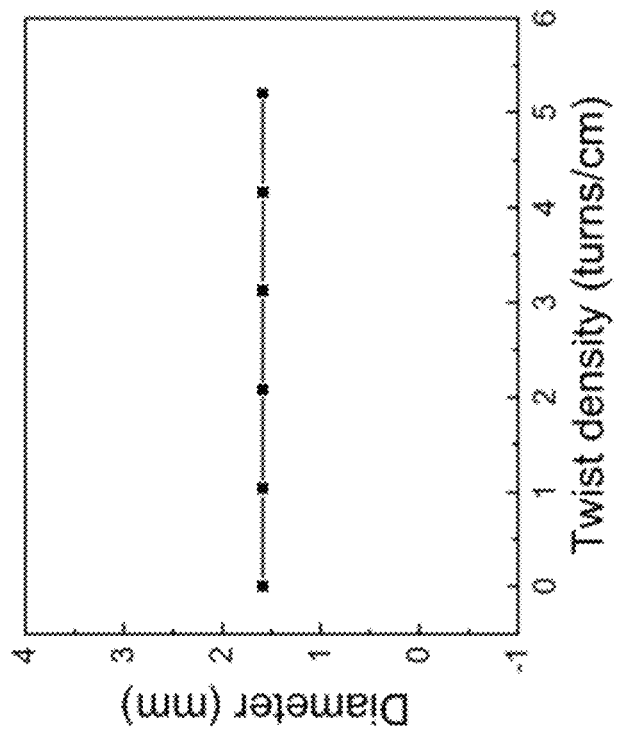
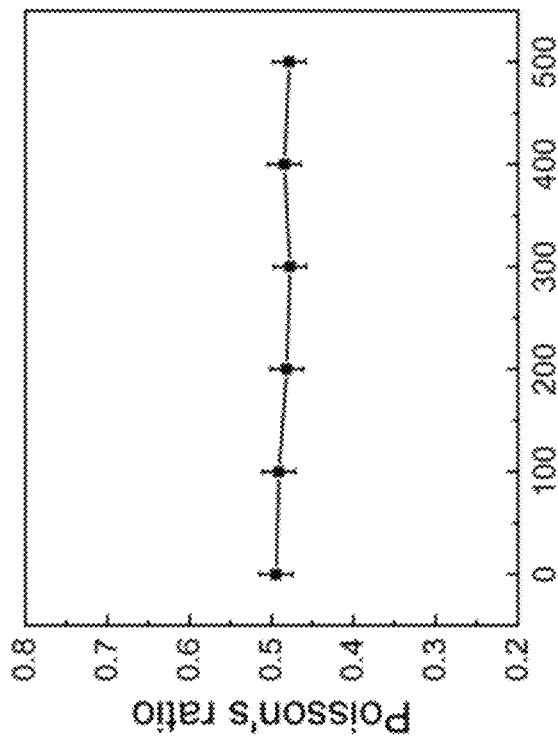
FIG. 1A
FIG. 1B

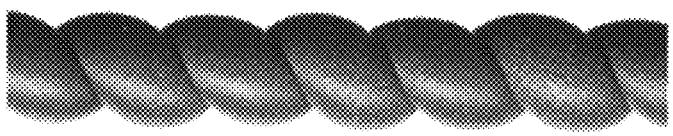
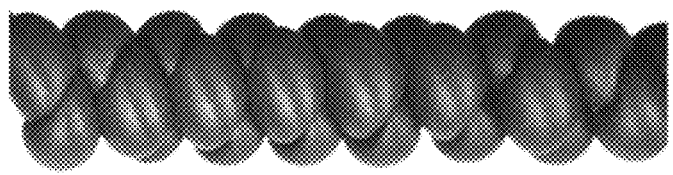
FIG. 2A
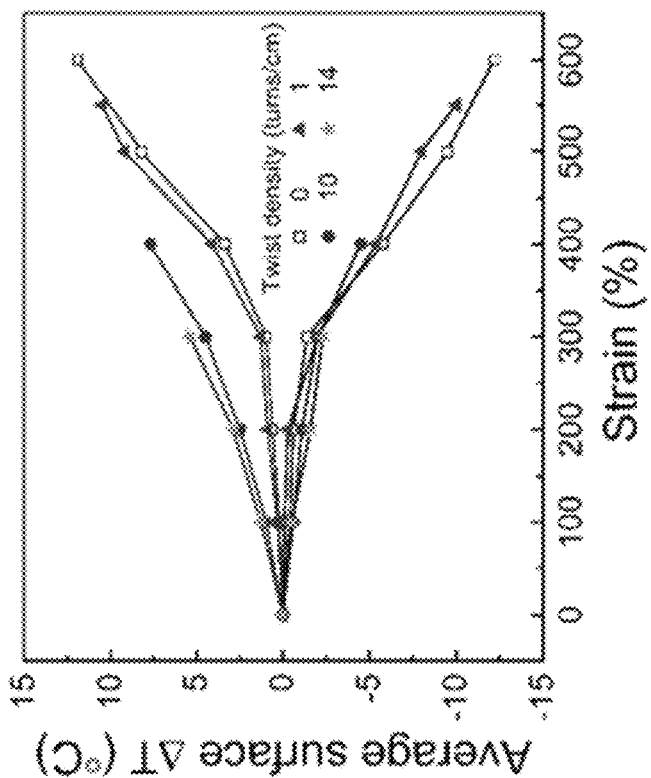
FIG. 2B

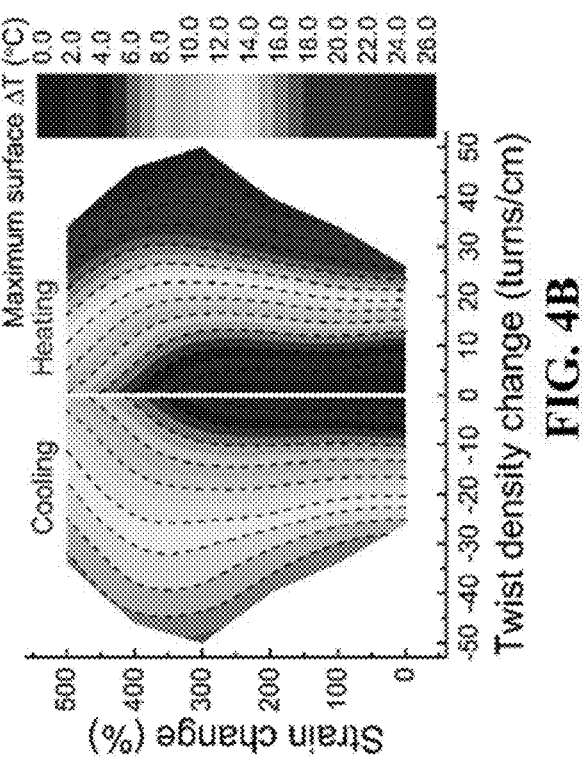
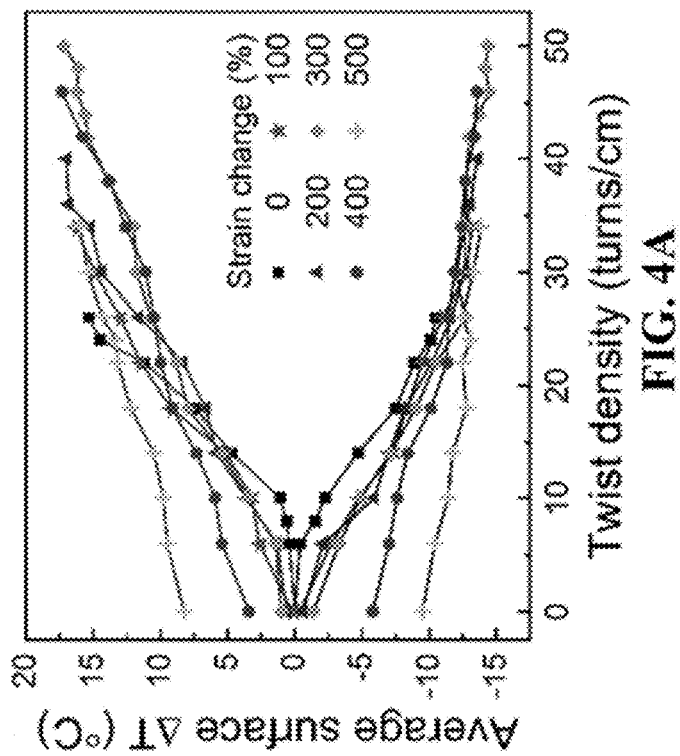
FIG. 4A
FIG. 4B

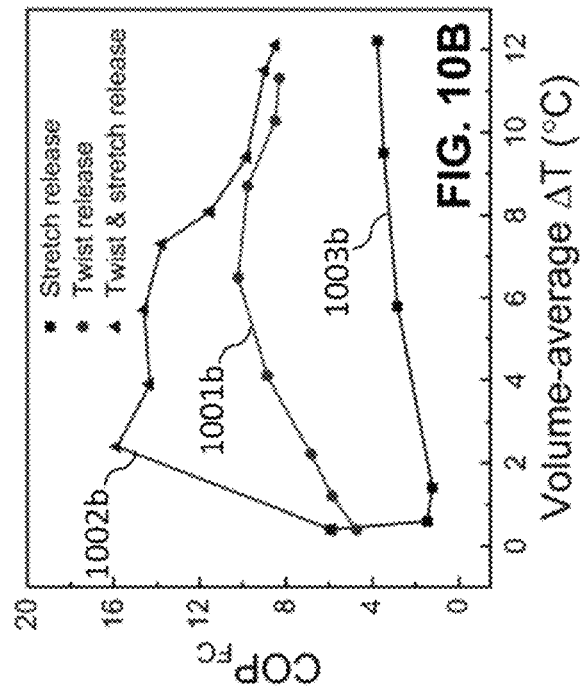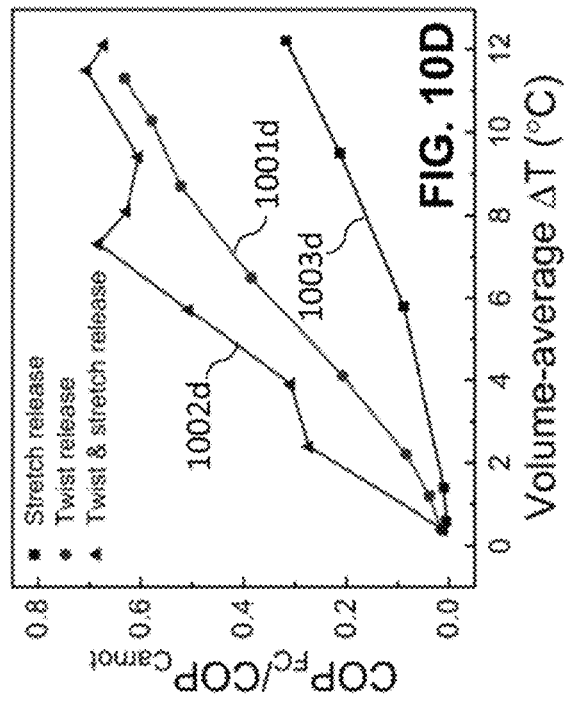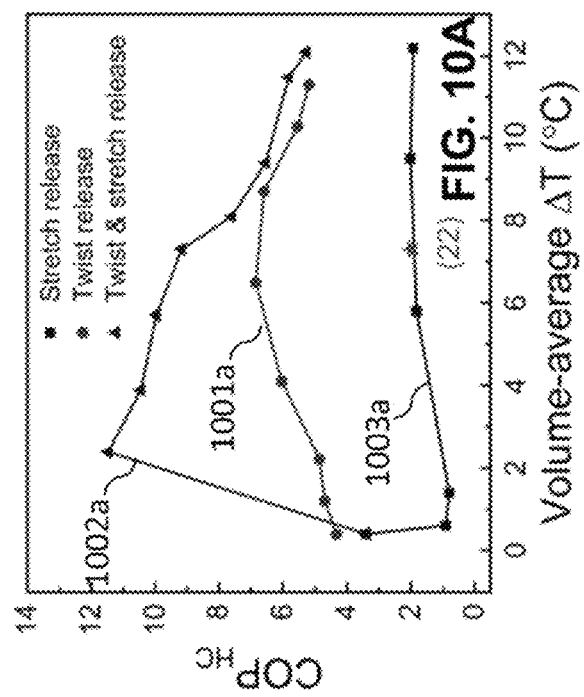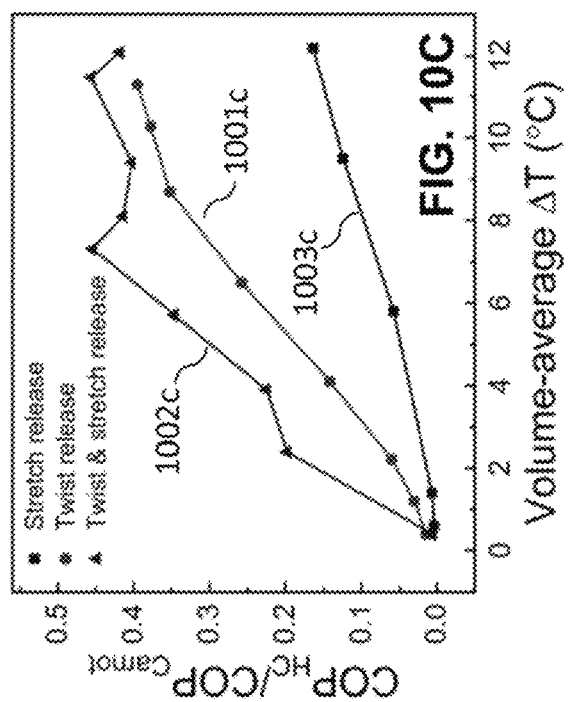

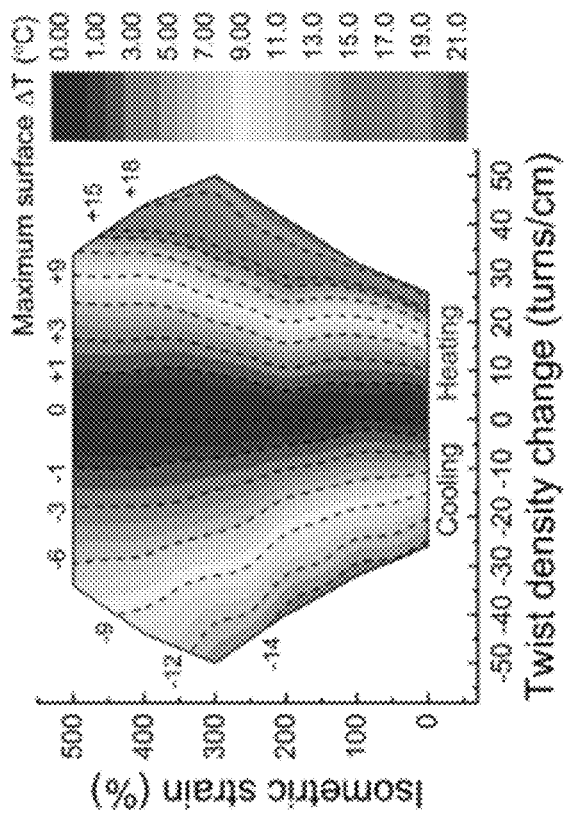
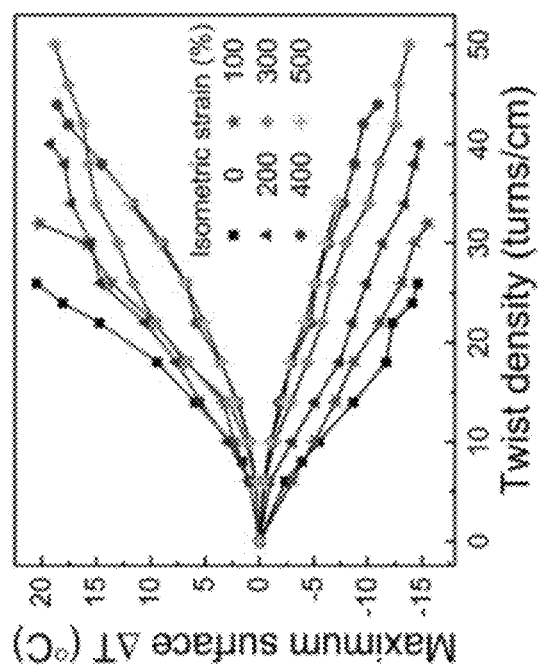
FIG. 11B
FIG. 11A

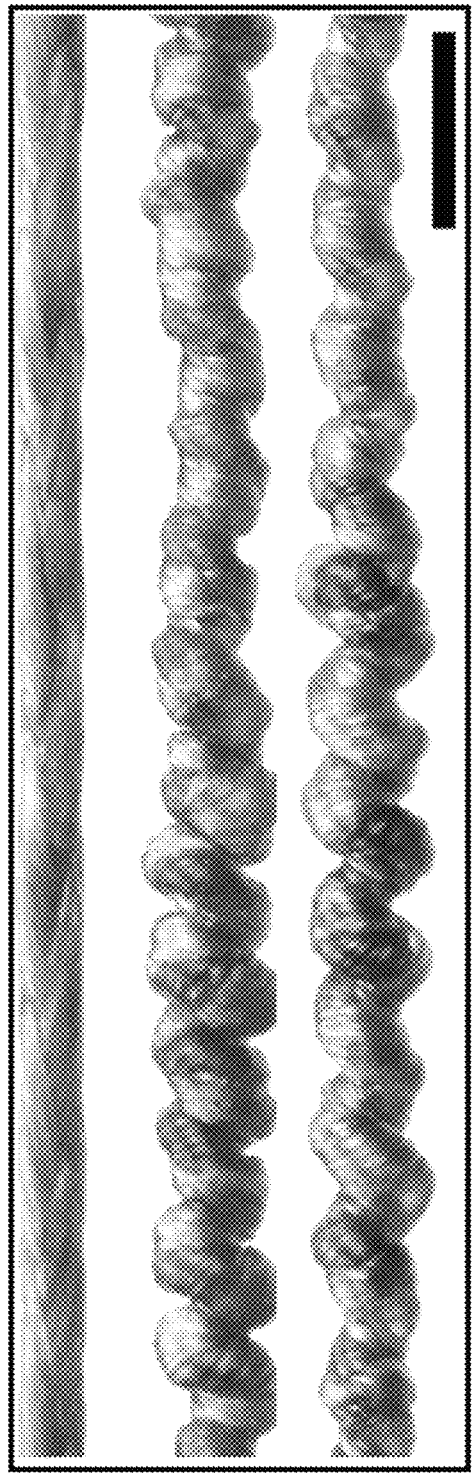
FIG. 12A
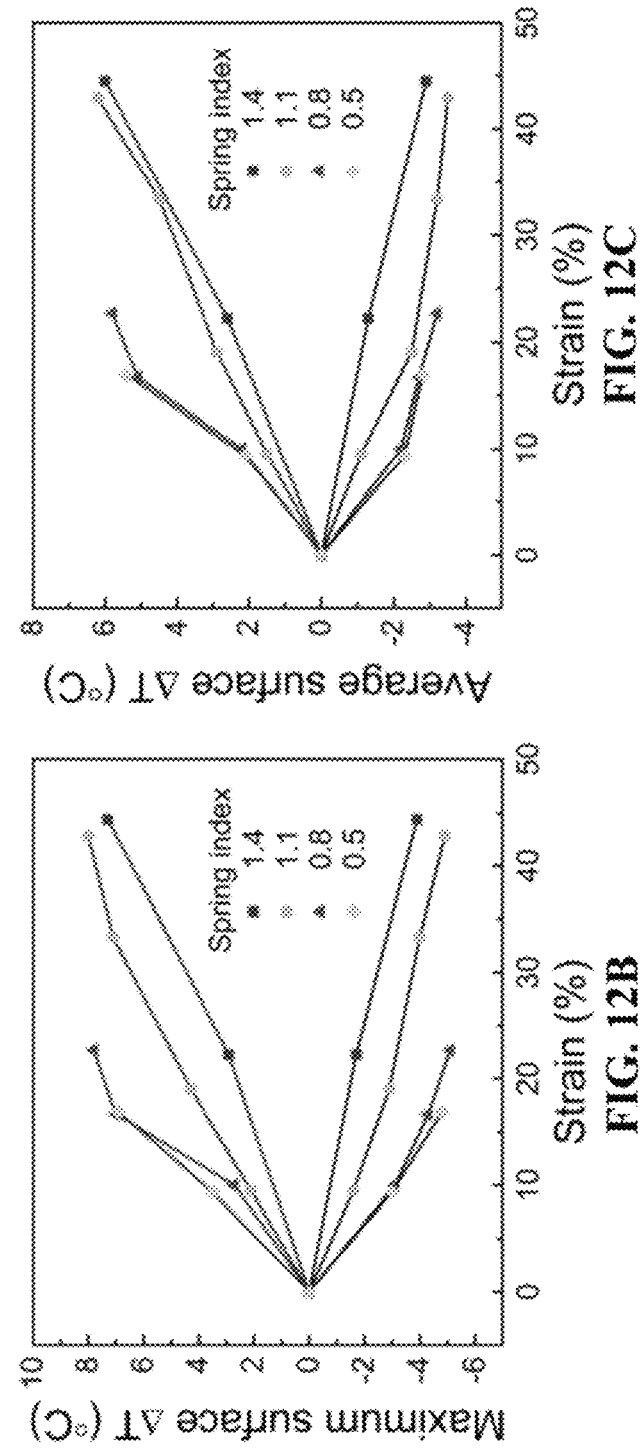
FIG. 12B
FIG. 12C

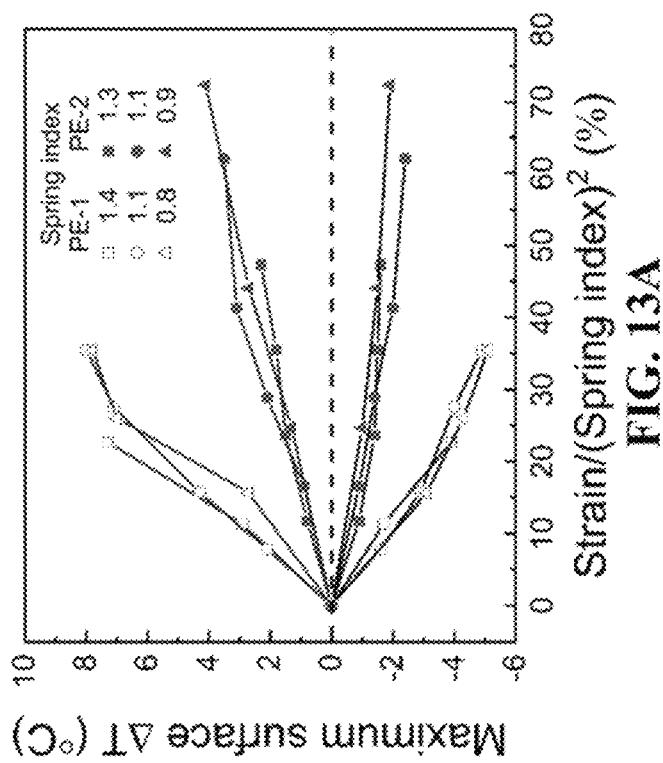
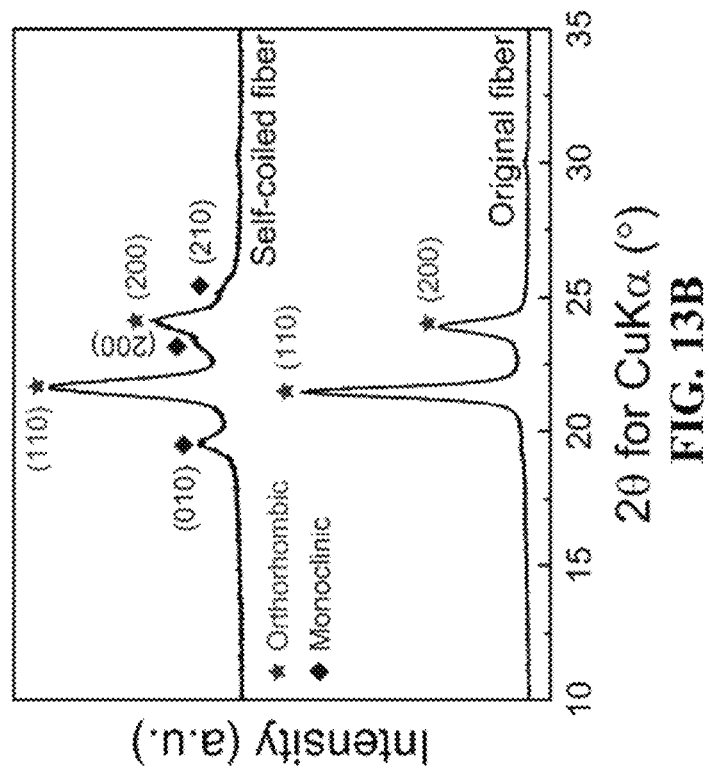
FIG. 13A
FIG. 13B

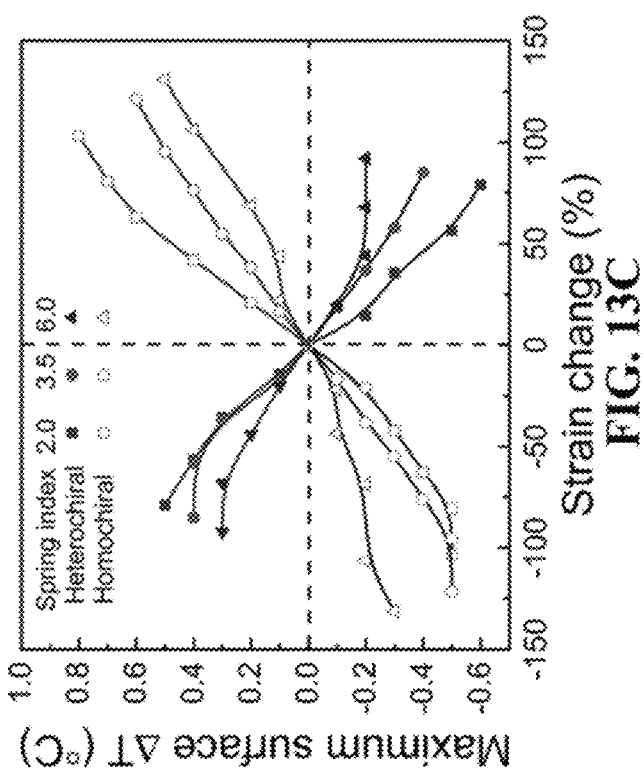
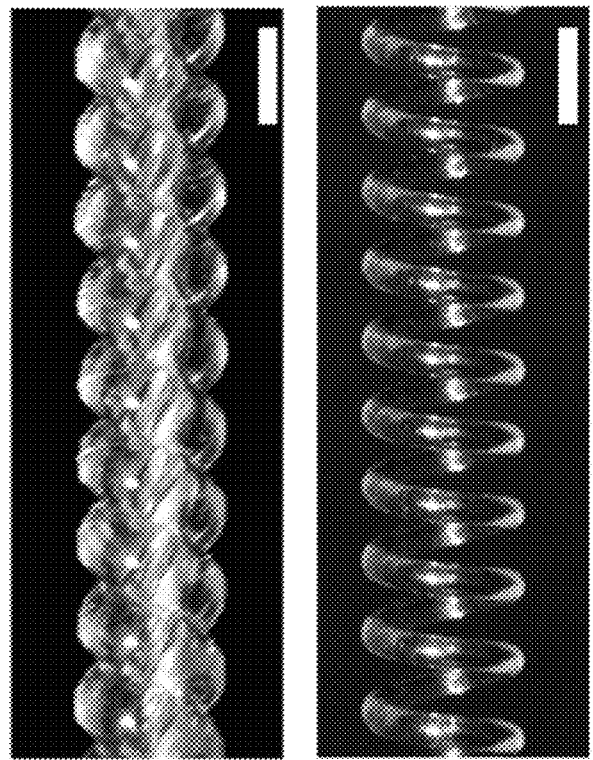
FIG. 13C
FIG. 13D

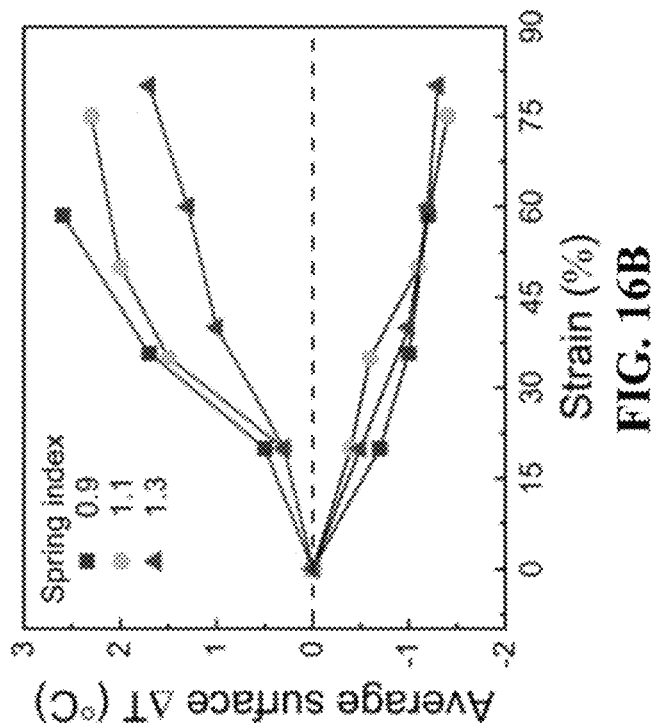
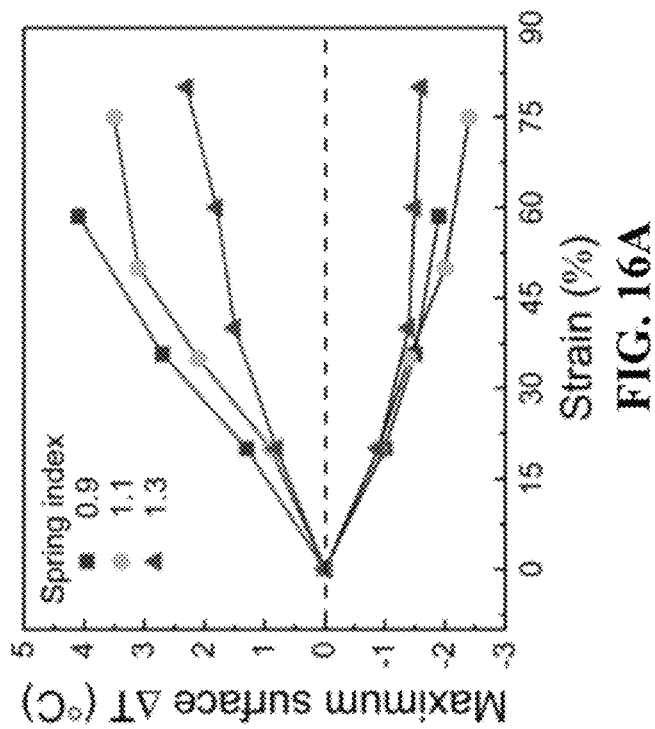
FIG. 16A
FIG. 16B

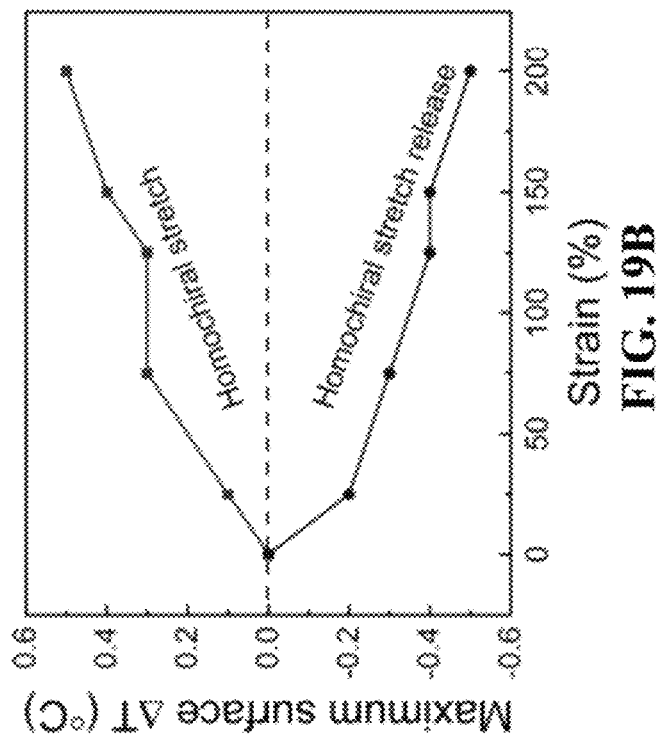
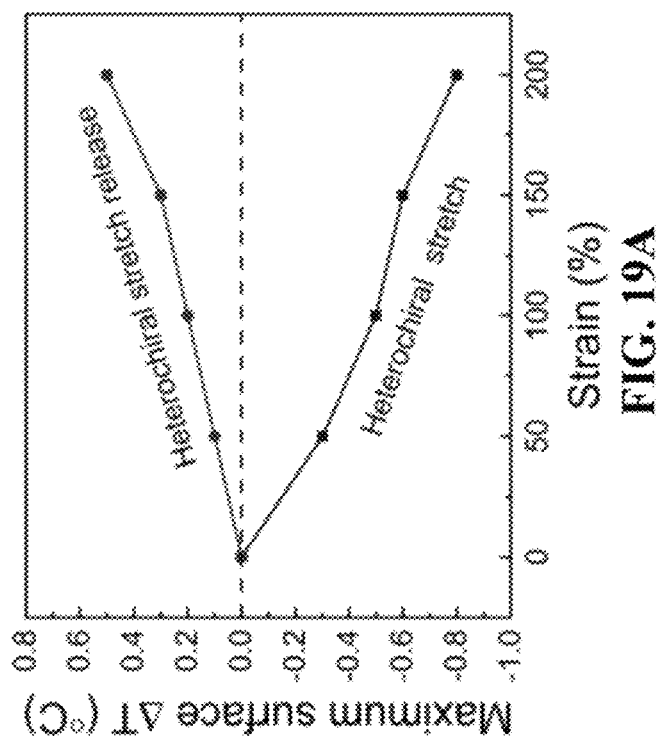
FIG. 19A
FIG. 19B

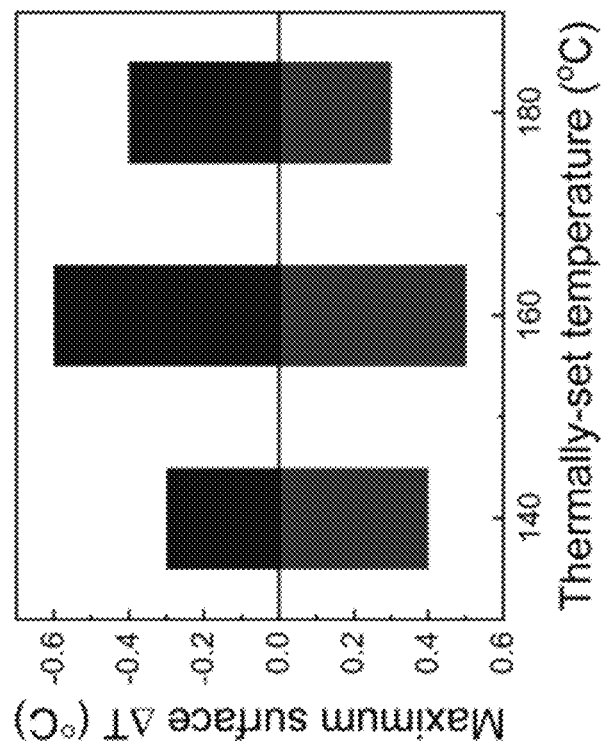
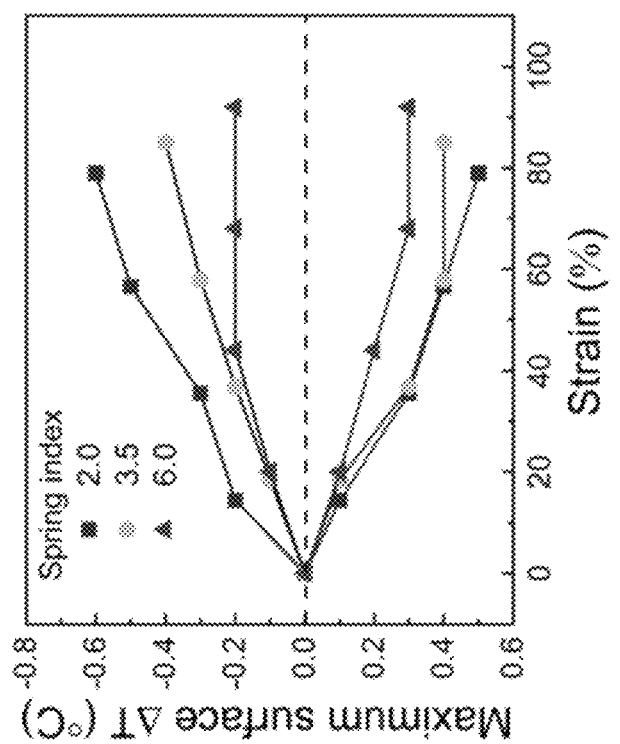
FIG. 22A
FIG. 22B

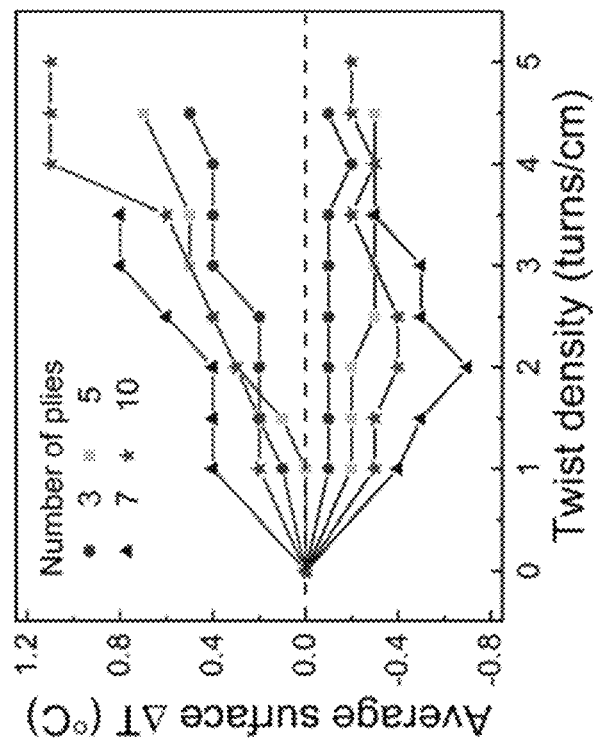
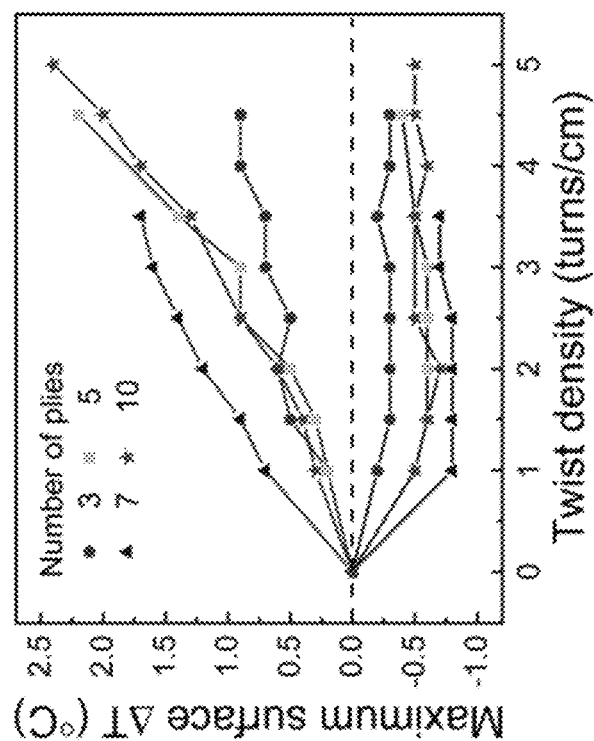
FIG. 24B
FIG. 24A

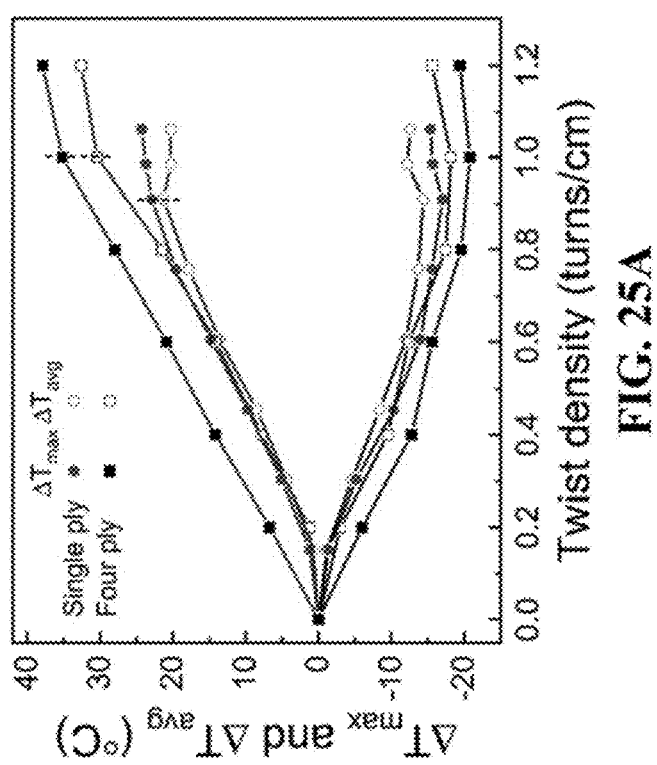
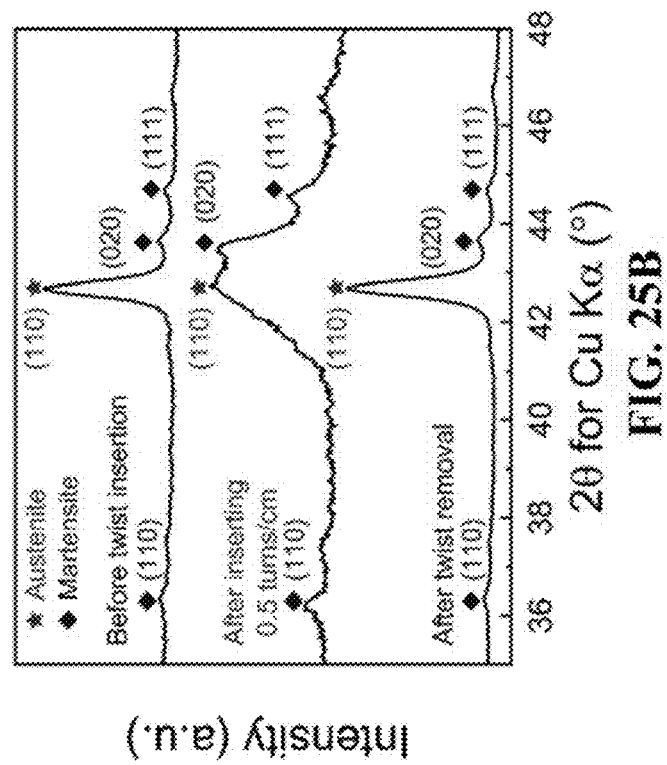
FIG. 25A
FIG. 25B

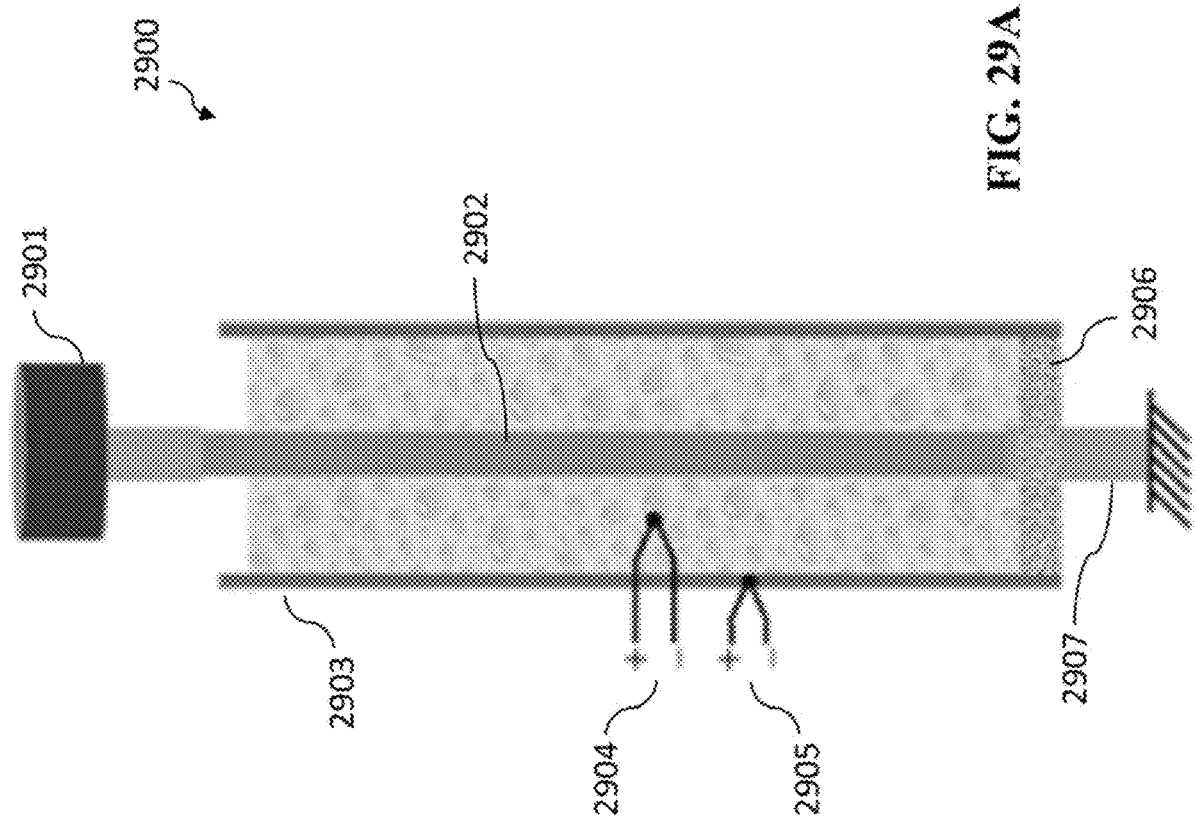

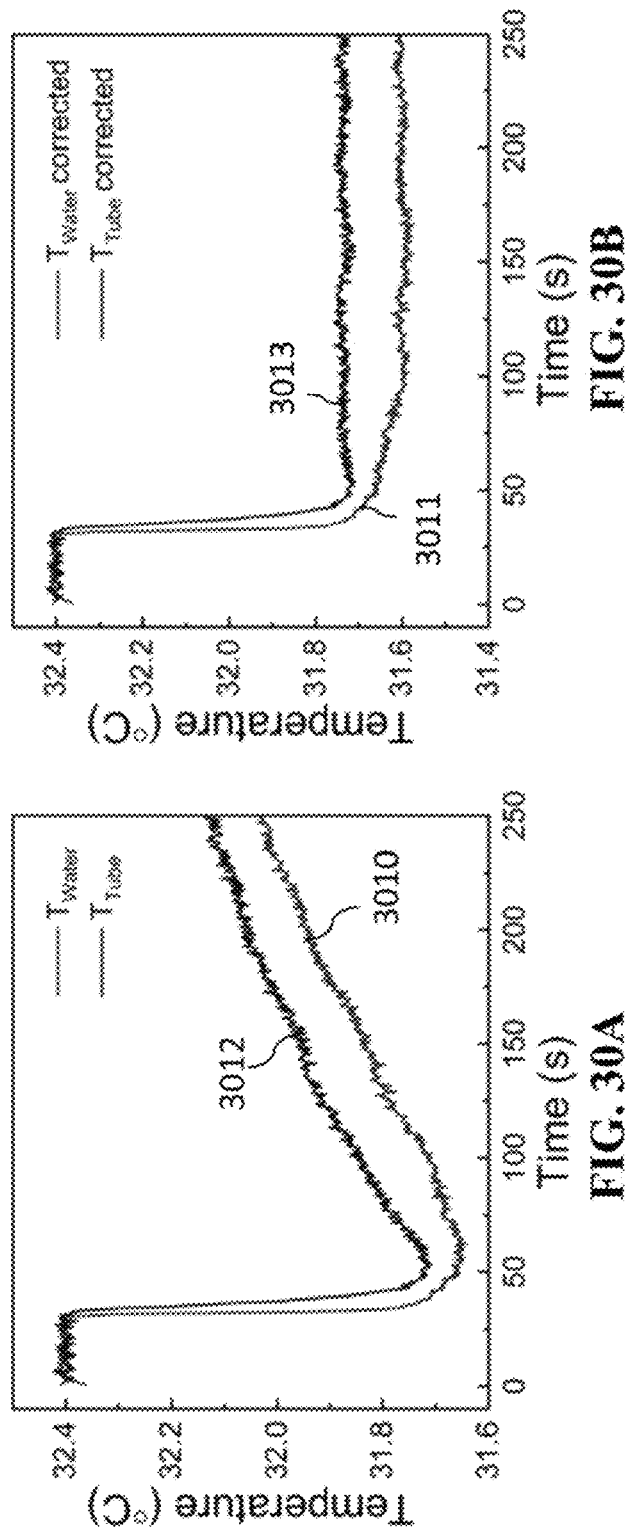

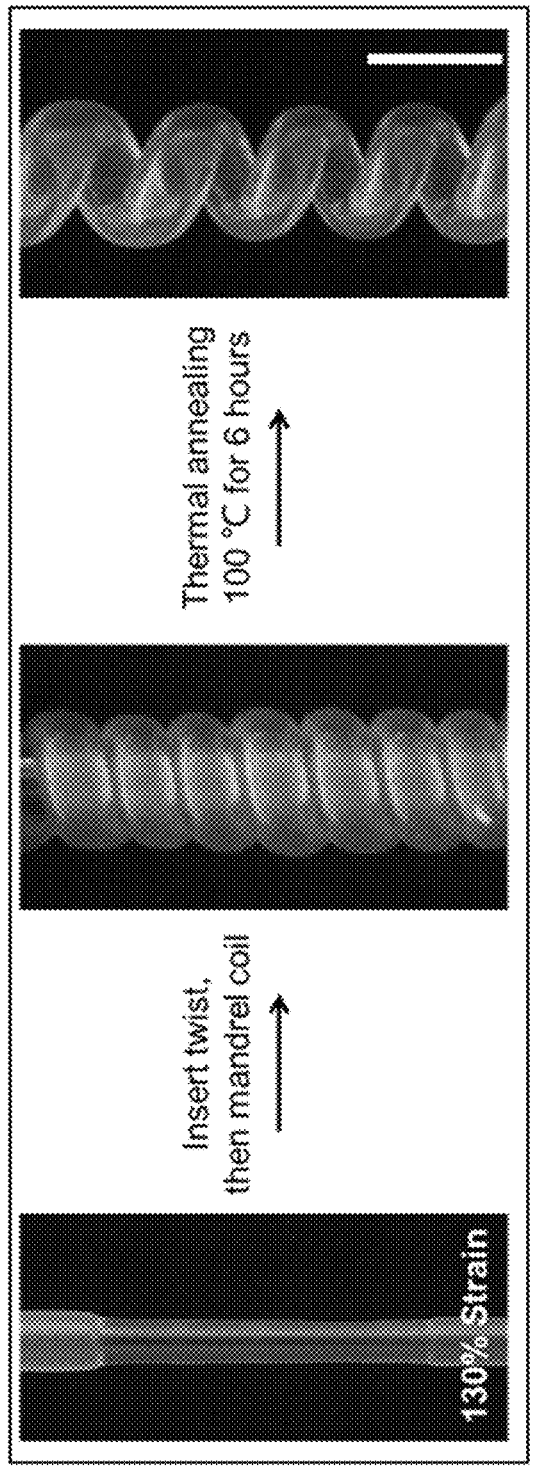
FIG. 35A
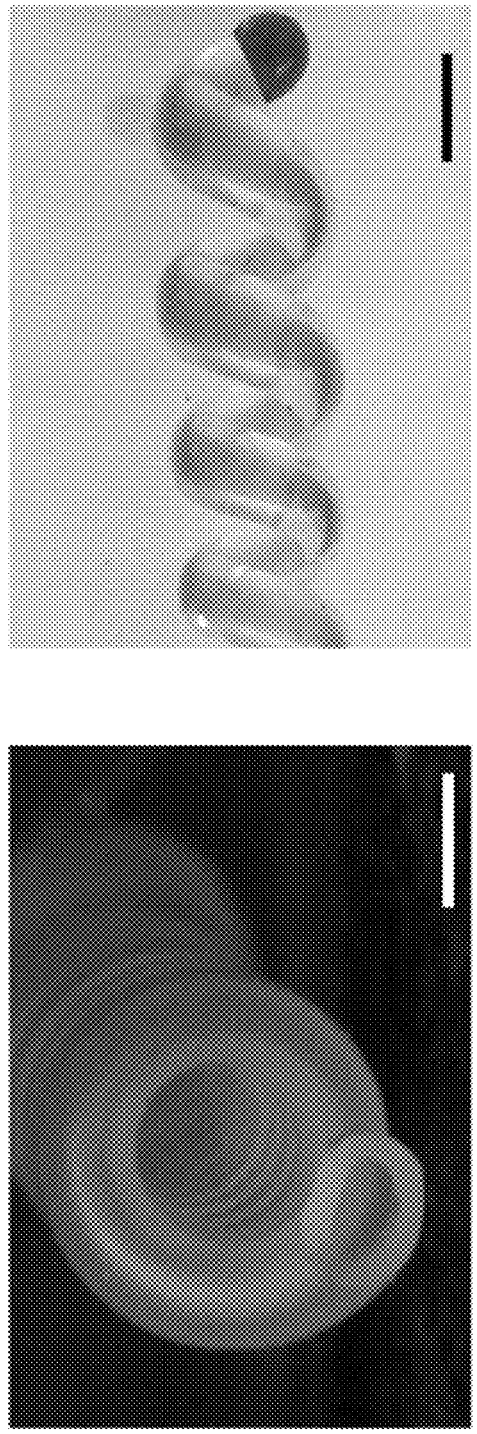
FIG. 35B
FIG. 35C

FIG. 39A  Twist insertion →
FIG. 39B  Equilibration →
FIG. 39C  Twist removal →
FIG. 39D  Equilibration →

METHODS FOR TORSIONAL REFRIGERATION BY TWISTED, COILED, AND SUPERCOILED FIBERS AND SYSTEMS THEREOF

CROSS-REFERENCE TO RELATED PATENTS/PATENT APPLICATIONS

This application claims priority to provisional U.S. Patent Application Ser. No. 62/909,018, filed Oct. 1, 2019, entitled "Methods For Torsional Refrigeration By Twisted, Coiled, And Supercoiled Fibers And Systems Thereof," which provisional patent application is commonly owned by the Applicant of the present invention and is hereby incorporated herein by reference in its entirety for all purposes.

GOVERNMENT INTEREST

This invention was made with government support under Grant No. FA9550-18-1-0510 awarded by the Air Force Office of Scientific Research. The government has certain rights in the invention. This invention was also supported by Grant No. AT-0029 from the Robert A. Welch Foundation.

TECHNICAL FIELD

The present invention relates to mechanocaloric cooling, and methods and systems thereof. More particularly, the present invention relates to cooling by a twist-untwist process; by a stretch-release process for twisted, coiled, or supercoiled yarns or fibers; and methods and systems thereof.

BACKGROUND

Tensile [Gough 1805; Moya 2014; Yoshida 2016; Tušek 2015; Cui 2012; Trček 2016; Tušek I 2016], compressive [Liu 2014; Li 2018; Qian 2016], hydrostatic (barocaloric) [Moya 2014; Yoshida 2016; Takeuchi 2015; Carvalhoa 2018], electrocaloric [Moya 2014; Trček 2016; Ma 2017; Neese 2008; Defay 2018], and magnetocaloric cooling [Moya 2014; Gottschall 2018] have been well explored for diverse materials, including rubbers, non-elastomeric polymers, shape memory alloys, and ceramics. However, cooling by a twist cycle or by a stretch cycle for a twisted fiber or yarn has not been reported. For differentiation from previously known means for mechanocaloric cooling, such means of realizing refrigeration using twist processes is here named twistocaloric cooling.

SUMMARY OF THE INVENTION

The present invention relates to twist-exploiting mechanocaloric cooling by fibers and yarns, which is as an alternative to previously known mechanocaloric cooling methods. First, twist utilization can increase cooling and cooling efficiencies. Second, a cooler using twist insertion and release can be shorter and smaller in volume than a cooler that requires a large elastomeric elongation. Additionally, the fiber shape can enable novel possible applications, like mechanochromic textiles and remotely readable tensile and torsional sensors. The twist insertion and coiling processes used for making these twistocaloric materials are inexpensive, and are similar to those used to convert cheap, high-strength polymers into artificial muscles [Haines 2014].

In general, in one embodiment, the invention features a mechanocaloric cooler that includes a cooling element. The cooling element is selected from a group consisting of (a) a fiber or yarn that is in a highly twisted state, a partially or fully coiled state, or a partially or fully supercoiled state during one part of a cooling cycle and in a substantially reduced twist state or a non-twisted state in another part of the cooling cycle; (b) a fiber or yarn that is in a highly plied state in one part of the cooling cycle and in a largely non-plied state in another part of the cooling cycle, and (c) a fiber or yarn that is in a partially coiled, fully coiled, partially supercoiled, or fully supercoiled state, which either cools when stretched or cools when stretch is released.

Implementations of the invention can include one or more of the following features:

The cooling element can be operable to undergo a transition between crystalline phases when twisted or plied or when stretched when partially coiled, fully coiled, partially supercoiled, or fully supercoiled.

In general, in another embodiment, the invention features a mechanocaloric cooler that includes a cooling element that is selected from a group consisting of a fiber or yarn or an array of fibers, yarns, and combination thereof. The mechanocaloric cooler further includes a rotary actuator. The rotary actuator is operable to change twist of the cooling element. The change in twist can be fiber or yarn twist or the twist of plying fibers, yarns, or combinations of fibers and yarns.

Implementations of the invention can include one or more of the following features:

The rotary actuator can be operable to cause largely isometric twist change.

The cooling element can include a yarn or fiber cooler element that is operable to heat when twist is quasi-isometrically inserted and is operable to cool when twist is quasi-isometrically released.

The cooler element can be operable to cool when fiber or yarn twist is inserted in the cooler element or when the fibers or yarns of the cooler element are twisted together to produce plying.

The mechanocaloric cooler can further include a linear actuator. The linear actuator can be operable to change the length of the cooling element.

The mechanocaloric cooler further including a rotary actuator. The rotary actuator can be operable to provide near isometric release of twist when the cooling element is in a stretched state that has high twist and then is operable to release stretch from the cooling element.

The cooling element can include a fiber or yarn selected from a group consisting of non-elastomeric polymer fibers and yarns, rubber fibers and yarns, and shape memory metal alloy fibers and yarns.

The fiber or yarn can be operable while in a stretched or non-stretched state to be partially coiled, fully coiled, partially supercoiled, or fully supercoiled by solely twist insertion.

The cooling element can include a non-elastomeric polymer or a rubber fiber or yarn that is partially coiled, fully coiled, partially supercoiled, or fully supercoiled.

The cooler element can include a hollow fiber or yarn.

A heat transfer material can be within the hollow fiber. The heat transfer material can be operable to be heated, cooled, or both heated and cooled by a mechanocaloric process of the mechanocaloric cooler.

The mechanocaloric cooler can further include a second heat transfer material positioned on the exterior of the hollow fiber or yarn.

The second heat transfer material can be a fluid.

The hollow fiber can be coiled in at least one state of the cooler element.

The cooler element can be operable for twist induced changes in the external or internal volume to occur. The mechanocaloric cooler can further include a displacement pump that is operable to utilize at least one of the volume changes for pumping a fluid for heat exchange.

The rotary actuator can include an artificial muscle yarn or fiber that is operable to be driven by a driving process selected from a group consisting of electrostatically driven, electrochemically driven, liquid-absorption-driven, vapor-absorption-driven, photothermally driven, electrothermally driven, thermally driven, magnetically driven, and combinations thereof.

The fibers or yarns of the cooling element can include a material selected from a group consisting of shape memory alloys, rubbers, organic polymers, keratin, elastocaloric materials, barocaloric materials, ferroelectric materials, magnetocaloric materials, and combinations thereof.

The cooling element can have one or more propellers along its length. The one or more propellers can be operable to force fluid in one direction during a heating part of the mechanocaloric cycle of the mechanocaloric cooler and in the opposite direction during the cooling part of the mechanocaloric cycle of the mechanocaloric cooler.

In general, in another embodiment, the invention features a mechanocaloric cooler that includes a cooling element selected from a group consisting of (i) a highly twisted, partially coiled or fully coiled, or partially supercoiled or fully supercoiled fiber or yarn, and (ii) an array of fibers, yarns, or their combinations that are plied. The mechanocaloric cooler further includes a tensile actuator. The tensile actuator is operable to change the length of the cooling element.

Implementations of the invention can include one or more of the following features:

The mechanocaloric cooler can further include a torsional actuator. The torsional actuator can be operable to change the fiber or yarn twist or the twist of plying of the cooling element.

The cooling element can be partially coiled or fully coiled, or partially supercoiled or fully supercoiled. The handedness of fiber or yarn twist and any existing coiling can be the same.

The cooling element can be operable to heat in regions that are coiled or supercoiled when stretched while the cooling element is torsionally tethered. The cooling element can be operable to cool in regions that are coiled or supercoiled when stretch is released while the cooling element is torsionally tethered.

The cooling element can be partially coiled or fully coiled or partially supercoiled or fully supercoiled. The handedness of fiber or yarn twist and at least one of the existing coiling can be opposite.

The cooling element can be operable to cool in regions that are coiled or supercoiled when stretched while the cooling element is torsionally tethered. The cooling element can be operable to heat in regions that are coiled or supercoiled when stretch is released while the cooling element is torsionally tethered.

The tensile actuator can include an artificial muscle. The artificial muscle can be operable to be driven by a driving process selected from a group consisting of electrostatically driven, electrochemically driven, liquid-absorption-driven, vapor-absorption-driven, photothermally driven, electrothermally driven, thermally driven, magnetically driven, and combinations thereof.

The fibers or yarns of the cooling element can include a material selected from a group consisting of shape memory alloys, rubbers, organic polymers, keratin, elastocaloric materials, barocaloric materials, ferroelectric materials, magnetocaloric materials, and combinations thereof.

In general, in another embodiment, the invention features a process of twist-exploiting cooling utilizing a cooling element. The process comprises a step selected from the group consisting of:

(a) A cycle of twist insertion and twist removal from the cooling element. The cooling element is selected from a group consisting of a yarn or fiber, an array comprising yarns or fibers, and combinations thereof.

(b) A cycle of stretch and stretch release of the cooling element. The cooling element includes a yarn or fiber that is highly twisted, partially coiled, fully coiled, partially supercoiled, or fully supercoiled.

(c) A cycle of plying and unplying of the cooling element. The cooling element includes fibers, yarns, or mixtures thereof.

(d) A cycle for the cooling element that includes (i) yarn or fiber stretch, (ii) yarn or fiber twist, (iii) yarn or fiber untwist, and (iv) yarn and fiber stretch release.

(e) A cycle for the cooling element that includes (i) stretch of an array comprising fibers, yarns, or mixtures thereof, (ii) twist insertion into the array to produce plying, (iii) twist release to produce unplying, and (iv) stretch release.

(f) Combinations thereof.

Implementations of the invention can include one or more of the following features:

The process can include the cycle of twist insertion and twist removal from the cooling element, in which the twist removal does not release all of the twist from the cooling element.

The process can include the cycle of stretch and stretch release of the cooling element, in which the stretch release does not release all of the stretch from the cooling element.

The process can include the cycle of plying and unplying of the cooling element, in which the unplying does not remove all plying from a cooling element.

The process can include stretch insertion followed sequentially by first twist insertion, second twist release, and third stretch release.

The process can further include either maintaining hydrostatic compression on the cooling element or applying and releasing hydrostatic compression from the cooling element.

The yarn or fiber can be a hollow yarn or fiber. Twist induced changes in external or internal volume can occur for the hollow yarn or fiber. The process can further include using at least one of the volume changes for twist-based pumping a fluid for heat exchange.

In general, in another embodiment, the invention features an article that includes a mechanocaloric cooler. The article is selected from a group consisting of (i) refrigerators, (ii) microfluidic circuits, (iii) thermochromic-coated fibers or textiles that undergo mechanothermochromic color changes when stretched, (iv) infrared emitting structures for attracting or repulsing infrared sensitive marine organisms, (v) infrared-emitting light sources for an insect trap, and (vi) remotely optically readable sensors for torsional strain, tensile strain, environmental conditions, or combinations thereof. The mechanocaloric cooler includes a cooling element selected from a group consisting of (i) Cooling elements including a fiber or yarn that is in a highly twisted state, a partially or fully coiled state, or a partially of fully supercoiled state during one part of a cooling cycle and in a low twisted or non-twist state in another part of the cooling cycle.

(ii) Cooling element including a fiber or yarn array that is in a highly plied state in one part of the cooling cycle and in a largely non-plied state in another part of the cooling cycle.

(iii) Cooling elements that are partially coiled, fully coiled, partially supercoiled, or fully supercoiled, which either cool when stretched or cool when stretch is released.

BRIEF DESCRIPTION OF THE DRAWINGS

FIG. 1A is a graph showing the Poisson's ratio of a 2.2-mm-diameter NR fiber for different applied strains.

FIG. 1B is a graph showing the independence of the diameter of a NR fiber on twist density for a 2.2-mm-diameter NR fiber that was isometrically stretched to 100% strain.

FIGS. 2A-2I show twist-based mechanocaloric structures and mechanocaloric properties for single rubber fibers. FIG. 2A are photographs of twisted, partially coiled, fully coiled, and fully supercoiled NR fibers obtained by isometrically twisting 100%-stretched, 2.5-mm-diameter NR fibers. (The background was digitally removed). FIG. 2B is a graph of surface-average temperature changes versus percent fiber stretch for NR fibers having differing amounts of twist. In the initial non-stretched state, fibers having 1, 10, and 14 turns/cm of twist were highly twisted, fully coiled, and partially supercoiled, respectively. FIG. 2C is a graph of the surface-average temperature changes of a NR fiber during isometric twisting and untwisting at different tensile strains. FIG. 2D is a graph of the surface-average cooling, volume-average cooling, and specific cooling energy as a function of twist density for isometrically untwisting a 2.2-mm-diameter NR fiber at 100% strain. FIG. 2I is the corresponding plot of the surface-average heating and volume-average heating as a function of twist density. FIG. 2E is a graph of surface-average temperature changes on isometric twist insertion and removal as a function of twist density for a NR fiber having 200% tensile strain, where structural transitions during twist insertion and removal are indicated. FIG. 2F is a graph of the comparison of the dependence of twistocaloric temperature changes on applied tensile strain for a heterochiral and homochiral coiled NR fiber. FIGS. 2G-2H are optical and thermal camera photographs showing the periodicities of coiling and the temperature changes for 100% stretch (FIG. 2G) and 100% stretch release (FIG. 2H) for a NR fiber containing 18 turns/cm of twist. In these figures, the optical camera photograph is on the bottom and the thermal camera photograph is on the top. The scale bars for FIGS. 2G-2H are 0.5 mm. FIG. 2I is the corresponding plot to FIG. 2D for of the surface-average heating and volume-average heating as a function of twist density. The NR fiber in FIGS. 2B-2I had a diameter of 2.2 mm before mechanical deformation.

FIGS. 4A-4F show twistocaloric temperature changes produced by combining twist and stretch and by plying NR fibers, and the spatial distribution of temperature changes. FIGS. 4A-4B are graphs showing the average surface temperature changes (FIG. 4A) and maximum surface temperature changes (FIG. 4B) of a NR fiber during the combination of sequential stretch and up-twist and sequential untwist and stretch release from different strains. Here and elsewhere, in each sequential process, the first conducted process is listed first. FIG. 4C is a graph of the $COP_{FC}$ as a function of volume-average cooling for releasing up to 600% strain from a non-twisted fiber, and for releasing only twist and releasing twist and stretch from a fiber at 100% strain. FIG. 4D is a graph of, for plying NR fibers having 100% isometric stretch, the dependence of the maximum (solid symbols) and average (open symbols) surface temperature changes on inserted twist density. FIG. 4E is a graph of the dependence of surface-average temperature changes of FIG. 4D on the product of inserted twist (turns/cm) and the effective fiber diameter ($D_{eff}=n^{0.5} \times D_s$, where n is number of plies and $D_s$ is the diameter of each stretched fiber). The experiments of FIGS. 4A-4E used 2.2-mm-diameter NR fibers. FIG. 4F shows, from left-to-right, photographs of a non-twisted NR fiber having a white line painted along its length; this fiber when highly twisted; this fiber when fully coiled; this coiled fiber after the coil exterior was painted red; this fiber after removal of inserted twist; a thermal image of the fiber immediately after twist removal; and the temperature profile corresponding to this infrared image. Upon isometric release of 12 turns/cm of inserted twist, this initially 3-cm-long, 3-mm-diameter fiber (which was stretched to 100% strain) provided maximum and surface-average temperature changes of −8.5 and −4.3° C., respectively, relative to room temperature (22.4° C.).

FIG. 9A is a graph that shows the applied torque versus twist density during twist insertion (plot 901a) and twist removal (plot 902a) for a 2.2-mm-diameter, 3-cm-long parent NR fiber and a rotational speed of 1.7 turns/s. FIG. 9B is a graph that shows the torque on a 2.2-mm-diameter, 3-cm-long parent NR fiber during isometric twist insertion (plot 901b) and twist removal (plot 902b). The squares 903-905 on plots 901a-901b indicate, respectively, when coiling starts, is completed, and when supercoiling starts during twist insertion. The triangles 906-907 during untwist on plots 902a-90b indicate, respectively, when supercoiling is completely removed and when coiling is completely removed. The rotational speed for twist insertion and twist removal (50 turns/s) was 30-times that used in FIG. 9A. Integration of the applied force corresponding to the applied torque over the twist angle range for twist insertion and twist removal provided the input mechanical energy and the recovered mechanical energy, respectively. Unlike the results in FIG. 9A, where twist insertion was immediately followed by twist release, the NR fiber in FIG. 9B was allowed to equilibrate for 3.8 minutes before fiber untwist.

FIGS. 10A-10D are graphs showing 2.2-mm-diameter NR fibers, (FIG. 10A) the $COP_{HC}$, (FIG. 10B) the $COP_{FC}$, (FIG. 10C) the $COP_{HC}/COP_{Carnot}$, and (FIG. 10D) the $COP_{FC}/COP_{Carnot}$, as a function of the volume-average cooling for, respectively, twist release (plots 1001a-1001d), the combination of twist and stretch release (plots 1002a-1002d) for 100% strain, and for release of up to 600% strain for a non-twisted fiber (plots 1003a-1003d). The pink asterisk in (A) is the $COP_{HC}$ for a previously reported non-twisted NR fiber [Xie 2017] that has undergone release of 600% tensile strain.

FIG. 11A is a graph showing the maximum surface temperature change of a 2-mm-diameter NR fiber during isometric twisting and untwisting at different tensile strains.

FIG. 11B is a contour plot showing maximum surface temperature changes (contour lines and colors) as a function of twist density and strain for a 2.2-mm-diameter NR fiber during isometric twist insertion and twist removal at different strains.

FIG. 12A is photographs of a 0.41-mm-diameter, high-strength, multi-filament polyethylene fishing line before twist insertion (top), after self-coiling (middle), and after stretching the coil by 20% (bottom). The scale bar is 1.0 mm. The fishing line was dyed green by the manufacturer in order to make it less visible to fish.

FIGS. 12B-12C are graphs showing the dependences of (FIG. 12B) maximum surface twistocaloric temperature changes and (FIG. 12C) average surface twistocaloric temperature changes on applied tensile strain for self-coiled, high-strength polyethylene yarn having different spring indices for an ambient temperature of 25° C.

FIGS. 13A-13D show twistocaloric temperature changes for coiled polyethylene and nylon 6 fibers. FIG. 13A is a graph of the dependence of the maximum twistocaloric temperature changes on the ratio of tensile strain and the square of spring index, for high-strength (PE-1) and low-strength (PE-2) polyethylene fibers. FIG. 13B is a graph of the intensity of diffraction peaks versus Bragg 2θ angle for non-twisted and self-coiled PE-1 fibers. FIG. 13C is a graph of the comparison of the strain dependencies of twistocaloric temperature changes for homochiral (open symbol) and heterochiral (solid symbol) coiled nylon 6 fibers having different spring indices. FIG. 13D are optical images of a self-coiled 0.6-mm-diameter nylon 6 fiber (top) and a 3.6-mm-diameter coil formed by highly twisting a 0.6-mm-diameter nylon 6 fiber, coiling it around a 3-mm-diameter mandrel, and thermally annealing the structure at 180° C. for 1 h (bottom). The scale bars for FIG. 13D are 1.0 mm (top) and 2.0 mm (bottom).

FIGS. 16A-16B show twistocaloric temperature changes on stretch and stretch release for self-coiled, low-strength, low-modulus polyethylene fibers. The dependences of maximum (FIG. 16A) and average (FIG. 16B) surface temperature changes on stretch and stretch release for self-coiled polyethylene monofilament fiber having different spring indices. The diameter of the polyethylene fiber before twist or stretch was 0.40 mm.

FIGS. 19A-19B are graphs showing the comparison of the dependence of maximum twistocaloric surface temperature changes on the applied tensile strain for (FIG. 19A) a heterochiral and (FIG. 19B) a homochiral supercoiled NR fiber.

FIGS. 22A-22B show twistocaloric temperature changes during stretch and stretch release of a heterochiral coiled nylon 6 monofilament fishing line. FIG. 22A is a graph showing comparison of the dependence of twistocaloric temperature changes on the applied tensile strain for a thermally set (160° C. for 1 hour under vacuum) heterochiral coiled nylon 6 fishing line having different spring indices. FIG. 22B shows the dependence of twistocaloric temperature changes on thermal setting temperature during a one hour anneal in vacuum for a heterochiral coiled nylon 6 fishing line having a spring index of 2.0. The nylon 6 monofilament fishing line had an initial diameter of 0.40 mm and an initial length of 40 cm.

FIG. 23A is a graph showing comparison of the dependence of twistocaloric temperature changes on applied tensile strain for heterochiral coiled PE fibers having different spring indices that were thermally set for one hour at 100° C. FIG. 23B shows the dependence of twistocaloric temperature changes on thermal setting temperature during a one hour anneal for a heterochiral, coiled PE fiber having a spring index of 2.0.

FIGS. 24A-24B graphs showing twistocaloric maximum (FIG. 24A) and average (FIG. 24B) surface temperature changes by plying and unplying multiple horsetail hairs. Horsetail fibers with diameter of ~0.16 mm were obtained from Good Sound instrument Co., Ltd.

FIGS. 25A-25D show twistocaloric temperature and structure changes for twisted NiTi wires. FIG. 25A is a graph of the maximum (filled symbols) and average (open symbols) surface temperature changes on quasi-isometric plying and unplying as a function of twist density for a single NiTi wire and for four-plied NiTi wires. Plying occurs isometrically until the twist densities indicated by the dashed lines, where buckling occurs. FIG. 25B is a graph of crystal structure changes of a NiTi wire, from XRD analysis before twist insertion, after twist insertion, and after twist removal. FIG. 25C is a graph of surface-average cooling, volume-average cooling, and specific cooling energy (plots 2501-2503, respectively) as a function of twist density for isometrically untwisting a 0.7-mm-diameter NiTi wire at 0% quasi-isometric strain. FIG. 25D are optical photographs showing the surface color changes of a single NiTi wire coated with a thermochromic dye during quasi-isometric twist insertion and removal.

FIG. 29A is a schematic illustration of the apparatus for measuring specific cooling energy for a NR fiber as a function of twist density during isometric twist removal by cooling of water.

FIG. 30A is a graph showing the time dependences of temperatures of the water and the outer surface of the PP tube during isometric removal of 0.7 turns/cm of twist from a 0.7-mm-diameter non-stretched NiTi wire, using an apparatus nearly identical to that shown in FIG. 29A (with plots 3010 and 3012 corresponding to $T_{water}$, and $T_{tube}$, respectively).

FIG. 30B is a graph showing the time dependencies of FIG. 30A after correction for thermal losses due to heat exchange with the environment (with plots 3011 and 3013 corresponding to $T_{water}$ (corrected) and $T_{tube}$ (corrected), respectively).

FIGS. 35A-35C show structures of the hollow nylon 6 pressure line fiber at different stages in the fabrication of a twistocaloric cooler. FIG. 35A is photographs showing the hollow fiber after stretch, after mandrel coiling, and in the stretched state (70% strain) after thermal annealing to set the structure. FIG. 35B is a photograph showing the interior of the coiled cooler as well as the retention of void space within the fiber's interior. FIG. 35C is a photograph showing the coiled cooler when filled with blue ink. The scale bars for FIGS. 35A-35C are 4.0, 2.0, and 2.0 mm, respectively.

FIGS. 39A-39E are optical photographs showing the surface color changes during isometric twist insertion and twist removal for a 7.0-mm-diameter NR fiber that was stretched to 200% strain and coated with thermochromic dyes. A 200% stretched NR fiber which is (FIG. 39A) non-twisted and at room temperature, (FIG. 39B) heated by twist insertion to a fully coiled state, (FIG. 39C) cooled by equilibration to room temperature in the fully coiled state, (FIG. 39D) cooled by twist removal to produce the non-twisted state, and (FIG. 39E) equilibrated to room temperature in the non-twisted state.

DETAILED DESCRIPTION

Figure 2D:
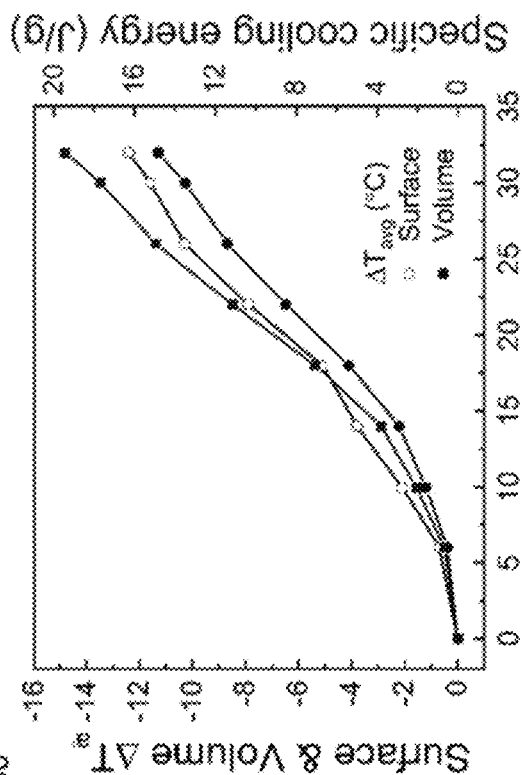

While mechanocaloric cooling by stretch release is centuries old, cooling by a twist cycle or by a stretch cycle for a twist-containing fiber or yarn has not been reported. We show that high mechanocaloric cooling results from release of inserted twist or from stretch release for twisted, coiled, or supercoiled fibers, including natural rubber fibers, NiTi wires, and polyethylene fishing line. The maximum cooling during stretch release from a coiled polyethylene fiber is over 50 times that for a non-twisted polyethylene fiber. By using opposite chiralities of twist and coiling, fibers result that cool when stretched. A twist-based device for cooling flowing water is demonstrated, as are high material cooling energies and efficiencies. The observed spatial periodicity of surface temperature changes of coiled fibers is an asset for remotely readable tensile and torsional strain sensors, and for color-changing fibers for fabrics that dynamically respond to body movement. The described twist-based cooling can be used for both small-scale and large-scale refrigerators that are both shorter and lower in volume than prior-art elastocaloric refrigerators.

These advances add twist-exploiting cooling to previously known tensile, compressive, and barocaloric processes for realizing high mechanocaloric cooling. Twist removal from fiber or fiber plies resulted in high cooling for materials as different as natural rubber and a NiTi shape memory alloy. The combined release of both fiber twist and stretch greatly enhanced cooling for NR fibers, and reduced the maximum cooler length and volume needed to realize cooling. For partially supercoiled NR fibers, which provided the highest cooling upon during twist release, the measured volume-average cooling reached 77% of the surface-average cooling. Hence, at high cooling levels, there is little reduction of cooling energy due to non-uniform temperature distribution after twist release. For the highest obtained volume-average cooling, the full-cycle material efficiency for combined twist-based and stretch-based cooling was 0.67 for −12.1° C. cooling, which is about twice that for stretch-based cooling using these fibers (0.32 for −12.2° C. cooling). Moreover, this higher material efficiency for a twist-based cooling than for a stretch-based cooling results for a twist-based cooler that is $2/3^{th}$ the length of a solely stretch-based cooler. A NiTi-based twist fridge was demonstrated for cooling a flowing stream of water by up to −4.7° C. in one cycle, which provided a high device cooling energy of 6.75 J/g, which is little reduced from the materials cooling energy of the NiTi.

Stretch release from a coiled polyethylene fishing line resulted in higher mechanocaloric surface cooling than previously reported for non-elastomeric polymers, and 50 times higher cooling than the upper bound for stretched, non-twisted polyethylene. The relative chirality of twist directions in fiber and coil was used in an unprecedented way to obtain either heating or cooling during stretch for both elastomeric and non-elastomeric polymer fibers. The spatial periodicity of surface temperature changes of coiled fibers is an asset for remotely readable tensile and torsional strain sensors, and for color-changing fibers for fabrics that dynamically respond to body movement.

Twist-Based Cooling Using Single Natural Rubber Fibers

Twistocaloric cooling will be first described for vulcanized natural rubber (NR) fibers, purchased from Tianjin Zhixin Rubber Products Co., Ltd. The used solid NR fibers had diameters of between 2.0 and 7.0 mm, and provided essentially identical stress-strain curves. According to this supplier, these vulcanized rubbers were made by curing the following relative gravimetric chemical amounts at 160° C. for 30 minutes: natural rubber (100); stearic acid (2); zinc oxide (5); an antioxidant, N-(1,3-dimethylbutyl)-N'-phenyl-p-phenylenediamine (1); sulfur (1.2); and an accelerator, N-cyclohexyl-2-benzothiazole sulfonamide (1.2). Although the black colored fibers contained about 2 wt % carbon black, no significant effect of this additive on mechanocaloric performance was observed. In order to ensure highly reversible elasticity to high strains, the commercially purchased NR fibers were trained at the beginning of experiments by ~10 cyclic deformations to 600% strain.

Twistocaloric coolers were made by inserting twist either isobarically (meaning under constant load) or isometrically (meaning at constant length). An eighty-step servo motor (#80AEA07530-SC3, Huatian Technology Co., Ltd.) was used for twist insertion, since it provided reliable output of the degree of twist insertion. During isobaric twist insertion, the fiber was vertically suspended with a twist-inserting motor providing the top support, with a weight attached to its bottom end, and a bar at fiber bottom contacting pins to prevent end rotation. The Poisson's ratio of this rubber was close to 0.5 and the fiber diameter was essentially independent of the inserted twist. See FIGS. 1A-1B. The results shown in FIGS. 1A-1B imply that negligible volume change occurs during stretching or isometric twist insertion.

Twist was inserted isometrically or isobarically until a desired twisted state was obtained, which was one where the fiber was either below the twist level needed to produce coiling, at a twist level that produced partial or complete coiling, or at the very high twist level that caused coils to coil upon themselves to produce supercoiled fibers. Some of these configurations were not obtainable for all fiber types due to fiber rupture at a high twist level. Unless otherwise indicated, twist density was normalized with respect to the length of the non-twisted, non-stretched fiber. The length of the used mechanocaloric fibers before stretch or twist was inserted was typically ~3 cm. Unless otherwise indicated, the rate of twist insertion and twist removal was 50 turns/s, and the rate of stretch and stretch release was 42 cm/s.

When starting from the same diameter precursor fiber, inserting a given amount of twist produced either a twisted fiber, a partially coiled fiber, a fully coiled fiber, or a partially supercoiled fiber depending upon whether the applied load was low or high. Use of a high load stabilized the non-coiled state or partially coiled state. Reducing the applied load on a fiber after twist insertion could transform a twisted fiber to a partially or fully coiled fiber. Similarly, increasing the applied load on a partially or fully supercoiled fiber could result in a coiled fiber.

Due to damage at high twist and tensile strain levels, the variety of structures obtainable by twist insertion decreased with increasing isometric strain or isobaric stress. Twisting under a constant load, which was low, but sufficient to prevent snarling, resulted in coil nucleation, coil propagation along the fiber's length, decreasing separation between coils, and nucleation of supercoils. See FIG. 2A, from left to right. When isometrically twisted at 100% strain, a 2.5-mm-diameter NR fiber began coiling at 6 turns/cm, completed coiling at 14 turns/cm, and began supercoiling at 18 turns/cm. At this tensile strain, supercoiling resulted over only about one-half of the fiber length before fracture occurred. For isometric strains of 250%, 300%, and 450%, fracture occurred before initiation of supercoiling, before completion of coiling, and before initiation of coiling, respectively.

Surface temperature measurements used a thermal camera (FLIR T440), unless otherwise noted. The accuracy of these optical measurements was confirmed by their agreement with thermocouple-based temperature measurements on fibers having different twisted states in a temperature-controlled oven. For reasons described below, twistocaloric surface temperature changes occurred inhomogeneously for coiled and supercoiled fibers. Hence, both maximum ($\Delta T_{max}$) and average ($\Delta T_{avg}$) changes in surface temperatures were reported. Additionally, volume-average temperature changes were experimentally derived.

The temperature swing on stretch and stretch release (between average heating and average cooling temperatures) can be important for possible use for remotely optically readable strain sensors or mechanothermochromic fibers. For a modest 300% strain, this swing in surface-average temperature was 3.3, 6.5, and 7.7° C. for highly twisted, coiled, and partially supercoiled fibers, respectively, as compared to 2.4° C. for a non-twisted fiber. See FIG. 2B. The maximum surface temperature swing (FIG. 3B) for this applied strain was 5.4, 10.5, and 12.9° C. for the highly twisted, coiled, and partially supercoiled fibers, which was up to 5.4 times that for the non-twisted NR fiber that was cooled solely by stretch release.

When released from strains of 300% and below, the surface-average cooling for fully coiled and supercoiled fibers was higher than for non-twisted fiber. See FIG. 2B. However, the cooling was small until the released strain exceeded 300%, whereupon a non-twisted NR fiber provided the highest cooling. Hence, these twisted NR fibers are not preferred for refrigerators that solely use large-magnitude stretch and release.

Figure 2C:
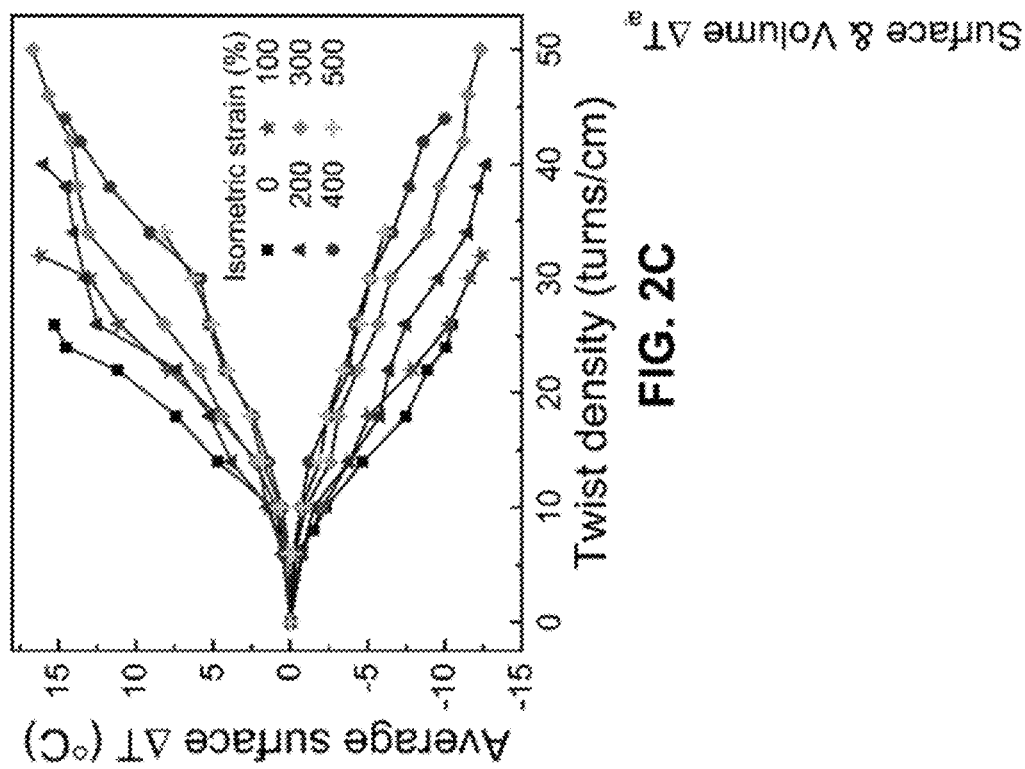
Figure 2F:
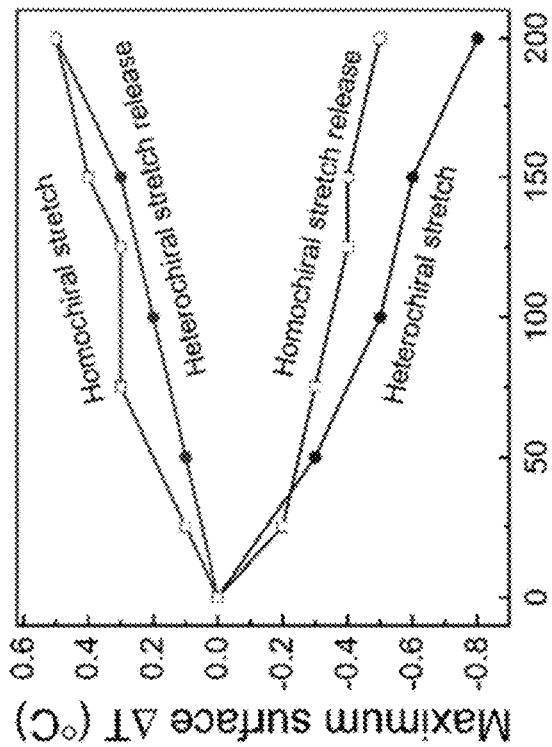
Figure 2E:
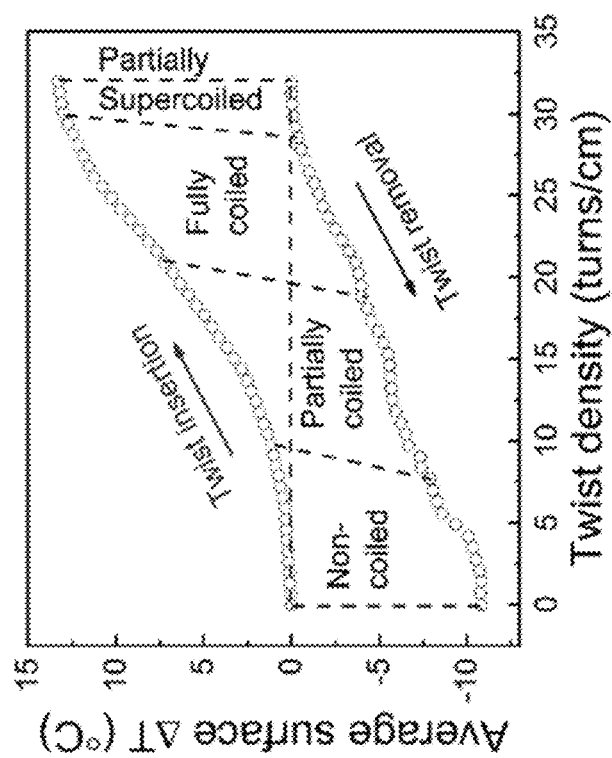
Figure 3B:
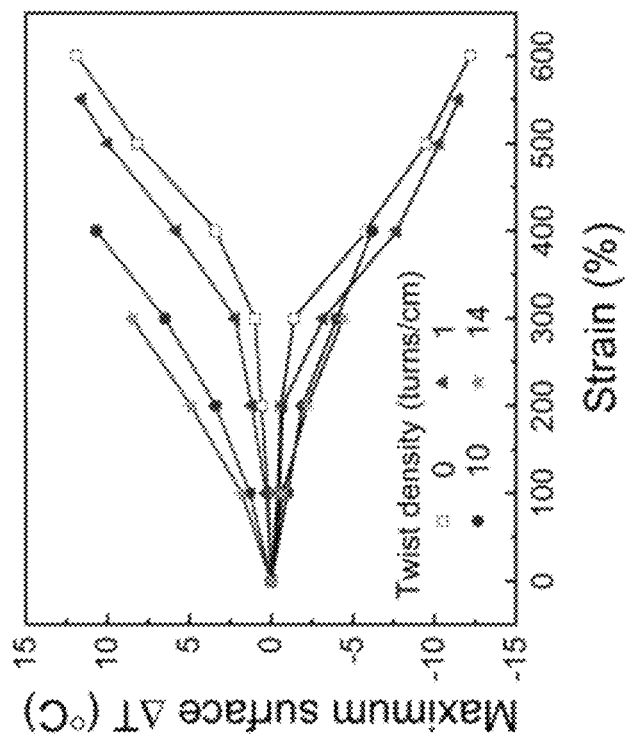
FIG. 3B is a graph showing the maximum surface temperature changes versus percent fiber stretch for NR fibers having different amounts of inserted twist. In the initial non-stretched state, fibers having 1, 10, and 14 turns/cm of twist were highly twisted, fully coiled, and partially supercoiled, respectively.

The first examples of mechanocaloric cooling by a twist/untwist process are shown in FIGS. 2C-2E. Removing twist from a fiber that was twisted to just below the onset of coiling provided little surface-average cooling for a 100%-strain NR fiber (−0.5° C.), due to the low twist possible before coiling. Much larger average cooling resulted for twist release from a highly-twisted, non-coiled 500%-strain fiber (−5.2° C.). When much more highly twisted, so that coiling and supercoiling can occur, the maximum (−15.5° C.) and average (−12.4° C.) surface cooling for isometric twist release at 100% strain exceed that obtained (FIG. 2B) for 600% strain release from a non-twisted fiber (−12.2° C.).

Figure 4D:
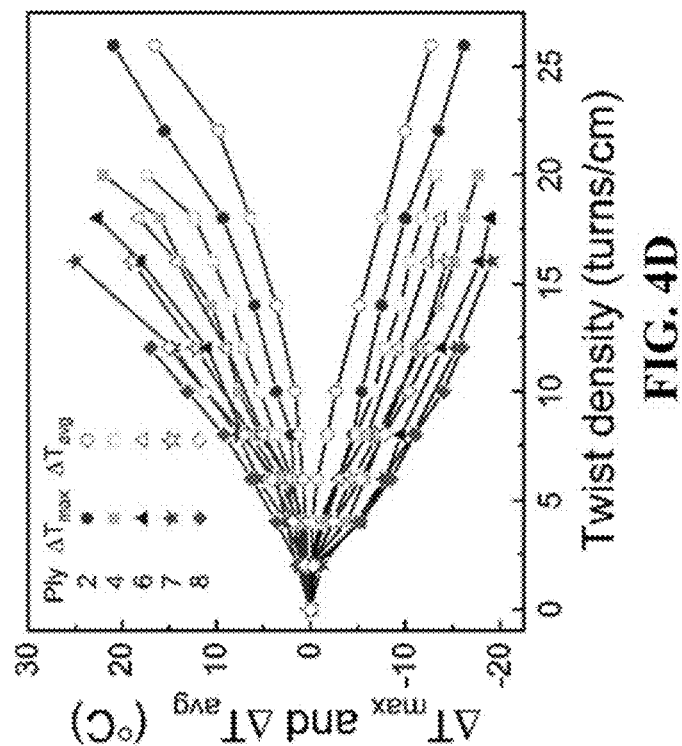
Figure 4C:
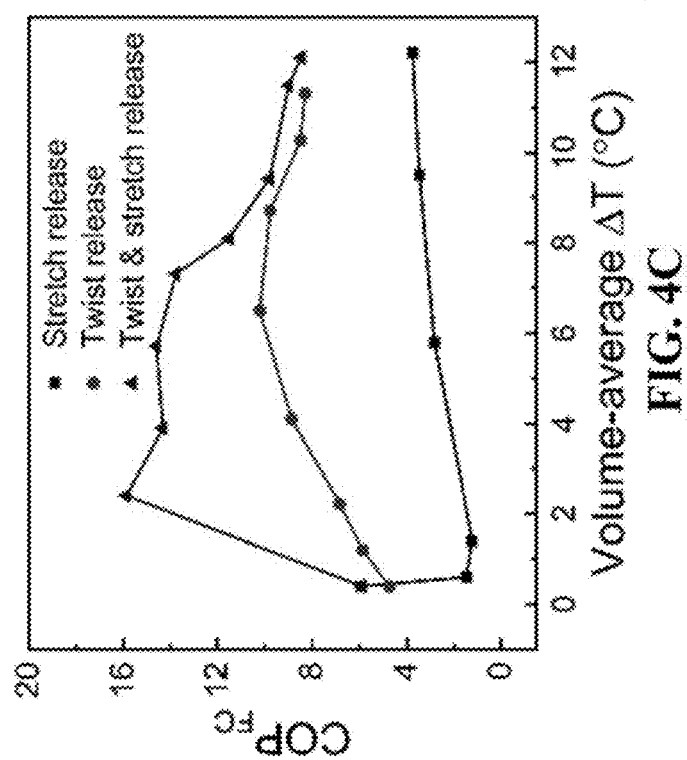

By combining successive fast twist release and stretch release (FIGS. 4A-4B), an even higher maximum (−16.4° C.) and average (−14.5° C.) cooling was obtained. Hence, a twist-based cooler at 100% strain could be $\frac{2}{3}^{rd}$ the maximum length of the above stretch-based cooler, and still provided 2.3° C. higher surface-average cooling. FIGS. 39A-39E shows the application of a NR fiber, which was painted with a thermochromic dye, as a mechanochromic material whose color response results from temperature changes produced by changes in inserted twist. This dye changes color from orange to yellow at 31° C. and from orange to dark green at 15° C.

Figure 3A:
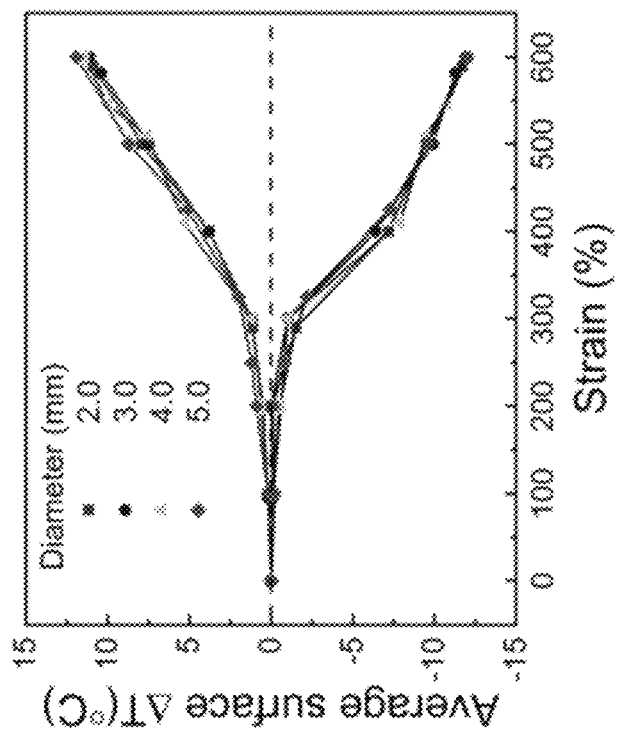
FIG. 3A is a graph showing the surface temperature changes during stretch and stretch release as a function of engineering strain for non-twisted NR fibers having parent diameters of 2.0, 3.0, 4.0, and 5.0 mm, respectively.
Figure 5B:
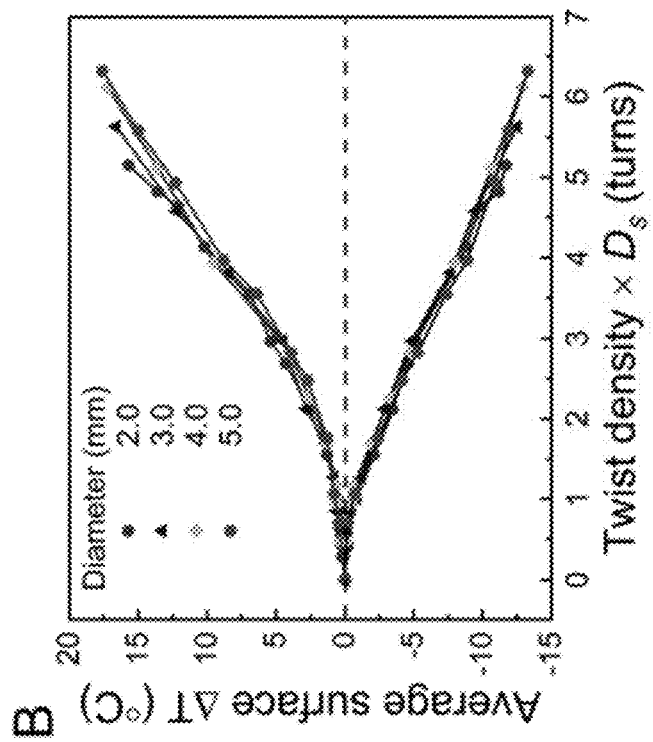
FIGS. 5A-5B are graphs showing maximum (FIG. 5A) and average (FIG. 5B) twistocaloric surface temperature changes on isometrically inserting and removing twist as a function of the product of twist density and stretched fiber diameter ($D_s$) for NR fibers having non-stretched diameters of between 2.0 and 5.0 mm. These measurements were conducted for an isometric stretch of 100%, but the twist density is normalized to the non-stretched length. The discontinuity in maximum surface cooling (A) for a twist density×$D_s$ product of between 0.7 and 1.0 turns corresponds to the complete removal of coiling.
Figure 5A:
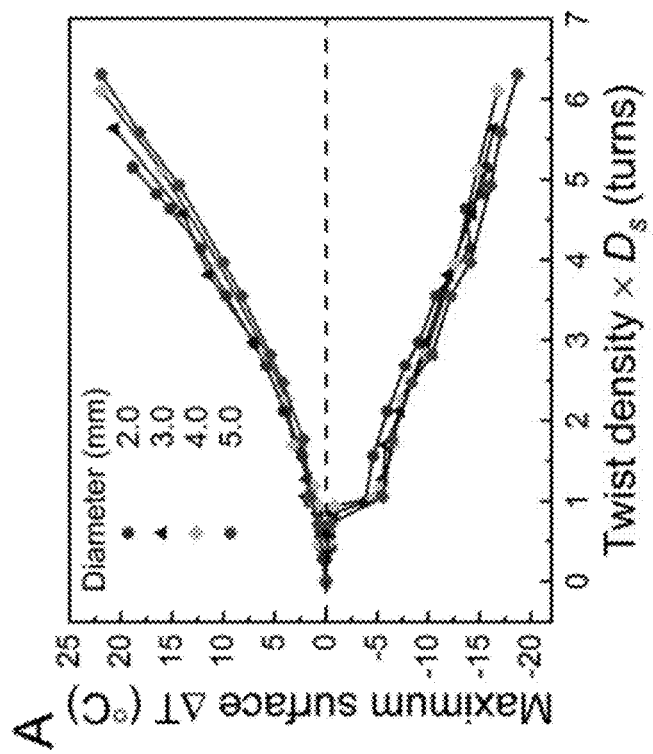
Figure 6:
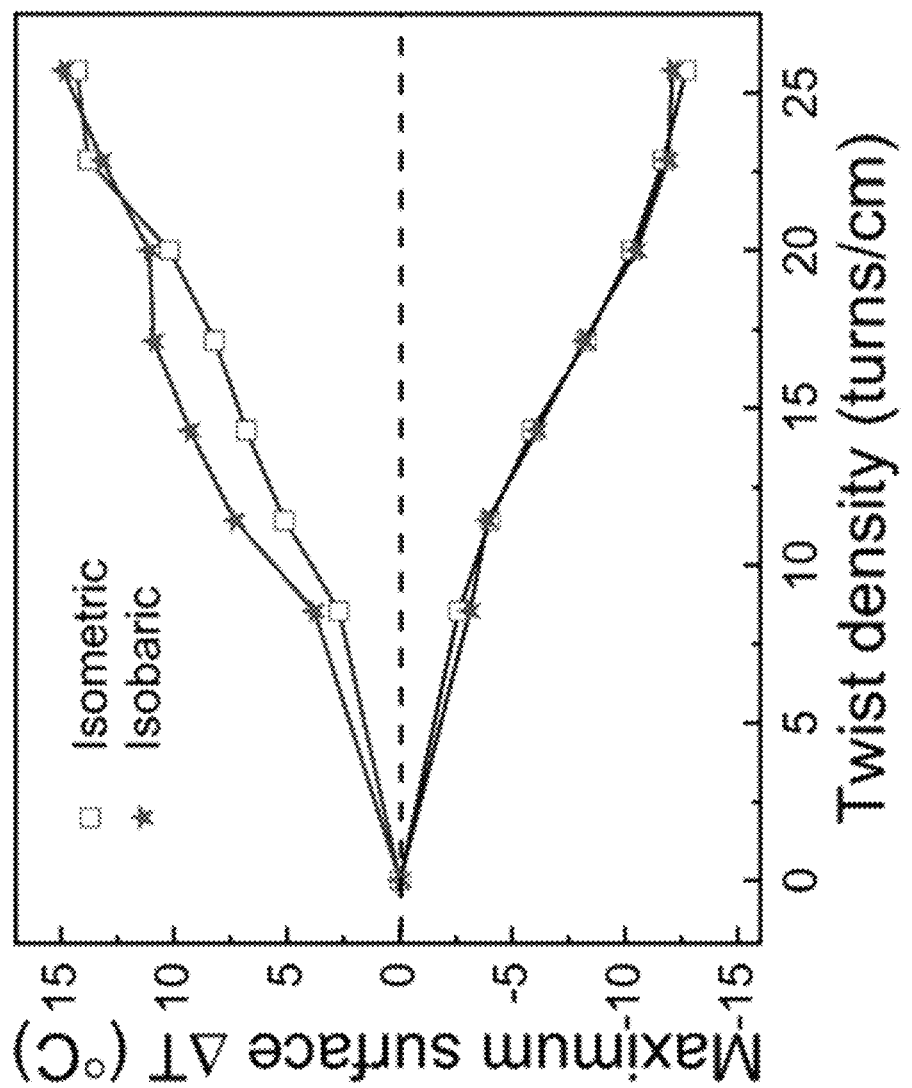
FIG. 6 is a graph showing comparison of the twist dependence of maximum twistocaloric surface temperature changes during twist insertion and twist removal for 2.0-mm-diameter NR fibers having the same length and the same inserted twist in the twisted/stretched states, using different twist insertion processes (isometric and isobaric), but the same twist removal process (isometric). The applied stress for the isobaric measurements was 0.70 MPa. Note that twistocaloric cooling was independent of whether twist was inserted isometrically or isobarically, as long as the same strain was used for isometric twist release.
Figure 7:
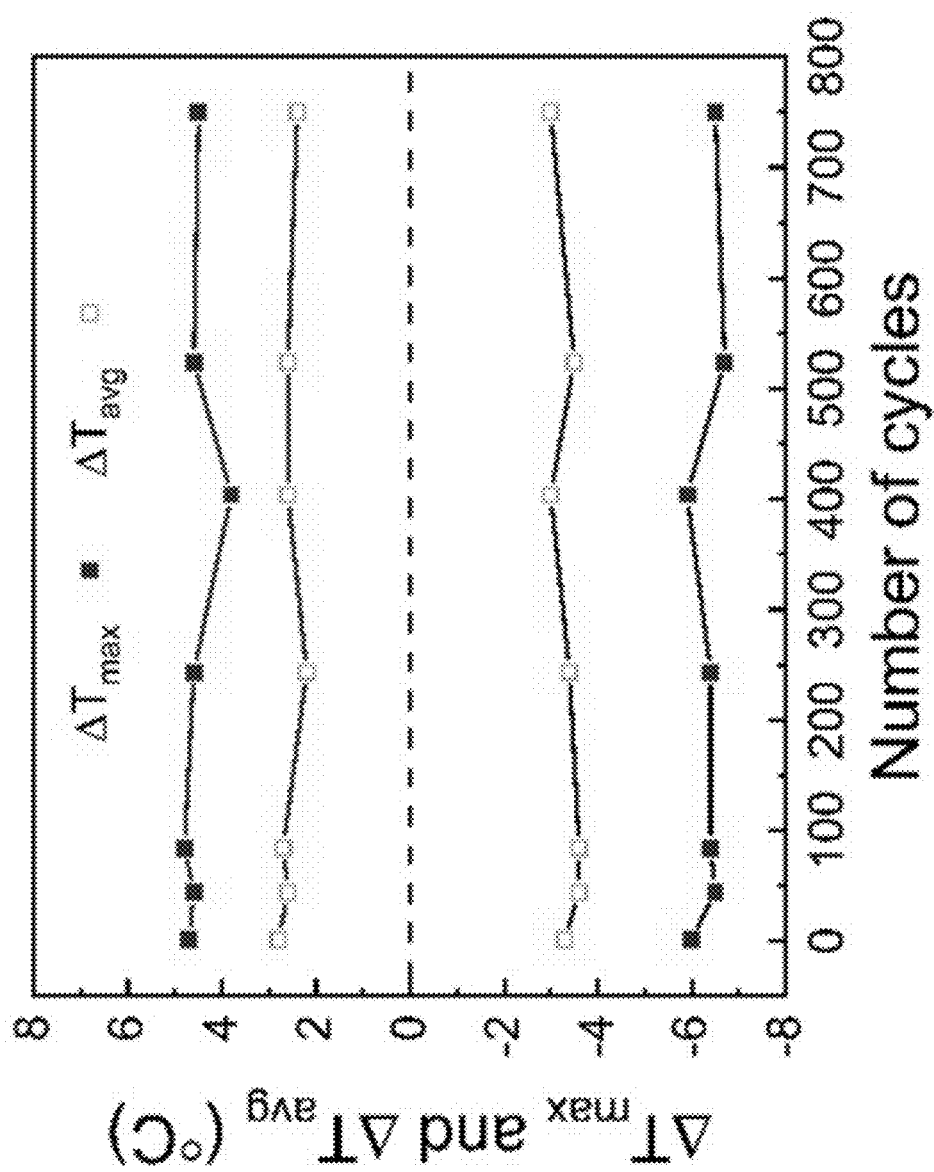
FIG. 7 is a graph showing the maximum and average surface temperature changes during 750 cycles of isometric insertion and removal of 15 turns/cm of twist at 100% strain for a 2.2-mm-diameter parent NR fiber.
Figure 8A:
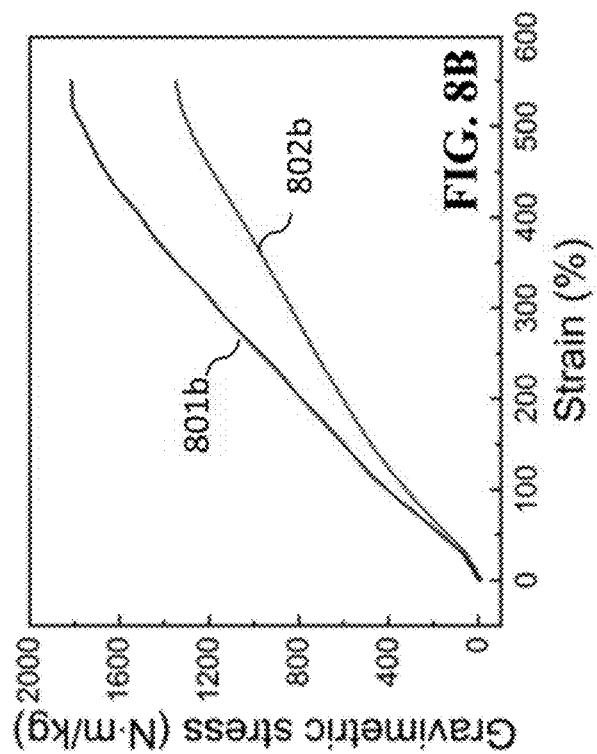
FIGS. 8A-8D are graphs showing gravimetric stress versus strain curves for (FIG. 8A) non-twisted, (FIG. 8B) highly twisted (1 turns/cm), (FIG. 8C) fully coiled (10 turns/cm), and (FIG. 8D) partially supercoiled (14 turns/cm) NR fibers, which were obtained during loading (plots 801a-801d) and unloading after thermal equilibration (plots 802a-802d) the NR fibers at a strain-rate of 42 cm/s. These fibers were obtained by isometrically inserting twist into 2.2-mm-diameter parent NR fibers that were 3-cm long. The input and output mechanical energies for these nearly adiabatic stretches and stretch releases, as a function of strain increase and strain decrease, were calculated from the above data. The applied stress at 0% strain is non-zero for the twist-containing fibers (FIGS. 8B-8D), since the above-reported strains are relative to the length of non-twisted fiber.
Figure 8B:
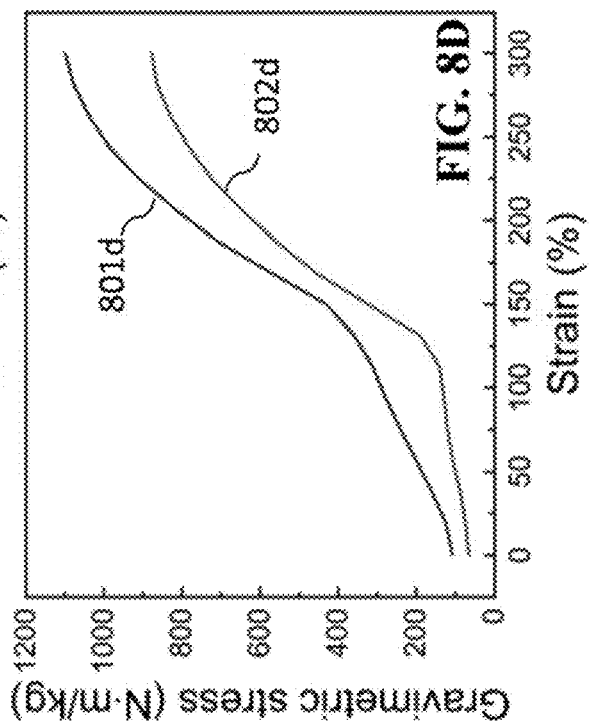
Figure 8C:
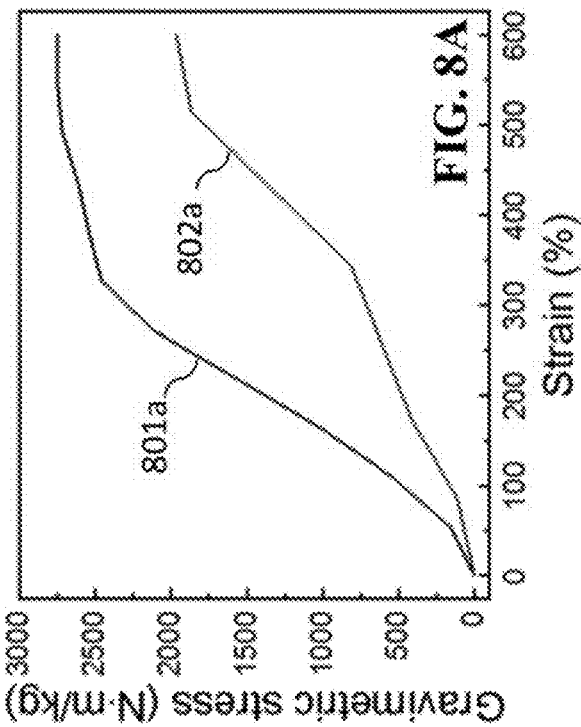
Figure 8D:
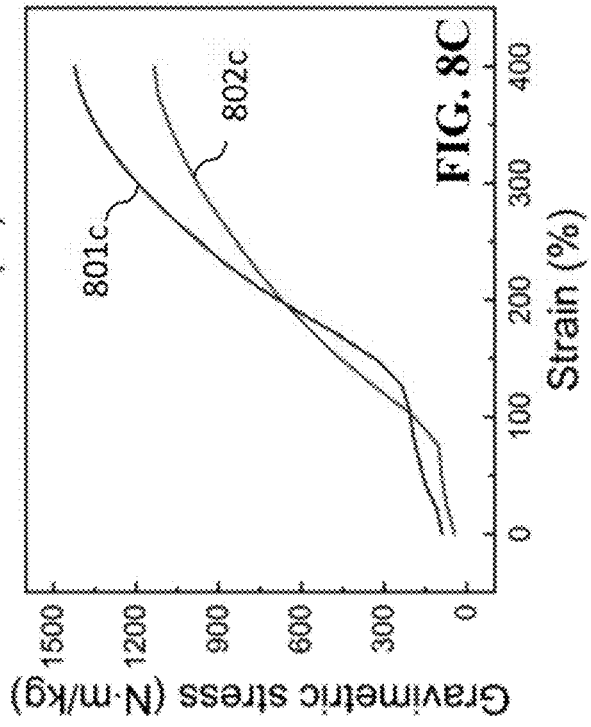
Figure 9B:
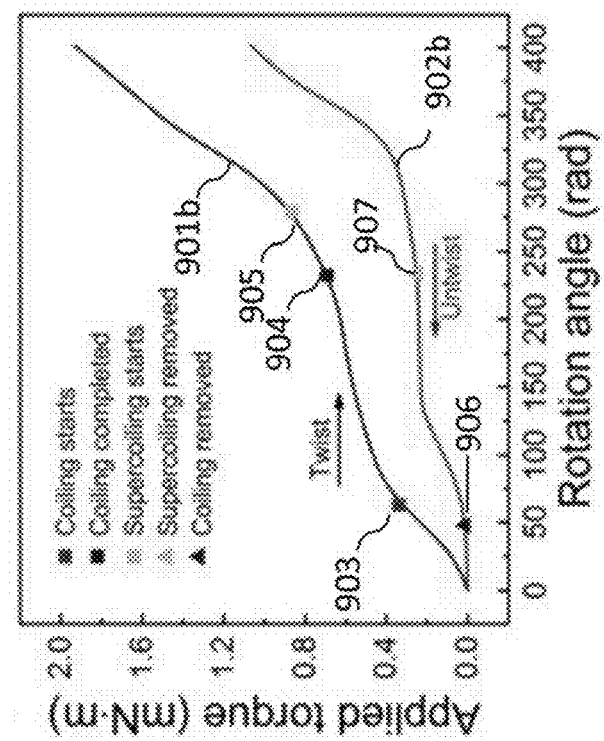
FIGS. 9A-9B show torque on NR fibers during isometric twist insertion and twist removal at 100% strain.
Figure 9A:
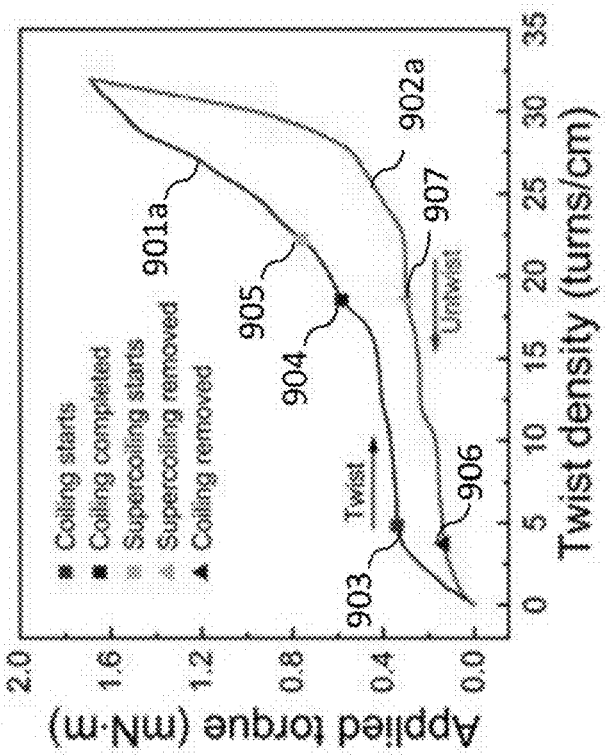

NR fibers having very different diameters and the same elongation provide essentially the same dependence of $\Delta T_{max}$ and $\Delta T_{avg}$ on the product of twist density and the stretched fiber diameter. See FIGS. 5A-5B. Also, the strain dependences of heating and cooling during stretch and stretch release of the non-twisted fiber were approximately independent of fiber diameter. See FIG. 3A. This indicated that these fibers have similar properties and that diameter-dependent thermal transport was not important for the times used for twist changes. The maximum surface cooling on twist release was essentially the same whether twist insertion was done isometrically or isobarically, as long as the percent stretch obtained after isometric twist release was identical (FIG. 6). In addition, there were no systematic changes in maximum or average temperature changes on either twist insertion or twist release over the investigated 750 cycles of isometrically inserting and removing 15 turns/cm of twist (FIG. 7).

Other commercially available elastomeric fibers evaluated as mechanocaloric coolers include styrene-ethylene-butadiene-styrene copolymer (SEBS, Kraton Co., Ltd.), ethylene propylene diene monomer rubber (EPDM, Wuxi PLK Seal Material Co., Ltd.), Spandex (20D, Huafeng Spandex Co., Ltd.), a thermoplastic polyurethane (TPU, Zhejiang Shengli Pioneer Line Co., Ltd.), and polydimethylsiloxane (PDMS, Hangzhou Bald Advanced Materials Co., Ltd.). The SEBS elastomer was evaluated as a composite that contained 83% liquid wax (Liquid Wax #5 from ExxonMobil). As shown by the results in TABLE I, for all investigated elastomeric fibers, the maximum surface cooling upon twist release at 0% isometric strain exceeded the maximum cooling obtained by stretch release of the non-twisted fiber.

TABLE I is comparison of the maximum and average twistocaloric surface temperature changes during isometric twist insertion and twist removal at 0% strain and the temperature changes during stretch and stretch release of the non-twisted fibers. At the indicated twist densities, the natural rubber, Spandex, and SEBS rubber fibers are partially supercoiled, the EPDM rubber, TPU, and PDMS fibers are partially coiled, and the NiTi wire is non-coiled.

and 4.0 mm) was filled with water to a height of 6.4 cm, so 98.5% of the length of the stretched NR fiber was immersed in the water.

Figure 29B:
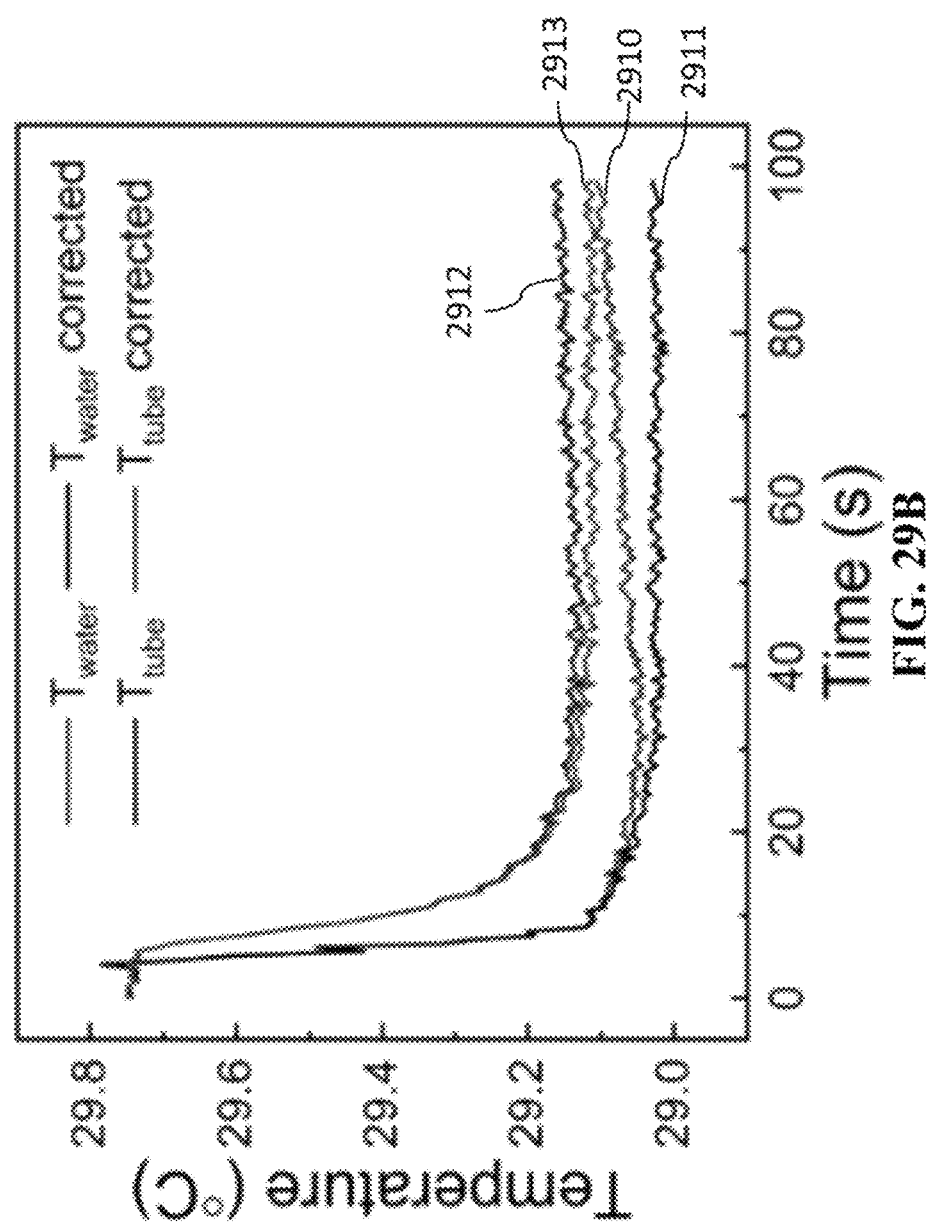
FIG. 29B is a graph showing the time dependence of the temperatures of the water and the PP tube during isometric twist removal of 30 turns/cm of twist from a 2.2-mm-diameter NR fiber that was stretched to 100% strain, as well as the corresponding loss-corrected curves (with plots 2910-2913 corresponding to $T_{water}$, $T_{water}$ (corrected), $T_{tube}$, and $T_{tube}$ (corrected), respectively).

Upon thermal equilibration within the NR fiber, this cooling energy was the sum of terms due to the temperature decreases of the water surrounding the NR fiber, the NR fiber, and the tube that contains the water (FIG. 29B). This cooling energy was then the sum of the products of gravimetric heat capacity, mass, and temperature change for the water, plastic tube, and NR fiber. In order to minimize loss of cooling energy to surrounding air, by decreasing the temperature change of the water, the mass of water was 4.6-times the mass of the NR fiber. This small loss of cooling energy was corrected by fitting the long-term temperature dependence of water and container to a standard heat-loss equation, and then adding these temperature corrections to the observed curves, so that the loss-corrected temperature curves reach long plateaus. The temperature changes for these plateaus were used to obtain the cooling energy, and thereby the dependence of volume-average temperature change on twist density change. The heat loss equation used for the above analysis was $\Delta T(t)=\Delta T(0)\exp(t/\tau)$, where $\Delta T(t)$ is the temperature with respect to the ambient temperature at elapsed time t and $\tau$ is the characteristic time constant for heat exchange The NR fiber was isometrically twisted and untwisted at 15 turns/s using the servo motor. For an illustrative experi-

TABLE I

| Fiber type | Fiber diameter (mm) | Twist density (turns/cm) | Twist density × diameter (turns) | $\Delta T_{max}$ and $\Delta T_{avg}$ during twist (° C.) | $\Delta T_{max}$ and $\Delta T_{avg}$ during untwist (° C.) | Percent stretch | $\Delta T$ during stretch (° C.) | $\Delta T$ during stretch release (° C.) |
|---|---|---|---|---|---|---|---|---|
| Natural rubber | 2.2 | 26.0 | 5.72 | +20.5 +15.3 | −14.6 −10.5 | 600% | +11.9 | −12.2 |
| 3-ply Spandex rubber | 0.2 | 31.0 | 0.62 | +22.1 +14.6 | −11.4 −9.1 | 520% | +6.6 | −7.1 |
| EPDM rubber | 2.0 | 24.1 | 4.82 | +15.2 +12.0 | −7.0 −5.2 | 200% | +2.3 | −2.6 |
| SEBS rubber | 4.0 | 70.2 | 28.1 | +5.1 +3.5 | −2.2 −1.0 | 1000% | +0.2 | −0.3 |
| TPU | 3.0 | 6.1 | 1.83 | +11.3 +6.0 | −3.5 −1.8 | 240% | +4.3 | −1.2 |
| PDMS | 1.0 | 25.3 | 2.53 | +2.7 +1.8 | −0.9 −0.6 | 500% | +1.6 | −0.6 |
| Single-ply NiTi wire | 0.7 | 0.9 | 0.063 | +24.3 +21.3 | −17.0 −14.4 | 6% | +21.0 | −17.0 |
| Four-ply NiTi wire | 0.7 | 1.0 twist of plying | 0.14 | +35.2 +30.4 | −20.8 −18.2 | 6% | +21.0 | −17.0 |

Measurement of the Volume-Average Twistocaloric Cooling and the Coefficients of Performance for Twist-Released NR Fibers The volume-average cooling upon untwisting NR fibers was next experimentally derived by calorimetrically measuring the cooling energy produced by twist-release. This was accomplished by isometrically releasing twist from a NR fiber that was located within a water-containing plastic tube. See FIG. 29A. The components of apparatus 2900 were (a) a 80-step servo motor 2901, (b) a NR fiber 2902, (c) a vertical PP tube filled with water 2903, (d and e) thermocouples 2904-2905 for measuring the temperatures of water and the PP tube, (f) epoxy resin 2906 for sealing the bottom-end of the PP tube, and (g) clamps 2907 for attaching the NR fiber to the motor and for torsional tethering. The 6.5-cm-long PP tube (with inner and outer diameter 3.4 cm ment using the apparatus of FIG. 29A, which provided the cooling curves shown in FIG. 29B, the NR fiber had an initial twist density of 30.0 turns/cm, so complete twist removal required 6 seconds. FIG. 29B shows the temperatures of the water and the PP tube decreased to a minimum, and then increased as the system slowly heated back to ambient temperature. This figure also shows the heat-loss corrected curves reach plateau values, which were used for derivation of cooling energy. The room temperature was 29.74° C. The water and the PP tube decreased to minimum temperatures of 29.04° C. and 29.13° C., corresponding to temperature decreases of −0.70° C. and −0.61° C., respectively. The cooling energy contribution of the NR fiber that remained after equilibration with water was calculated by approximating that the volume-average temperature of the NR fiber equaled that of the water. This approximation has little effect on the derived specific cooling energy of the NR fiber, since the thereby-calculated residual cooling energy in the NR fiber was from 7.8% to 8.1% of the sum of the cooling energies in the water and in the PP tube. Moreover, the thermal equilibration time predicted from the thermal diffusivity (0.05 mm$^2$/s) of the 2.2-mm-diameter NR fiber was 0.96 s, while the duration of the time for equilibration with water bath was about 30 s. The heat capacity used for these calculations for the NR fiber, the PP tube, and the water were 1.72, 1.80 [Gaur 1981], and 4.18 JK$^{-1}$g$^{-1}$, respectively.

Like the case later for NiTi, the above thermal time for adiabatic thermal equilibration ($t_a$=0.08R$^2$/α, where R is the fiber radius and α is the thermal diffusivity in the radial direction) was calculated as the time to increase the ratio of volume-average temperature change to surface-average temperature change to F, where F is 90%. This time, which was derived using COMSOL5.4 software by approximating that the initial temperature change between fiber center and fiber surface linearly depends on the radial distance from fiber center. Since the thermal diffusivity used is for the non-deformed NR fiber, this equilibration time ignores the effects of torsional and tensile stain on thermal diffusivity in the radial direction.

FIG. 2D compares the surface-average and volume-average temperature changes for isometric twist insertion and release from a 100%-stretched NR fiber that is partially coiled or supercoiled. See also FIG. 21. For the high twist density most important for applications, where the twist removal time (1.5 s) exceeds the calculated radial thermal equilibration time (0.96 s), the volume-average cooling is 11.3° C. and the ratio of volume-averaged to surface-averaged temperatures reaches 0.91. This is consistent with nearly complete equilibration in the radial direction.

Although the maximum twistocaloric specific cooling energy obtained (19.4 J/g) is lower than reported for releasing 600%-stretch from a non-twisted NR fiber (21.6 J/g) [Dart 1942], the stretch needed for this torsional cooling is much smaller (100%). At 100% strain, stretch-based cooling would only be 4.2% of that delivered by twistocaloric cooling.

Using the above volume-average temperature changes on isometric twist release, the coefficient of performance (COP) for NR twist fridge can be obtained, which is an important metric. [Moya 2014]. The COP can be described as the ratio of the cooling energy (the product of the volume-average cooling, the gravimetric heat capacity, and the mass of the NR fiber) to either the input mechanical energy or the net energy consumed during a mechanical cycle (called COP$_{HC}$ and COP$_{FC}$, for a half-cycle and a full-cycle, respectively). COP$_{HC}$ is useful only when device simplicity or miniaturization is more important than the increased efficiency that results from recapturing part of the input elastic energy.

Using the stretch-release-induced cooling of FIG. 2B for a non-twisted fiber, the volume-average cooling of FIG. 2D for twist release, and the mechanical property measurements of FIGS. 8A-8D and 9B, the COP$_{FC}$ and COP$_{HC}$ were obtained as a function of volume-average cooling (FIG. 4C and FIGS. 10A-10D). The COP$_{FC}$ and COP$_{HC}$ for cooling, either by twist release or by combined isometric twist release and stretch release, were much higher than for cooling by stretch release from the non-twisted fiber when the volume-average cooling was above −0.4° C. For the highest volume-average cooling obtained for stretch release from a non-twisted fiber (−12.2° C.), twist release from a twisted and stretched fiber (−11.3° C.), and combined twist and stretch release (−12.1° C.), the COP$_{FC}$ values were 3.8, 8.3, and 8.5, respectively (FIG. 4C), and the COP$_{HC}$ values were 1.9, 5.2, and 5.3, respectively (FIGS. 10A-10D).

The intrinsic efficiency of a material, which is the maximum theoretical efficiency for a refrigerator, is the ratio of COP to the COP of a Carnot cycle (COP$_{Carnot}$). COP$_{Carnot}$ is $T_C$/($T_H$−$T_C$), where $T_C$ and $T_H$ are the minimum and the maximum temperatures in the Carnot cycle, respectively. The intrinsic material efficiencies for cooling during isometric twist release and during combined isometric twist release and stretch release were much higher than for cooling during stretch release from a non-twisted fiber, for both full cycle and half cycle processes (FIGS. 10C-10D). For the highest volume-average cooling obtained (FIG. 4C), the full-cycle intrinsic material efficiencies were 0.32, 0.63, and 0.67 for stretch release from a non-twisted fiber, twist release from a twisted and stretched fiber, and combined twist and stretch release, respectively, and the half-cycle intrinsic material efficiencies were 0.16, 0.39, and 0.42, respectively.

Twist-Based Cooling by Plying Natural Rubber Fibers

As an alternative to a cooling cycle that involves twist insertion and removal in a single NR fiber, torsional mechanocaloric heating and cooling resulting from isometrically plying and unplying 2.2-mm-diameter NR fibers was investigated. For 100% stretch (FIGS. 4D-4E), the maximum (−19.1° C.) and average (−14.4° C.) surface cooling resulting from isometrically unplying a seven-ply fiber exceeded that for 600% stretch release from a non-twisted fiber (−12.2° C., FIG. 2B) and for twist removal from a 100%-stretched single fiber (−15.5° C. maximum and −12.4° C. average, from FIG. 2C and FIGS. 11A-11B. This means that a torsional cooler based on plying can also be 2/7$^{th}$ the length of a solely stretch-based cooler and still realize higher maximum and surface-average cooling. A plying cycle at much higher or lower isometric strain than 100% resulted in lower twistocaloric cooling.

Figure 4E:
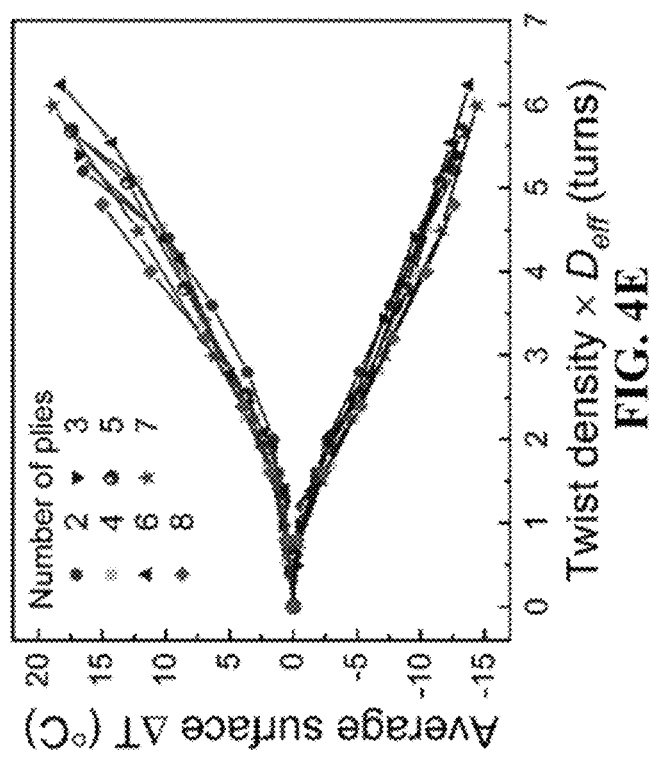

Guided by the nearly identical twistocaloric temperature changes for fibers having the same stretch and a similar product of twist density and stretched fiber diameter (FIGS. 5A-5B), it was found that the twistocaloric temperature changes associated with fiber plying at constant stretch approximately depended on the product of the twist density of plying and the effective diameter of the plies ($D_{eff}$=n$^{0.5}$× $D_s$, where n is the number of plies and $D_s$ is the diameter of each stretched fiber) (FIG. 4E).

Spatial and Temporal Dependencies of Twistocaloric Temperature Changes for NR Fibers Spatially complex changes in surface temperature occurred for twistocaloric processes involving coiled or super-coiled states. The simplest case was for twist removal from a self-coiled fiber. While the main twistocaloric contribution to surface-average cooling was from fiber untwist, coil regions on the inside and outside of the coils experienced different strain changes, which affected local temperature changes. Like for a bent cantilever, regions inside the coil were compressed and those exterior to the coil were stretched, so the heating during coil insertion and the cooling during coil removal were highest for the outer side of coils. Note that the sharp decrease in maximum surface cooling upon the complete removal of coiling (FIG. 5A) disappears for average cooling (FIG. 5B), indicating that effects of bending approximately average to zero.

Figure 4F:
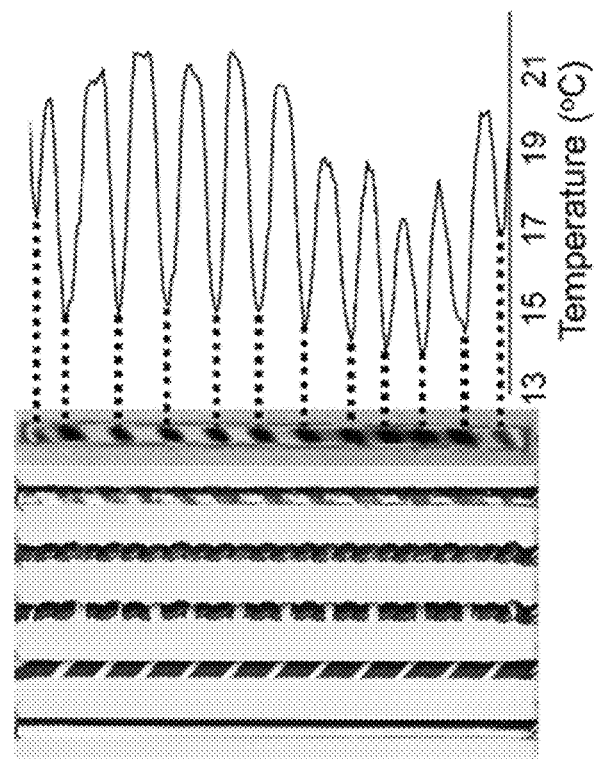

FIG. 4F shows the structural changes during isometric twist insertion and twist removal, as well as the topology of the resulting cooling. A white line painted along the non-twisted fiber became inclined at an angle of 50° after 3.5 turns/cm of twist insertion, and became approximately perpendicular to the coiled fiber upon complete coiling. Painting the exterior of the coiled fiber red indicated the maximum strain and temperature change regions of the coiled fiber after fiber untwist. The periodicity of these exterior regions on the final untwisted fiber (5.6 mm) was much longer than the average coil period (2.5 mm) of the fully coiled fiber. The peak amplitude of surface cooling increased with increasing distance from the nucleation site of coiling, since coil nucleation stretched the non-coiled regions of the fiber and thereby decreased the spring index (the ratio of the average coil diameter to the diameter of the fiber within the coil) of later introduced coils.

Figure 2H:
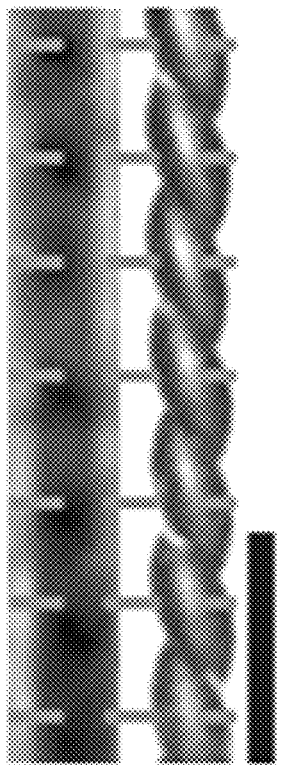
Figure 2G:
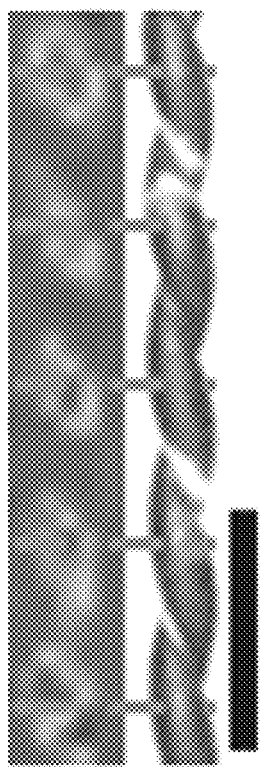
Figure 2I:
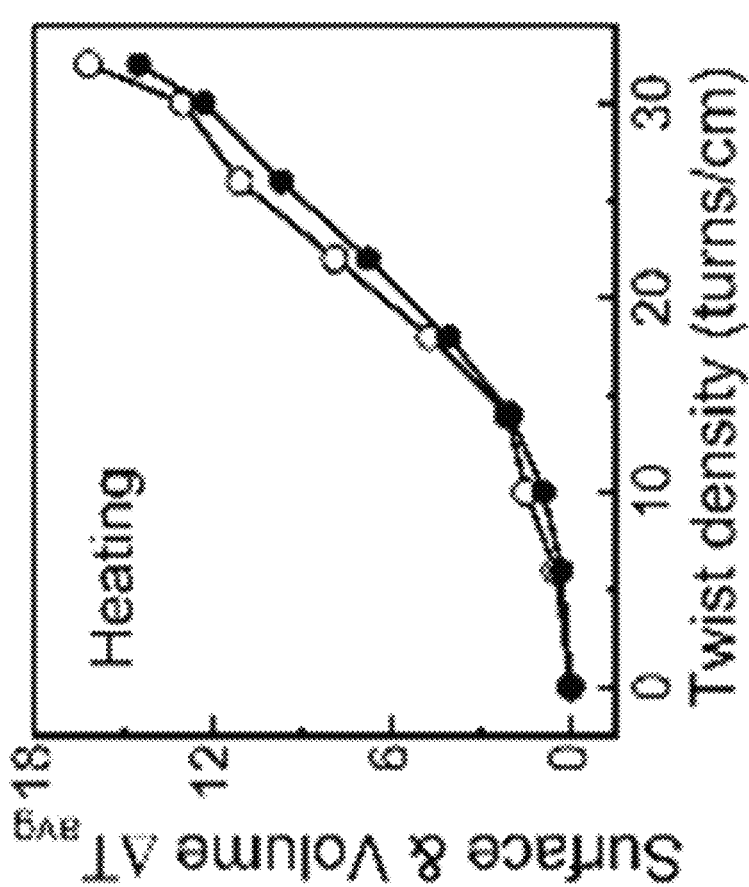

These results contrasted with the temperature periodicities observed when stretching and releasing a coiled NR fiber. While the spring index changed during these tensile deformations, the number of coils in the NR fiber was strain invariant (FIGS. 2G-2H). Hence, the separations between maximum temperature peaks (and between minimum temperature peaks) during both stretching and releasing a fully coiled NR fiber were identical to the inter-coil separations.

Twistocaloric Cooling by Self-Coiled Polyethylene and Nylon Fibers

Twist-exploiting mechanocaloric cooling for non-elastomeric polymers used for fishing line and sewing thread was also observed. These polymers were made elastically deformable by inserting so much twist that the fibers self-coil. Since the handedness of twist insertion and coiling are identical for self-coiled fibers, they are called homochiral. This coiling was done isobarically, since such non-elastomeric fibers break before coiling when twist was inserted isometrically.

Initial experiments employed 0.41-mm-diameter, 65-pound braided polyethylene (PE) fishing line from Power Pro., Innovative Textiles, Inc. (FIG. 12A), which included four braided fibers. For comparison with later described low-strength polyethylene fibers (which have a strength of 252 MPa and a modulus of 1.0 GPa), the braided yarn had a strength of 3.37 GPa and a modulus of 43.0 GPa. The high-strength polyethylene yarn was called PE-1 and the low-strength monofilament polyethylene fiber (from Nantong Ntec Monofilament Technology Co., Ltd.) was called PE-2. While the high-strength polyethylene yarns were made by an expensive gel spinning, the PE-1 fibers were melt spun. Later used nylon 6 monofilament fishing line was from Crystal String (STRONG & STRETCHY Model 0.2, 0.4 and 0.6 for 0.2, 0.4, and 0.6 mm diameter fibers, respectively).

Spring indices from 1.4 to 0.5 were obtained by inserting 6.5 to 7.3 turns/cm of twist under isobaric loads from 37.1 to 74.2 MPa, respectively, in the high-strength polyethylene fishing line. Maximum and average surface cooling of −5.1° C. and −3.2° C. respectively were obtained for a spring index of 0.8 and release of 22.7% strain (FIGS. 12B-12E and FIG. 13A). For comparison, the temperature change upon stretch release of non-twisted polyethylene yarn was not measurable (below ±0.1° C.), and the highest previously reported tensile mechanocaloric cooling for a non-elastomeric polymer was −2.5° C. for a poly(vinylidene fluoride-trifluoroethylene-chlorotrifluoroethylene) terpolymer [Yoshida 2016], which is a relaxor ferroelectric [Ma 2017].

FIGS. 12B-12C show, for a stretch and stretch release rate of 42 cm/s and an ambient temperature of 25° C., the tensile strain dependence of heating during stretch and cooling during stretch release that resulted for coiled PE-1 yarns having different spring indices. Note that the yarn stretch that can be inserted without causing yarn damage (44.4, 42.8, 22.7, and 16.8%) decreased with decreasing spring index (1.4, 1.1, 0.8, and 0.5, respectively). For these yarns having spring indices of 1.4, 1.1, 0.8, and 0.5, the maximum surface temperature changes during stretch were +7.3, +8.0, +7.8, and +6.9° C., respectively, the maximum surface temperature changes during stretch release were −3.9, −4.9, −5.1, and −4.8° C., respectively, the average surface temperature changes during stretch were +6.0, +6.2, +5.8, and +5.4° C., respectively, and the average surface temperature changes during stretch release were −2.9, −3.5, −3.2, and −2.8° C., respectively. The ratio of the maximum surface temperature changes to the percent inserted stretch increased in magnitude with decreasing spring index (0.16, 0.19, 0.34, and 0.41° C./% for heating and −0.09, −0.11, −0.22, and −0.29° C./% for cooling, for yarns having spring indices of 1.4, 1.1, 0.8, and 0.5, respectively). Also, the ratio of the average surface temperature changes to the percent inserted stretch increased in magnitude with decreasing spring index (+0.13, +0.14, +0.26, and +0.32° C./% for heating and −0.07, −0.08, −0.14, and −0.17° C./% for cooling for yarns having spring indices of 1.4, 1.1, 0.8, and 0.5, respectively).

Figure 12D:
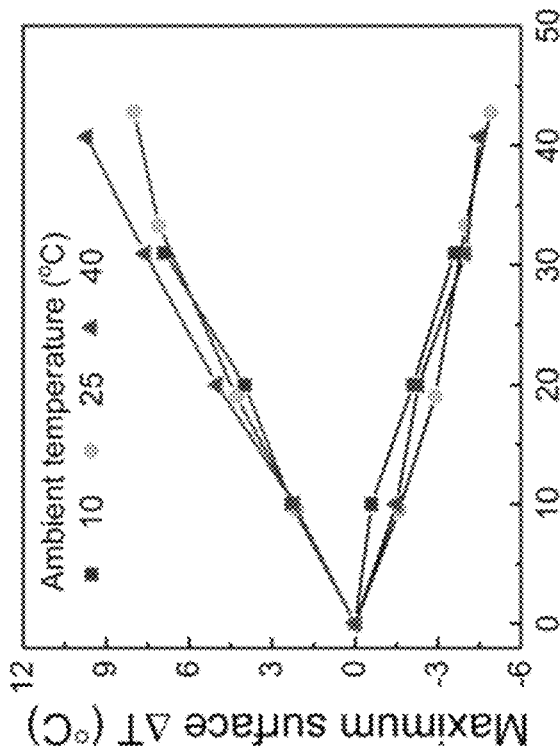
FIGS. 12D-12E are graphs showing the strain dependences of (FIG. 12D) maximum surface twistocaloric temperature changes and (FIG. 12E) average surface twistocaloric temperature changes for a self-coiled, high-strength polyethylene yarn having a spring index of 1.1 that was elastically deformed at different ambient temperatures.
Figure 12E:
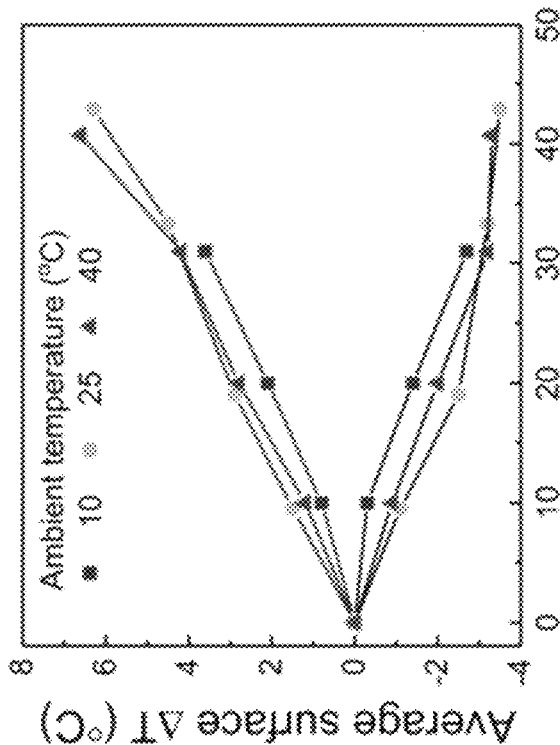
Figure 12F:
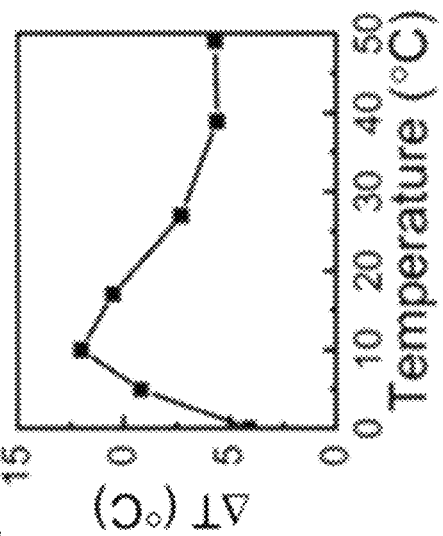
FIG. 12F shows the measured temperature dependence of elastocaloric cooling for a stretched non-twisted NR fiber. [Xie 2017].

FIGS. 12D-12F show that, for a stretch and stretch release rate of 42 cm/s, the tensile strain dependence of heating during stretch of the coiled yarn and cooling during stretch release that results for these coiled yarns that were elastically deformed at different ambient temperatures. These coiled yarns had a spring index of 1.1. For these yarns tested at ambient temperatures of 10, 25, and 40° C., the maximum surface temperature changes during stretch were +6.9, +8.0, and +9.7° C., respectively, the maximum surface temperature changes during stretch release were −3.6, −4.9, and −4.5° C., respectively, the average surface heating during stretch were +3.6, +6.2, and +6.6° C., respectively, and the average surface cooling during stretch release were −2.7, −3.5, and −3.3° C., respectively.

In contrast to the case for stretched homochiral rubber fibers, the dependences of temperature changes on strain changes for both heating and cooling were high for high-strength polyethylene yarn at low strains. In addition, it is important to note that the twistocaloric cooling per strain change was highest for low spring index yarns. While this trend is also seen in the data discussed in the sections following below for low-strength polyethylene and nylon 6 fibers, the range of spring indices that could be investigated was smaller. The reason was that high tensile stresses during coiling must be used to obtain very small spring indices, and these weaker fibers failed during twist insertion under these tensile stresses.

The maximum surface temperature changes obtained for the high-strength polyethylene (PE-1) were much higher for the low-strength polyethylene (PE-2). However, these twistocaloric temperature changes for both polymers approximately depend upon the ratio of the applied strain to the square of the spring index. See FIG. 13A.

Figure 14:
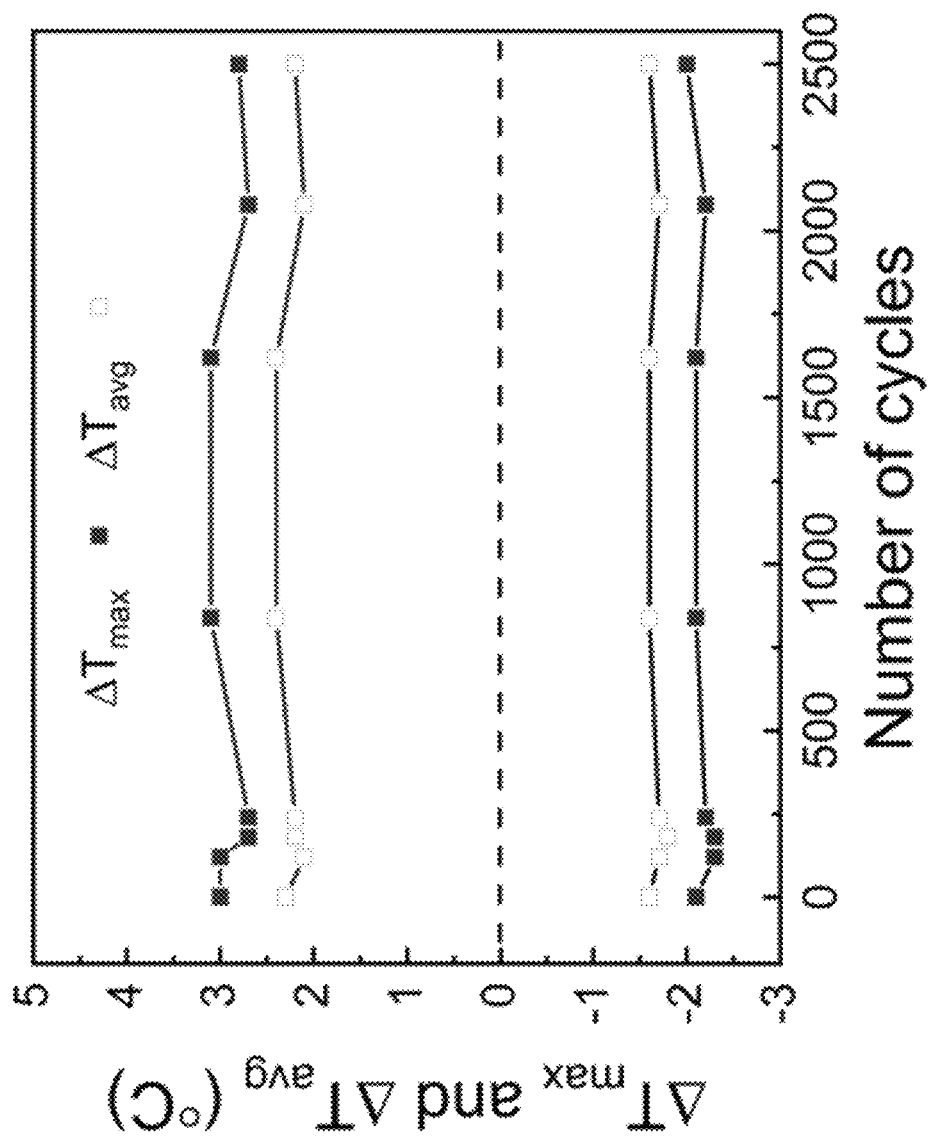
FIG. 14 is a graph showing the maximum and average surface temperature changes during 2500 stretch and stretch release cycles up to 13% tensile strain for a self-coiled, high-strength polyethylene yarn having a spring index of 1.1.

Relevant for using these coiled yarns to provide mechanothermochromic color changes, a high temperature swing (12.9° C., for spring index of 0.8) between the maximum heating and maximum cooling was obtained by 22.7% stretch and stretch release. When normalized to the strain change, this temperature swing was 0.57° C/%, compared with 0.04° C./% for stretching and releasing a NR fiber from 600% strain. No systematic degradation occurred in the maximum or average surface cooling or heating over the investigated 2500 stretch/release cycles to 13% strain. See FIG. 14. The average values of twistocaloric temperature change for a given strain for self-coiled, high-strength polyethylene yarn were smallest for an ambient temperature of 10° C., and were similar for ambient temperatures of 25° C. and 40° C. (FIGS. 12B-12E). In contrast, the peak in stretch-induced elastocaloric cooling for a non-twisted NR fiber occurred at 10° C., and rapidly declined for either higher or lower ambient temperatures, [Xie 2017].

Twistocaloric cooling by non-elastomeric polymers was extended to self-coiled, single-filament nylon 6 fishing line (STRONG & STRETCHY Model 0.2, 0.4 and 0.6 from Crystal String) having parent diameters (D) of 0.2, 0.4 and 0.6 mm. So that all fibers had the same spring index (1.0), they were coiled using the same isobaric stress (15.6 MPa) and the same twist number. These homochiral fibers, having progressively larger diameters, provided progressively increasing maximum cooling (−1.3, −1.9, and −2.1° C.) and average cooling (−0.8, −1.2, and −1.8° C.) upon stretch release (FIGS. 15C-15D). If stretch and stretch release were purely adiabatic (with respect to heat transfer within the fiber and between the fiber and its environment), and the parent fibers had identical properties, this observed variation in mechanocaloric temperature changes should not exist. The observed variations in cooling and heating are consistent with partial thermal equilibration to the environment or within the yarn during stretch and stretch-release, since these effects should have increased influence for these small diameter fibers.

Figure 15A:
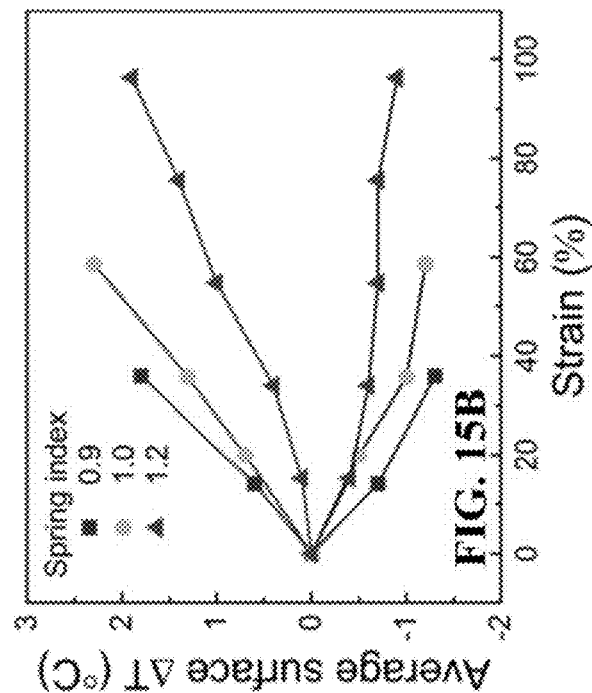
FIGS. 15A-15D show twistocaloric temperature changes on stretch and stretch release for a self-coiled nylon 6 fiber. The dependence of (FIG. 15A) maximum surface temperature changes and (FIG. 15B) average surface temperature changes on stretch and stretch release for self-coiled nylon 6 fibers having different spring indices. The diameter of the nylon 6 fiber before twist or stretch was 0.4 mm. The dependence of (FIG. 15C) maximum surface temperature changes and (FIG. 15D) average surface temperature changes on stretch and stretch release for self-coiled nylon 6 fibers having different fiber diameters. The spring index of the different diameter nylon 6 fibers was 1.0.
Figure 15B:
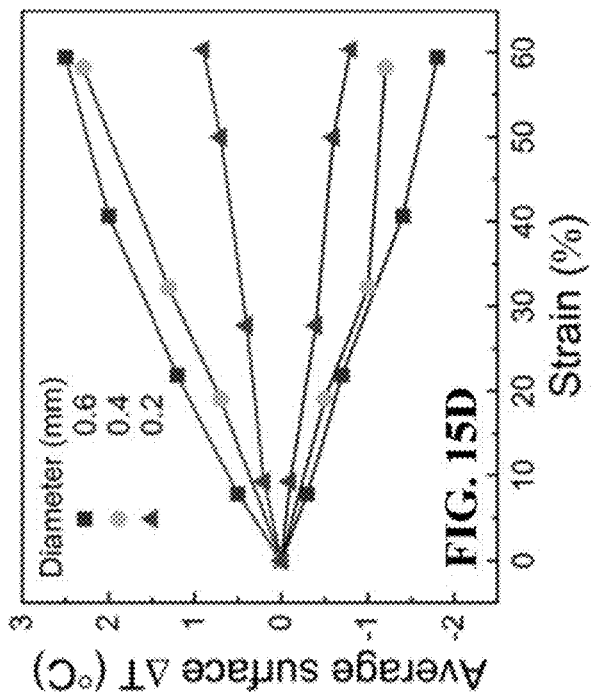
Figure 15C:
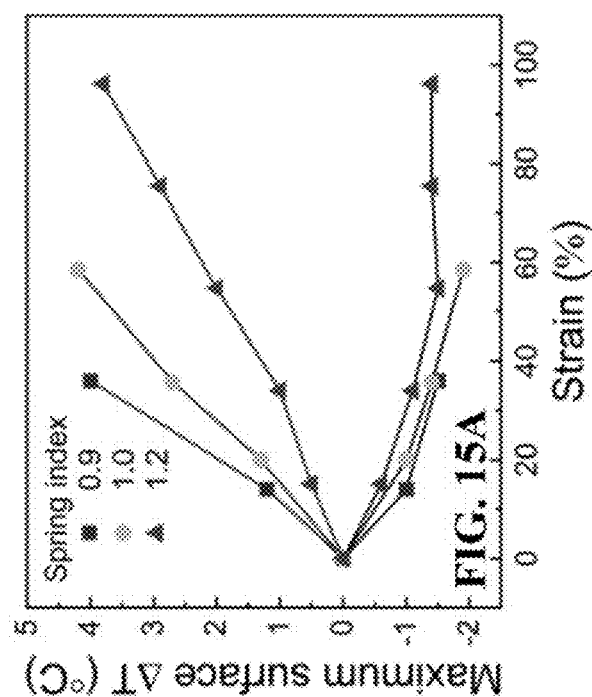
Figure 15D:
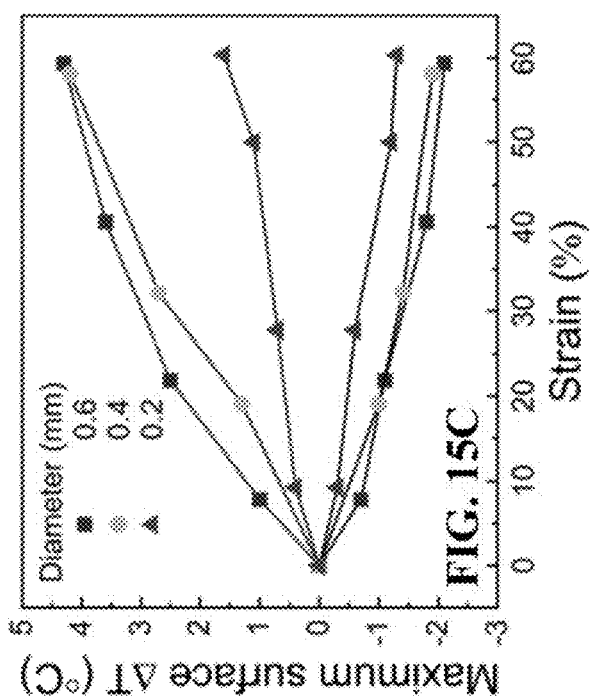

The tensile strain dependence of twistocaloric temperature changes generally increased with decreasing spring index for self-coiled, high-strength polyethylene yarn (FIGS. 12B-12C), low-strength polyethylene (FIGS. 16A-16B) and nylon 6 fibers (FIGS. 15A-15B). Similarly, for self-coiled polymer muscles [Haines 2014], higher heating was needed to cause a given stroke for a smaller spring-index muscle.

The stretch-induced twist change per fiber length, divided by the percent stretch of a coiled fiber, should approximately depend on the inverse square of spring index for self-coiled fibers. This dependence arises since both the strain needed to pull out one coil and the fiber length per coil linearly increase with coil diameter. In agreement, the observed twistocaloric temperature changes for self-coiled polyethylene and nylon 6 fibers or yarns were approximately a function of the ratio of percent stretch to the square of the spring index (FIG. 13A). This dependency is predicted only for the case where different spring index yarns have approximately the same initial coil bias angle, where the coil bias angle is the angle that the coil makes with a direction perpendicular to the axis of the coiled yarn. Due to the difficulty of controlling this coil bias angle for the large spring indices obtained for later-described mandrel-coiled fibers, deviations from this dependency occurred.

Figure 17B:
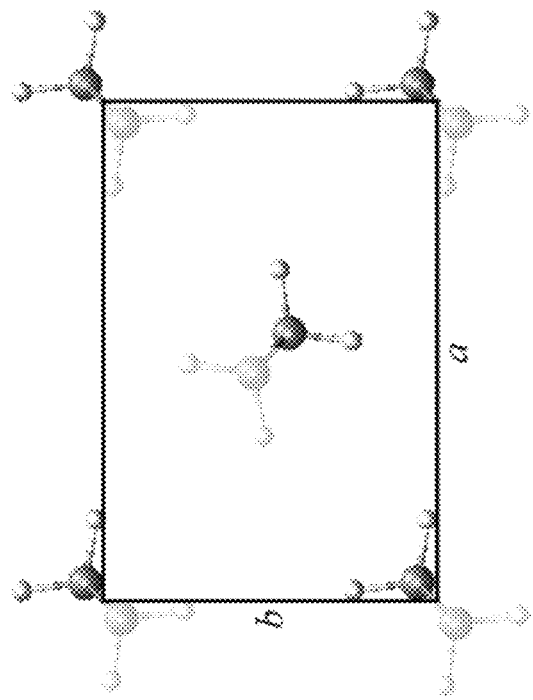
FIGS. 17A-17B are the structures for the monoclinic phase (FIG. 17A) and orthorhombic phase (FIG. 17B) of polyethylene. The unit cell parameters [Olsson 2018; Tadokoro 1984] are approximately: a=8.09 Å, b=4.79 Å, c=2.53 Å, β=108° (monoclinic) and a=7.41 Å, b=4.95 Å, c=2.54 Å (orthorhombic).
Figure 17A:
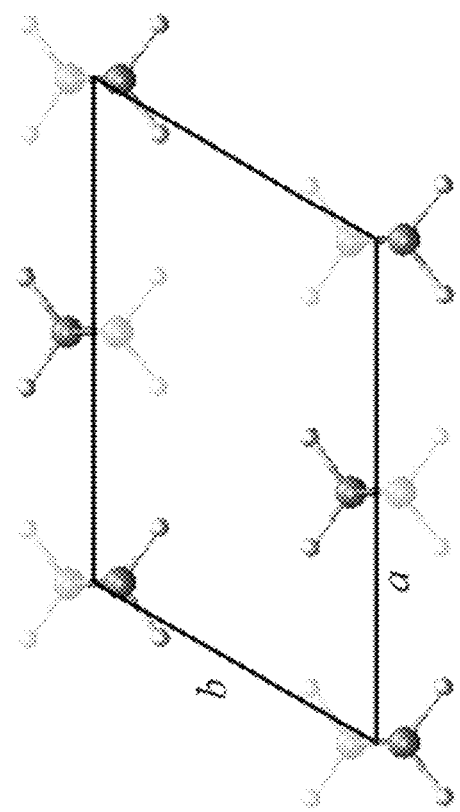

Since the above twistocaloric polyethylene and nylon 6 fibers are highly crystalline, it is challenging to explain the origin of the entropy decrease when stretching the coiled fiber. It is believed that the explanation for polyethylene is the known deformation-driven martensitic phase transformation (FIGS. 17A-17B), which converts the normally more stable orthorhombic phase to the monoclinic phase. [Young 1974; Olsson 2018; Androsch 2010; Tadokoro 1984].

Figure 18B:
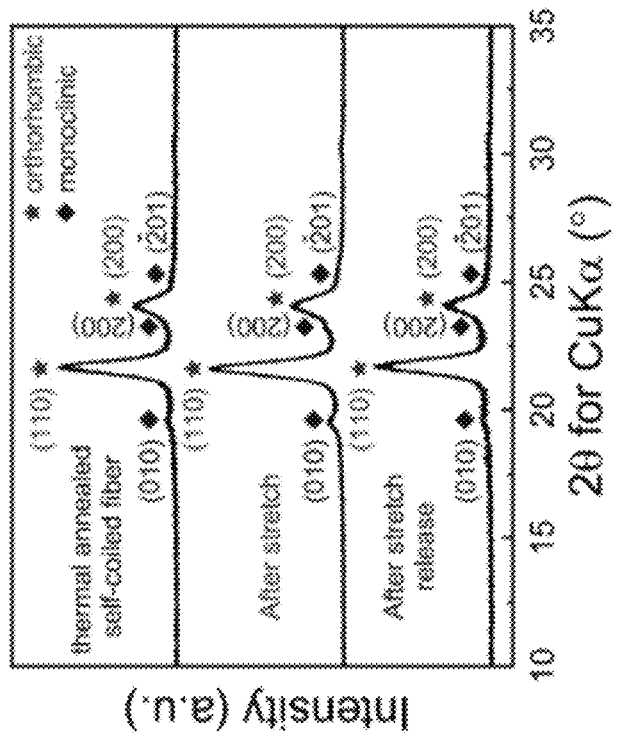
FIG. 18B is a graph showing X-ray diffraction scans for a non-strained, thermally-annealed, self-coiled, high-strength polyethylene fiber (top), for this fiber after 20% stretch (middle), and after release of this stretch (bottom).
Figure 18A:
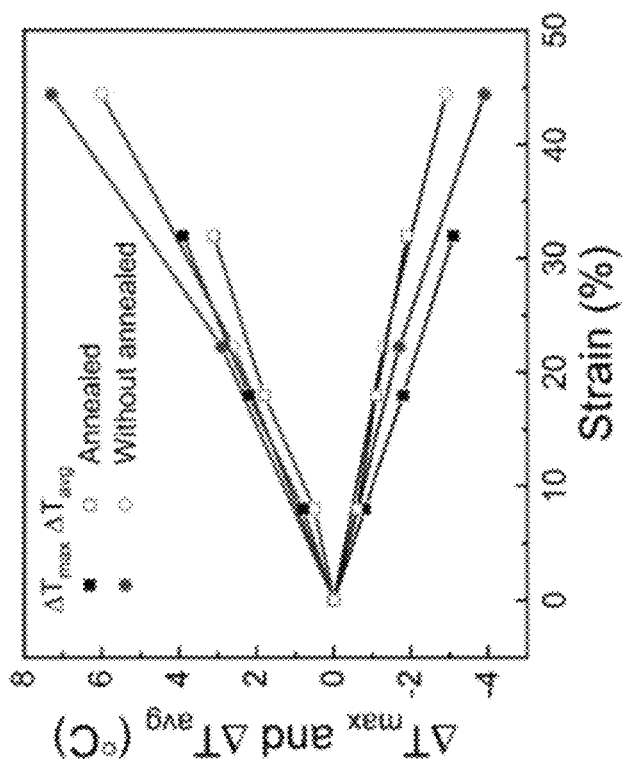
FIG. 18A is a graph showing the dependence of maximum and average twistocaloric surface temperature changes on applied tensile strain for a self-coiled, high-strength polyethylene fiber and for a self-coiled polyethylene fiber that has been annealed for 2 hours at 120° C.
Figure 20:
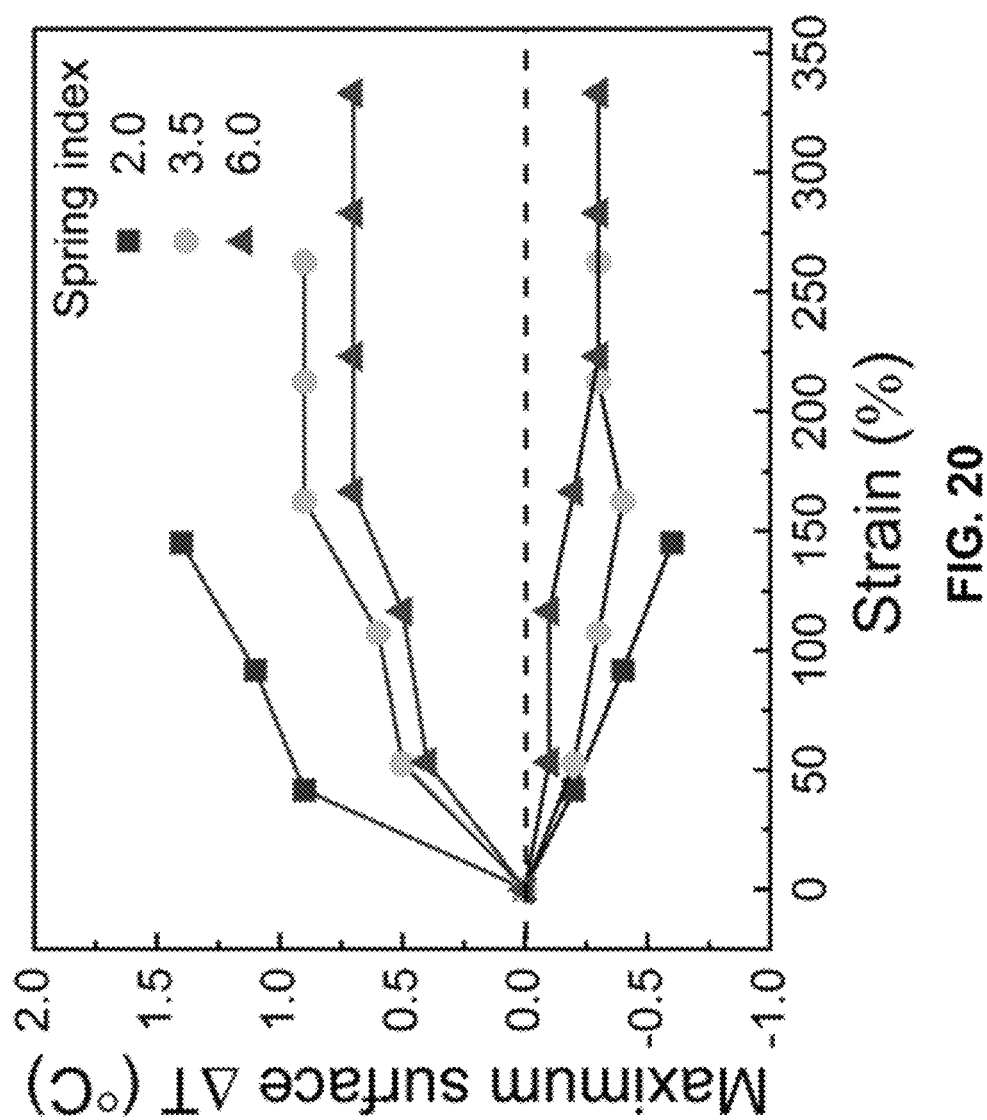
FIG. 20 is a graph showing comparison of the dependence of twistocaloric temperature changes on the applied tensile strain for homochiral, mandrel-coiled, low-strength PE fibers having different spring indices.

X-ray diffraction (XRD) measurements showed that self-coiling resulted in partial conversion of the orthorhombic phase of polyethylene to the monoclinic phase, and that thermally annealing the coiled yarn (120° C. for 2 h) largely reversed this transformation (FIG. 13B and FIG. 18B). However, there was little change in the twistocaloric cooling because of this thermal annealing (FIG. 18A) Upon stretching the non-annealed or thermally-annealed coiled yarn, the amount of monoclinic phase increases, and releasing stretch reverses this process. Based on relative integrated XRD intensities, 5.0% of the initial crystalline phase in the thermally-annealed coiled yarn is monoclinic, and this percentage reversibly increases to 6.8% at 10% stretch and 11.4% at 20% stretch.

Twistocaloric Cooling by Stretching Heterochiral Fibers

For all previously reported mechanocaloric polymers, stretch produces heating and stretch release produces cooling. By transitioning from homochiral fibers to heterochiral fibers, it was demonstrated fibers that cool during stretch and heat when stretch was released. To prevent cancelation of oppositely directed fiber twist and coiling in heterochiral coils, either a mandrel set or thermally set structure was used.

In an example of cooling during stretch, a self-coiled, 2.2-mm-diameter NR fiber was wound onto a mandrel to form a heterochiral spring with a spring index of 2.5. This was accomplished by wrapping a 2.2-mm-diameter, 30-cm-long, S-direction self-coiled NR fiber in the Z direction to make a supercoiled rubber fiber, which was heterochiral since the twist of self-coiling is opposite to the twist of mandrel coiling. The mandrel comprised a 0.6-mm-diameter monofilament nylon 6 fishing line that was helically wrapped with an identical nylon 6 fiber in the opposite direction as the NR supercoil to prevent coil interpenetration and then thermally set at 220° C. for one hour in vacuum. This mandrel was retained during twistocaloric measurements to prevent twist cancelation in the rubber fiber. As the rubber spring was stretched, the nylon spring of the mandrel simultaneously elongated by sliding on the central nylon fishing line. For comparison with twistocaloric measurements for the heterochiral supercoiled NR fiber, a homochiral supercoiled NR fiber was analogously prepared.

Elongating this supercoil by 200% decreased its maximum surface temperature by −0.8° C., and releasing this stretch increased its maximum surface temperature by +0.5° C. (FIG. 2F and FIG. 19A). For comparison, a homochiral NR fiber having the same spring index provided a surface-average heating of +0.5° C. on stretch and a surface-average cooling of −0.5° C. on stretch release. FIG. 2F and FIG. 19B. It is believed that the explanation for this opposite twistocaloric effect was that elongation of heterochiral coils caused untwist of the NR fiber, increasing the fiber's entropy, in contrast to the up-twist caused by stretching conventional homochiral coils. The heating component from rubber stretch during supercoil elongation was minimized by mandrel coiling a coiled NR fiber rather than a twisted NR fiber.

Figure 21:
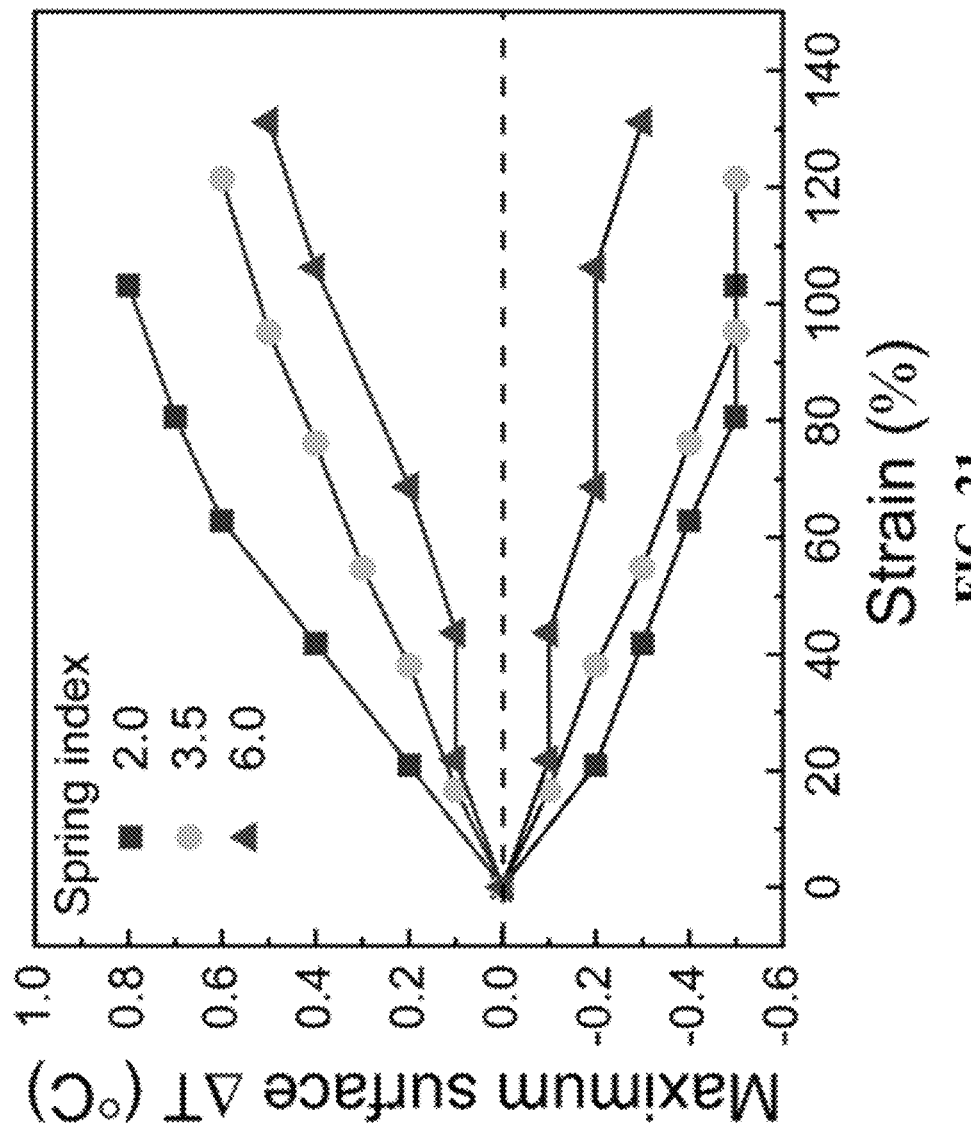
FIG. 21 is a graph showing comparison of the dependence of the maximum twistocaloric surface temperature changes on the applied tensile strain for homochiral, mandrel-coiled, thermally set nylon 6 fibers having different spring indices.
Figure 23B:
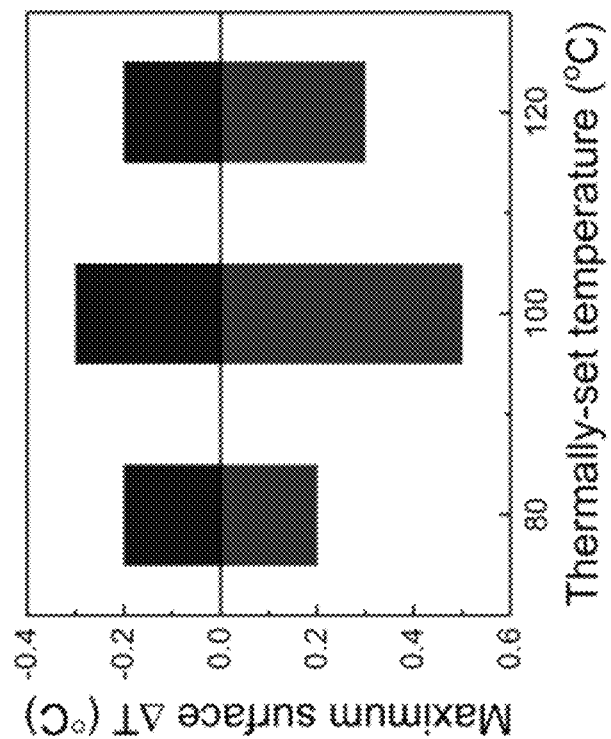
FIGS. 23A-23B show twistocaloric temperature changes on stretch and stretch release for a heterochiral coiled polyethylene fiber.
Figure 23A:
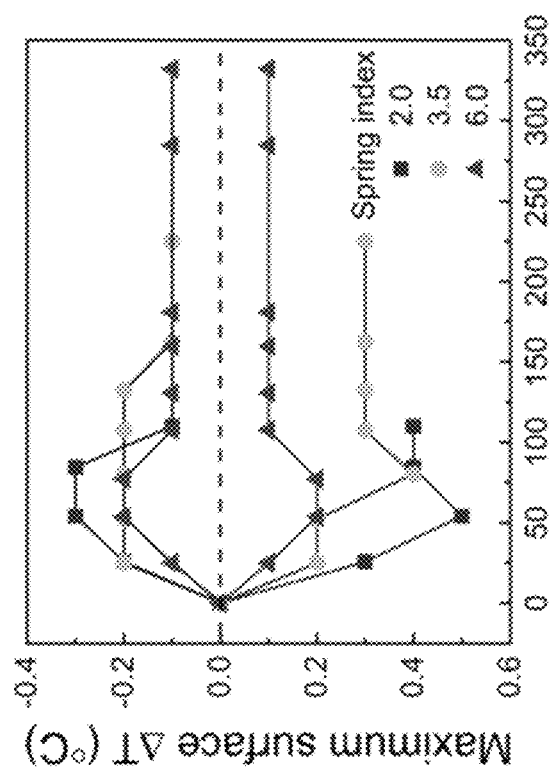

In contrast with NR fibers and high-strength, gel-spun polyethylene braided yarns, twisted nylon and low-strength melt-spun polyethylene monofilament fibers can be thermally set to avoid cancellation of the oppositely directed twist and coiling for a heterochiral structure. Unless otherwise indicated, this thermal anneal was for one hour in vacuum at 160° C. for nylon 6 and at 100° C. for the low strength polyethylene. The need for mandrel support was thereby eliminated. Unlike the case of the NR fiber, twisted nylon 6 and polyethylene fibers undergo little elongation (and associated heating) when stretched, so supercoiling was not needed to realize stretch-induced cooling. This cooling during stretch was largest for nylon 6 and polyethylene fibers having a spring index of 2.0, which was the lowest spring-index investigated (FIGS. 13C, 22A-22B, and 23A-23B). The maximum cooling during stretch and heating during stretch release were −0.6 and +0.5° C. for the nylon 6 fiber and −0.3 and +0.5° C. for the polyethylene fiber. In contrast to these inverse twistocaloric effects for the heterochiral fibers, the mandrel-coiled homochiral fibers displayed conventional tensile mechanocaloric behavior. For a spring index of 2, the maximum heating during stretch and cooling during stretch release were +0.8 and −0.5° C. for the nylon 6 fiber and +1.4 and −0.6° C. for the polyethylene fiber (FIG. 13C and FIG. 21).

Fibers that Cool when Plied

As discussed above, the twistocaloric fibers heat when twisted or plied, and cool when the fiber twist or the twist of plying is released. If fact, the above-described realization of coiled fibers that cool when stretched resulted from using heterochiral structure that untwist when stretched (rather than increasing twist, like in homochiral structures).

It has been discovered that plying animal hairs (including human hair, horsetail hair, yak hair and wool) induces cooling, and unplying these hairs induces heating. See TABLE II. TABLE II shows maximum surface temperature cooling and heating during isometrically plying and unplying different animal keratin fibers, respectively. The average diameter of human hair, yak hair, wool and pig bristle is ~0.08 mm, and the average diameter of the horse tail hair is 0.16 mm. The isometric strain is 0%. The twist densities at maximum cooling temperature for human hair, yak hair, wool, horse tail hair, and pig bristle (from a pig bristle brush) are 2, 2, 4, 2 and 2 turns/cm respectively.

TABLE II

| Keratin fibers | Cooling by plying (° C.) | Heating by unplying (° C.) | Number of plies |
| --- | --- | --- | --- |
| Human hair | −0.6 | +1.0 | 30 |
| Yak hair | −0.8 | +1.5 | 40 |
| Wool | −0.5 | +1.1 | 40 |
| Horse tail hair | −1.2 | +2.4 | 30 |
| Pig bristle | −0.7 | +1.8 | 30 |

Since these fibers contain keratin, and this keratin is likely the hair component that contributes most to refrigeration, other keratin containing materials that can be reduced to fiber or yarn form are attractive for twist fridges. FIGS. 24A-24B show that mechanocaloric cooling and heating were obtained by isometrically plying/unplying multiple horsetail fibers. Twist was inserted at 0% strain and at a rate of 50 turns/s. The animal hairs elongated during plying, thereby slightly buckling. Plying and unplying ten horse tail fibers provided highest cooling and heating, respectively. Mechanocaloric cooling occurred during plying, with maximum surface cooling of −0.8° C. and average surface cooling of −0.7° C. with inserted twist of 2 turns/cm. Mechanocaloric heating occurred, with maximum surface heating of +2.3° C. and average surface heating of +1.1° C. during removing 5 turns/cm of inserted twist.

Torsional Mechanocaloric Cooling by Twisting and Plying NiTi Wires

While NiTi shape memory wires have been intensively investigated for practical elastocaloric cooling, mechanocaloric temperature changes from torsion have not been reported. It has been discovered that large, reversible temperature changes result from twist insertion and removal from a single NiTi shape memory wire, and from plying and unplying these wires. The investigated 0.7-mm-diameter $Ni_{52.6}Ti_{47.4}$ wires (from Baohong Metal Material Co., Ltd.) had transition temperatures of −29.0° C. (start) and 15.0° C. (finish) for the martensite-to-austenite transition during heating, and 13.5° C. (start) and −44.6° C. (finish) for the austenite-to-martensite transition during cooling.

Figure 25C:
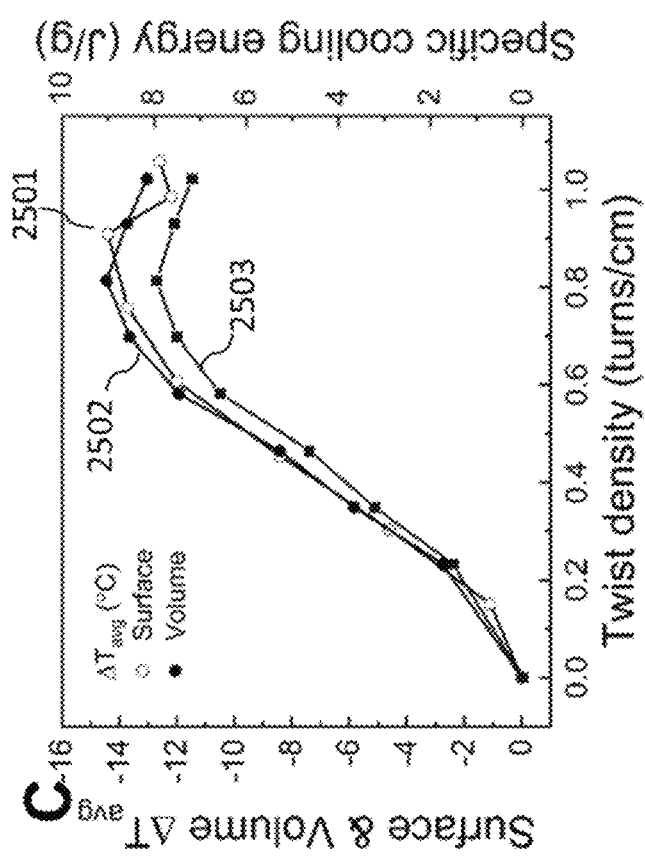
Figure 28:
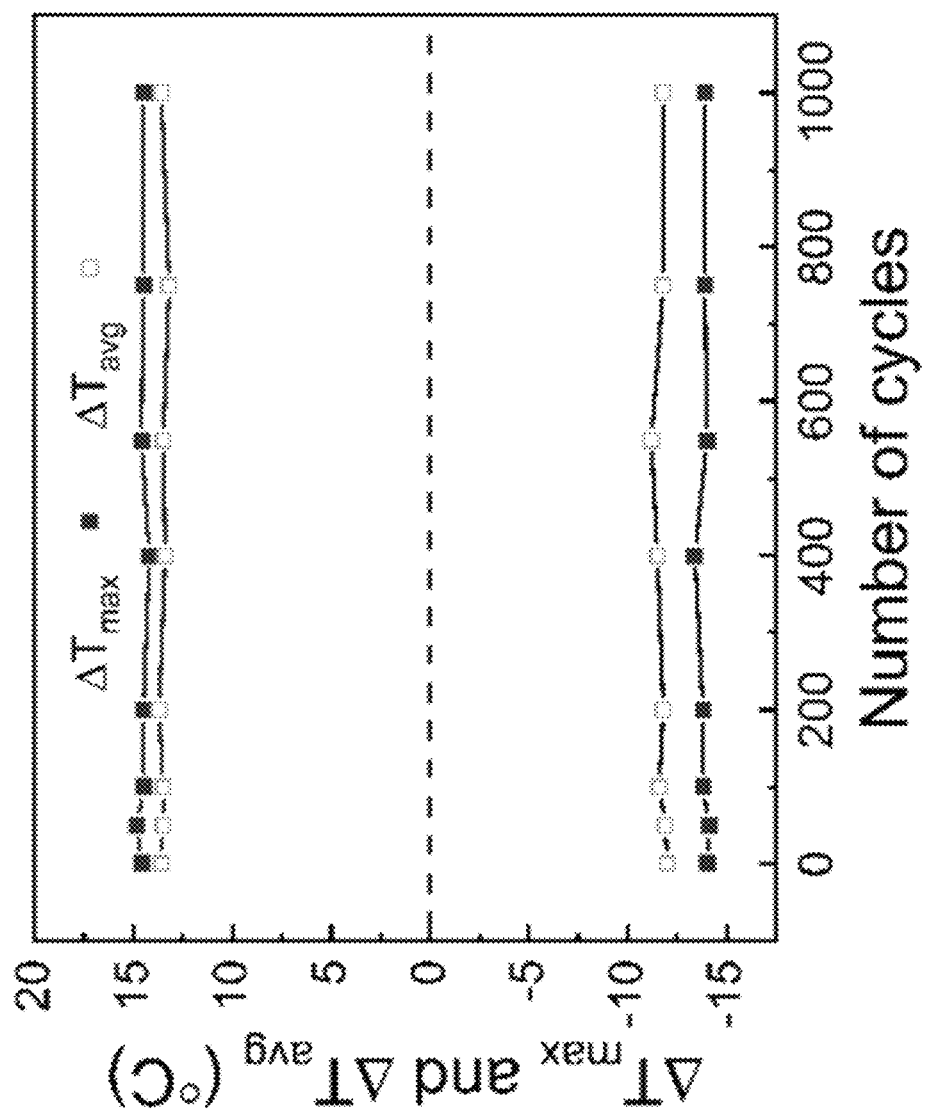
FIG. 28 is a graph showing the maximum and average surface temperature changes during 1000 cycles of quasi-isometric twist insertion and twist removal up to 0.6 turns/cm of twist for a 0.7-mm-diameter NiTi wire. This experiment is quasi-isometric, even though the separation between wire ends was kept constant, since the length of the NiTi wire increases during twist insertion, causing wire buckling.

Twistocaloric heating and cooling were obtained by twisting/untwisting single NiTi wires and plying/unplying multiple NiTi wires. See FIGS. 25A, 25C, 26A-26D and 27. The non-twisted NiTi started in the austenitic phase at 26° C. ambient temperature. See FIG. 25B. Twisting occurred isometrically at 0% strain and a rate of 50 turns/s until high twist insertion, where the twisted wire and the plied wires elongate, thereby slightly buckling. A single NiTi wire provided −17.0° C. (maximum) and −14.4° C. (average) surface cooling during untwisting, and four-plied NiTi wires yielded even higher surface cooling during unplying (−20.8° C. maximum and −18.2° C. average) (FIG. 25A and 26A-26D), as compared with −17.0° C. cooling during stretch release for the same NiTi wire. Twistocaloric temperature changes on twist insertion and release were stable over the investigated 1000 cycles of isometrically inserting and removing 0.6 turn/cm of twist (FIG. 28). As shown in FIG. 25B, XRD results demonstrated reversible austenite/martensite conversion during twisting/untwisting a NiTi wire. Since this conversion is incomplete, there is an opportunity to increase twist-induced cooling by optimizing the NiTi composition and the operating temperature range of the cooler.

An apparatus that is nearly identical to that of FIG. 29A was used to measure the specific cooling energy of a NiTi wire during quasi-isometric twist removal. A 0.7-mm-diameter NiTi wire was placed in the center of a 6.5-cm long polypropylene (PP) tube which was sealed at the bottom, like shown in FIG. 29A. The inner and outer diameters of the PP tube were 2.0 and 4.0 mm, respectively. The NiTi wire was tethered at the bottom end and attached to the eighty-step servo motor at the top end. Then the PP tube was filled with water to a height of 6 cm. Twist was quasi-isometrically inserted and removed at near zero strain at a rotation speed of 15 turns/s using the servo motor.

During twist removal, the temperatures of the water and the PP tube decreased to maximum cooling, and then slowly increased as the system equilibrated to the environmental temperature. See FIG. 30A. The specific cooling energy of the NiTi wire, as a function of released twist density, was obtained from the thermal-loss-corrected cooling temperature of the water (which was approximated to be identical to the temperature of the NiTi wire) and the thermal-loss-corrected average cooling of the PP tube (FIG. 30B). This approximation has little effect on the derived specific cooling energy of the NiTi wire, since the thereby-calculated residual cooling energy in the NiTi wire was from 6.3% to 7.1% of the sum of the cooling energies in the water and in the PP tube. More specifically, based on the thermal conductivity, heat capacity, and density [Zanotti 2009; Mañosa 2017] of NiTi wire, a 0.7-mm-diameter NiTi wire will internally thermally equilibrate within 6 ms, while the time for twist release was between 65 and 455 ms. The heat capacities used for these calculations for the NiTi wire, the PP tube, and the water were 0.55, 1.80, and 4.18 $JK^{-1}g^{-1}$, respectively.

The thermal conductivity of NiTi wire is so high that equilibration within this wire occurred during twist release at 15 turns/s. Hence, as shown in FIG. 25C, the optically-measured surface-average cooling upon untwisting a NiTi wire essentially equaled the volume-average cooling that was derived from the specific cooling energy of this wire, which was measured calorimetrically like done for the NR fibers. These measurements (FIG. 25C) provided a maximum specific cooling energy of 7.9 J/g on twist release, which is within the range of cooling energies that are derived from the reported cooling of NiTi wires and sheets from room temperature [Cui 2012; Quarini 2004; Pieczyska 2006; Ossmer 2013; Tušek II 2016] during stretch-release (5.0 to 9.4 J/g) and for release of 6% stretch from the above-described NiTi composition when no twist is introduced (9.4 J/g).

Shape memory alloy fibers that have high performance for twist fridges are generally the same as those that provide high performance for barocaloric and elastocaloric refrigerators. Such materials can be found in literature reports. [Cong 2019; Chauhan 2015]. Ferroelastic Ni—Mn—Ti alloys [Cong 2019] are particularly useful for twist fridges.

Since twist insertion into shape memory alloys or polymers can reduce the hydrostatic pressures or tensile stresses needed for refrigeration cycles that involve hydrostatic pressure or tensile stress changes, this twist insertion can be used to make these processes more attractive. Application of a static hydrostatic pressure can increase twistocaloric cooling by a twist-insertion/twist-removal process, by a stretch/stretch-release process for fibers or yarns, and by combinations thereof. Ferroelectric polymers and magnetocaloric wires and yarns are also useful for twist fridges, since they can provide dipolar and magnetic contributions to refrigeration.

Device for Refrigeration of Flowing Water by Untwisting Plied NiTi Wires

Figure 31:
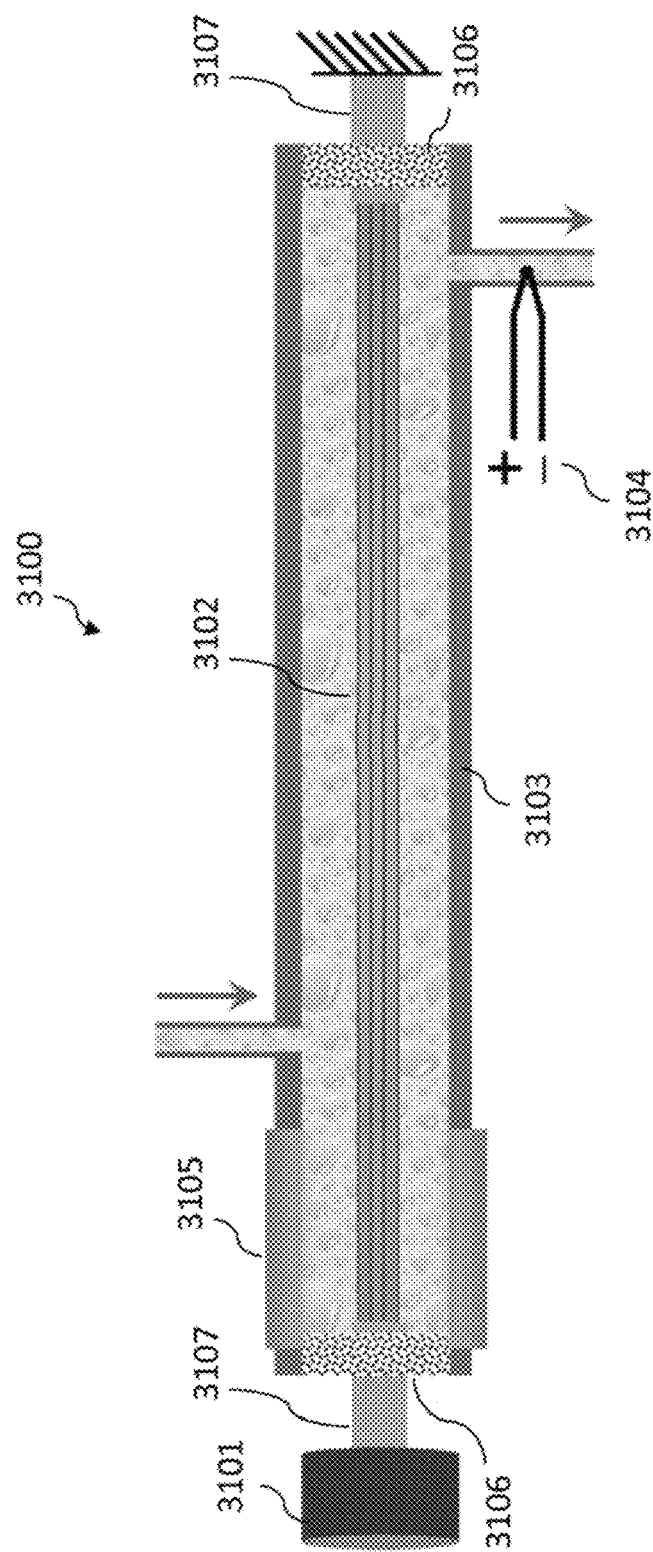
FIG. 31 is a schematic illustration of the apparatus for cooling flowing water by unplying NiTi wires.

The apparatus 3100 illustrated in FIG. 31 was used for refrigeration of continuously flowing water by isometric twist removal from plied NiTi wires. The components are (a) a 80-step servo motor 3101, (b) plied NiTi wires 3102, (c) a PP tube 3103 filled with water, (d) a thermocouple 3104 for measuring the water temperature in the outlet pipe, (e) the rubber tube 3105 that seals the PP-tube water chamber, while still allowing twisting of the NiTi wires, (f) the epoxy resin 3106 that seals both ends of the PP tube, and (g) clamps 3107 for attaching the plied NiTi wires to the motor and for torsional tethering.

Three-ply, 11.1-cm-long, 0.6-mm-diameter NiTi wires were inserted into a 10.3-cm long polypropylene (PP) tube. The inner and outer diameters of the PP tube were 1.2 and 1.8 mm. One end of the NiTi wire was torsionally tethered using a clamp, and the other end of the NiTi wire was connected to an eighty-step server motor for twist insertion and twist removal. Both ends of the PP tube were sealed by a cyanoacrylate resin in order to prevent water leakage from this horizontally operated refrigerator. To enable plying and unplying of the NiTi wires, a 10-mm-length of the PP tube was removed, and replaced by a NR tube. The NR tube had inner and outer diameters of 1.5 and 3.0 mm. To provide inlet and outlet pipes for water flowing through the PP tube, two holes were drilled into the PP tube and 0.8-mm-diameter polyethylene tubes were inserted into the two holes and glued in place. A peristaltic pump (model AB55, Goso technology Co., Ltd.) was used for pumping water at a constant flow rate of 0.04 ml/s. Two thermal couples (K-type, 0.1 mm in diameter) were used for temperature measurements. The first thermal couple was inserted into the polyethylene outlet tube for the flowing water (1 mm away from the PP tube). The second thermal couple was attached to the exterior of the PP tube.

Twist was isometrically inserted into the NiTi wires using the servo motor at a rotation speed of 50 turns/s. The temperatures of the water and the PP tube increased to a maximum value, and then decreased to room temperature. Then the inserted twist was isometrically removed using the servo motor at a rotation speed of 50 turns/s to form non-twisted NiTi wires. The temperatures of the water and the PP tube decreased, and then slowly equilibrated to room temperature. The specific cooling energy of the NiTi wires as a function of twist density could be obtained from the cooling of water and the cooling of the PP tube during twist removal from the NiTi wires.

Figure 32:
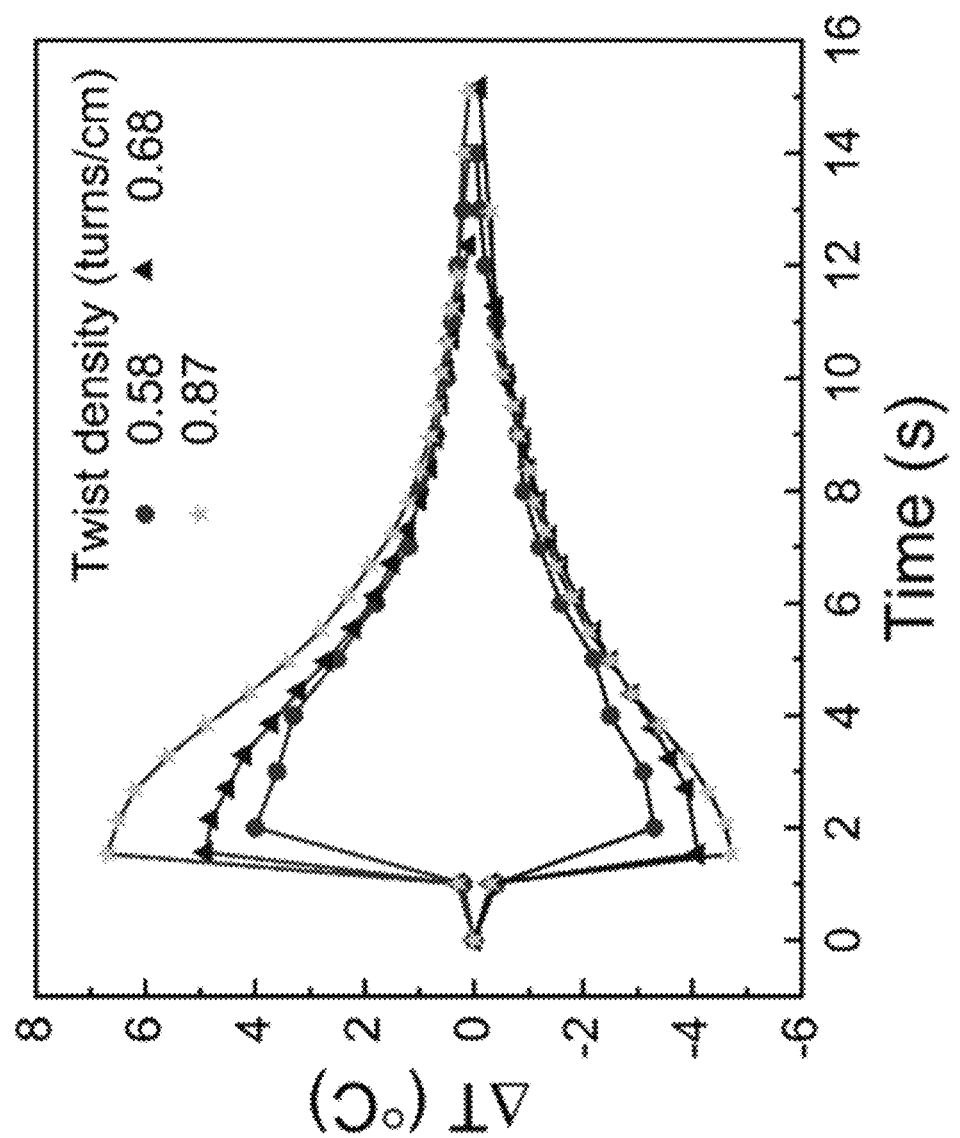
FIG. 32 is a graph showing the time dependence of outlet water temperature for isometric twist insertion and twist removal of three-ply, 0.6-mm-diameter NiTi wires at a water flow rate of 0.04 mL/min using the apparatus in FIG. 31.

FIG. 32 shows the time dependence of outlet water temperature for a water flow rate of 0.04 mL/s in the apparatus of FIG. 31. Water heating and cooling were produced by isometrically twisting and untwisting three-ply, 0.6-mm-diameter NiTi wires having twist densities of 0.58, 0.68 and 0.87 turns/cm. During twist insertion, the outlet water temperature quickly increased to a peak value and then slowly cooled to room temperature, which indicated that the water flow was carrying the generated heat out of the system. A similar time dependence of water cooling was observed during the twist-release process. The maximum heating and cooling temperatures of flowing water (6.7° C. and −4.7° C., respectively) were obtained by inserting the maximum twist (0.87 turns/cm) into the NiTi wires. While the rubber tube that was used in the device of FIG. 31 to enable twist of the NiTi wire was also a twistocaloric material, experiments in which the NiTi wire was replaced by a cotton yarn fiber showed that this rubber tube contributed at its peak only −0.07° C. to water cooling.

The dependence of the experimentally derived specific cooling energy from unplying NiTi wires on the ratio of water flow length (the separation between water inlet and water outlet) to the total twisted length of the NiTi wire was evaluated. The water-flow length was kept constant (at around 5.5 cm) while the length of the twisted NiTi wire was varied. As shown by the results in TABLE III, the ratio of flow length to plied wire length had little effect on the derived specific cooling energy and the thereby-derived volume-average cooling of the NiTi wires. As this ratio decreased from 61.6% to 35.4%, the specific cooling energy varied only between 6.60 and 6.88 J/g.

TABLE III shows the effect of the ratio of water flow length (~5.5 cm) to total plied NiTi wire length for measurements conducted using constant flow length and flow rate.

TABLE III

| | | | |
|---|---|---|---|
| NiTi wire length (cm) | 15.8 | 10.3 | 9.0 |
| Ratio of flow length to wire length (%) | 35.4 | 58.2 | 61.6 |
| Ratio of water length in tube to wire length (%) | 72 | 73 | 78 |
| Maximum cooling of water (° C.) | 4.7 | 4.7 | 4.1 |
| Mass ratio of water in tube to NiTi alloy | 0.0375 | 0.0345 | 0.0401 |
| Specific cooling energy of NiTi wire (J/g) | 6.88 | 6.75 | 6.60 |
| Volume average cooling of NiTi wire calculated from cooling energy (° C.) | 12.5 | 12.3 | 12.0 |

In summary, the above results demonstrate a device (FIG. 31) that enables the cooling of a steam of flowing water by the quasi-isometric unplying of a three-ply NiTi wire cable. By flowing ambient-temperature water over a three-ply NiTi wire cable during removal of 0.87 turns/cm of plying, the water was cooled by up to −4.7° C. See FIG. 32. Integrating the energy of water cooling until the water stream returned to ambient temperature provided a specific cooling energy of 6.75 J/g for the NiTi wire. See TABLE III. This high specific cooling energy, which ignores loss of cooling energy to the device, indicated that much of the cooling energy of the NiTi wire has been used to cool the water.

To increase the cooling of flowing water, two twistocaloric coolers were connected in series. The configuration for each cooler was similar to that shown in FIG. 31. The serial connection of these coolers is shown in device 4100 of FIG. 41A. The coolers include motors 4101, torsional tethers 4102, and rubber tube seals 4013, with one cooler having a water inlet 4104, and the other cooler having a water outlet 4105 and a thermocouple 4106. Each cooler contains three-ply, 14.0-cm-long, 0.6-mm-diameter NiTi wires, which are inserted into a 9.5-cm long polypropylene tube (inner diameter of 1.5 mm and outer diameter of 3.0 mm). Including the elongation resulting from the rubber interconnect used to enable twist of the NiTi wires, the water-filled part of the cooler was 14 mm long. To minimize heat exchange with the environment, the polypropylene tube was wrapped with polyethylene sponges. A 2-mm-long polypropylene tube (inner diameter of 0.8 mm and outer diameter of 1.5 mm) was used to connect the outlet of the first cooler and the inlet of the second cooler. The connection was sealed using epoxy resin.

Figure 41A:
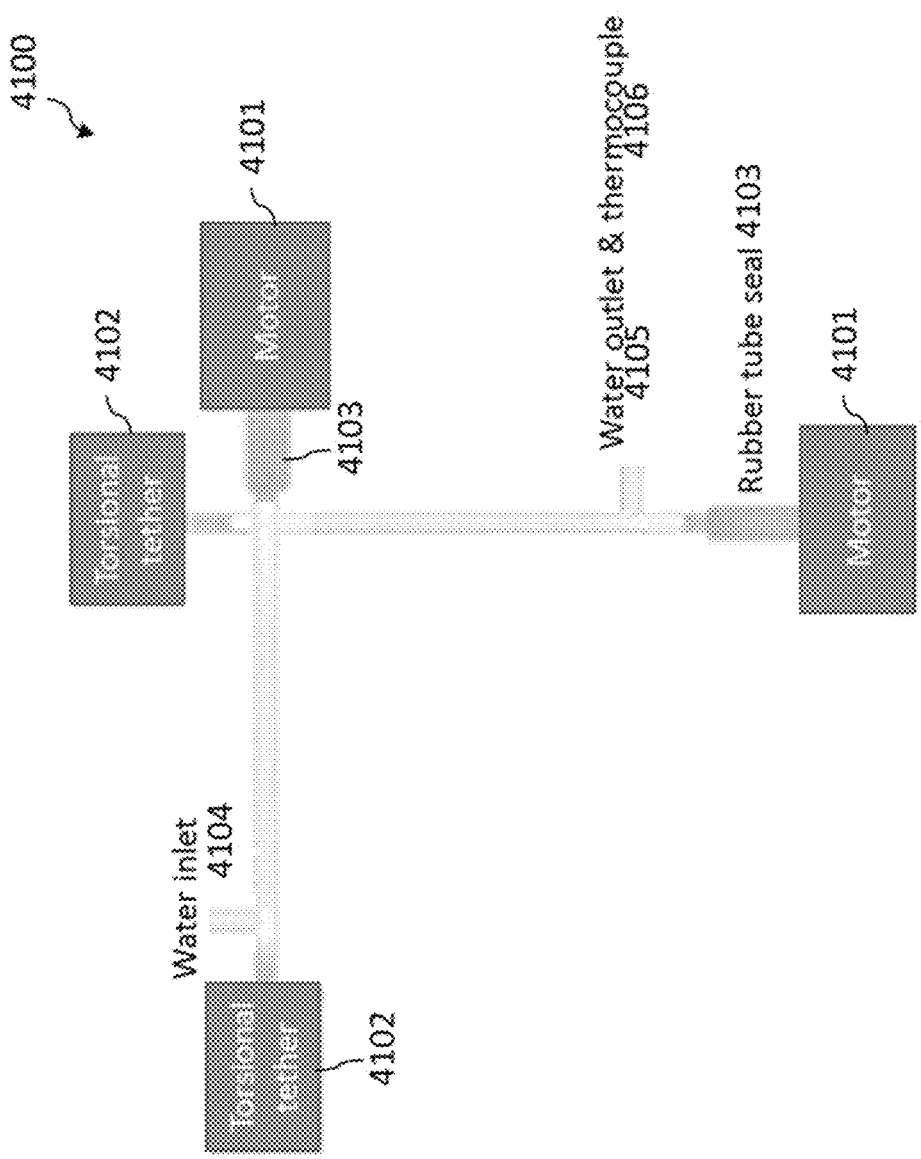
FIG. 41A is a schematic illustration of two serially connected coolers for cooling flowing water by unplying NiTi wires.
Figure 41B:
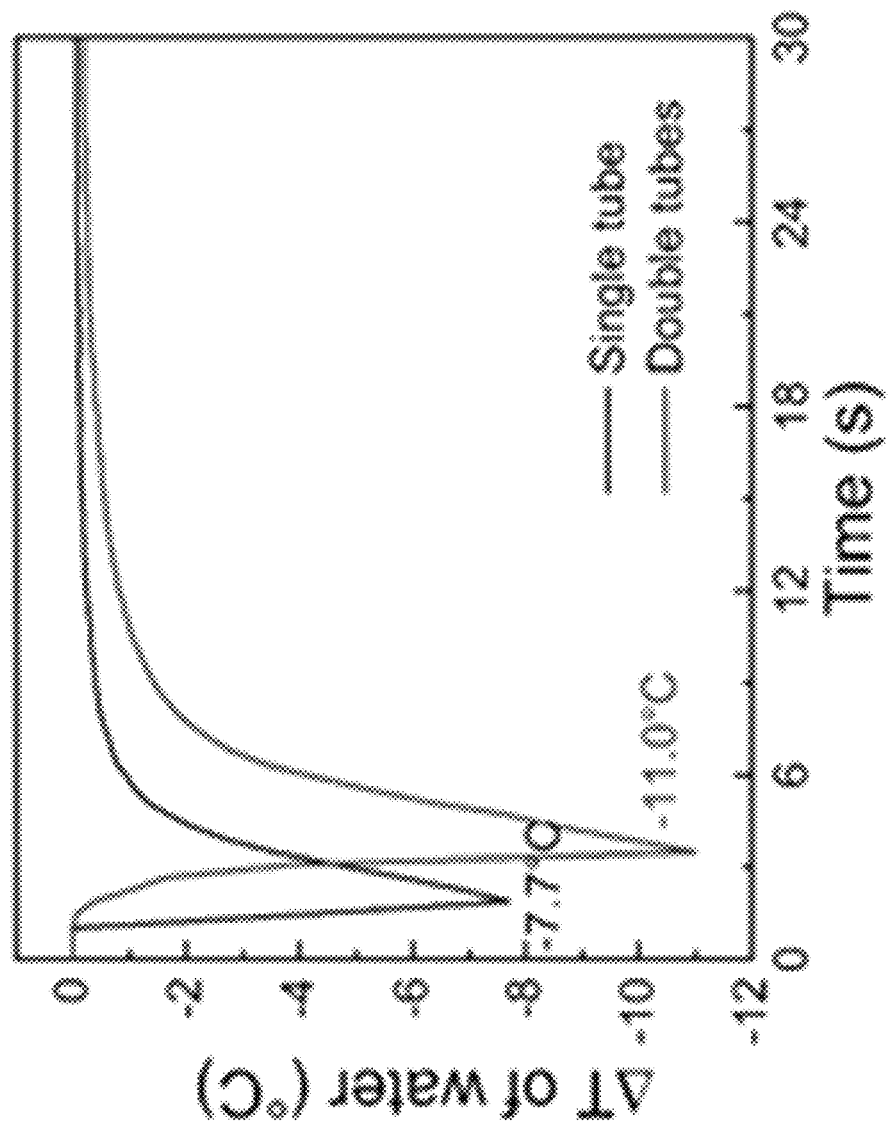
FIG. 41B is the time dependence of the outlet water temperature change produced by the serial coolers of FIG. 41A when three-ply, 0.6-mm-diameter NiTi wires are unplied and the water flow rate was 0.05 mL/s.

FIG. 41B shows the time dependence of the change in outlet water temperature that was obtained for the serial-cooling apparatus of FIG. 41A and for a single cooler when the water flow rate was 0.05 mL/s. For a single cooler, a maximum cooling temperature of 7.7° C. was obtained by removal of 0.86 turns/cm of twist from the plied NiTi wires, which corresponds to a specific cooling energy of 7.25 J/g. The maximum cooling temperature of flowing water was 11.0° C. for two series-connected coolers. This cooling was obtained by removing 0.86 turns/cm of twist from each set of plied NiTi wires. The corresponding specific cooling energy was 7.28 J/g.

Figure 25D:
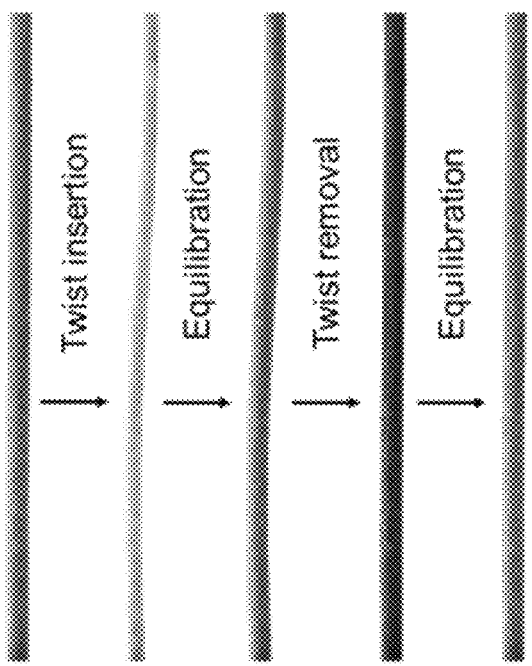
Figure 26A:
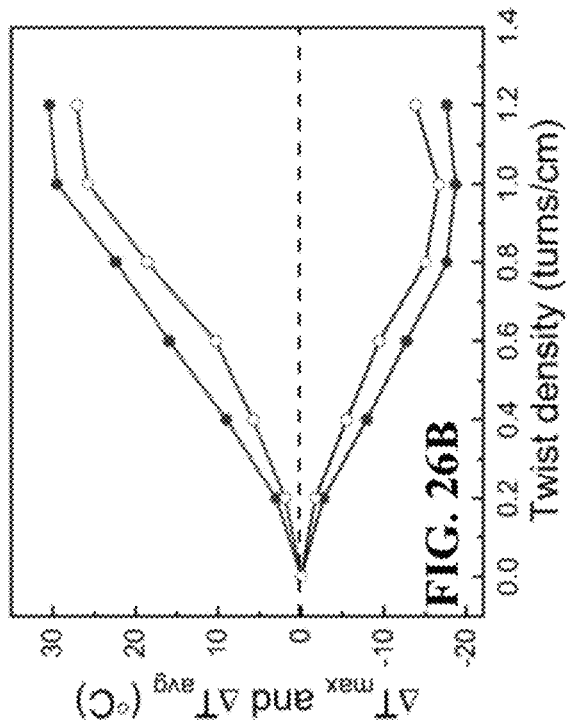
FIGS. 26A-26D are graphs showing the maximum (filled symbols) and average (open symbols) surface temperature changes as a function of twist density for (FIG. 26A) quasi-isometric twisting and untwisting a single NiTi wire, and for quasi-isometric plying and unplying (FIG. 26B) two-ply NiTi wires, (FIG. 26C) three-ply NiTi wires, and (FIG. 26D) four-ply NiTi wires.
Figure 26B:
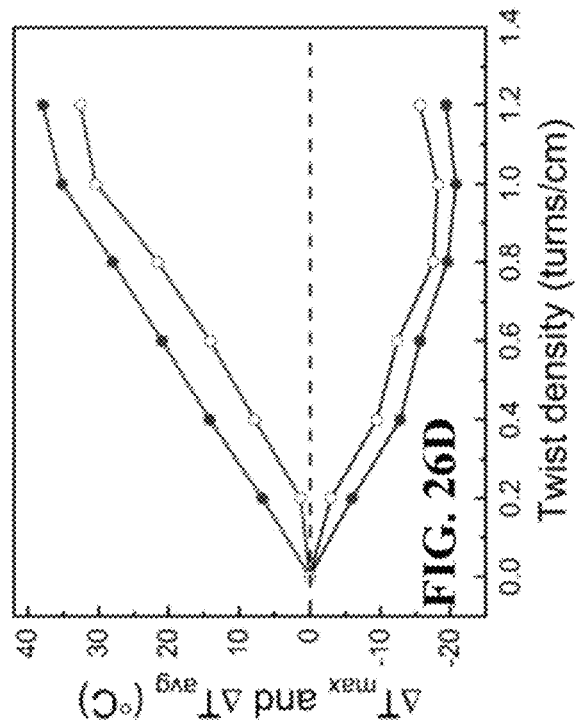
Figure 26C:
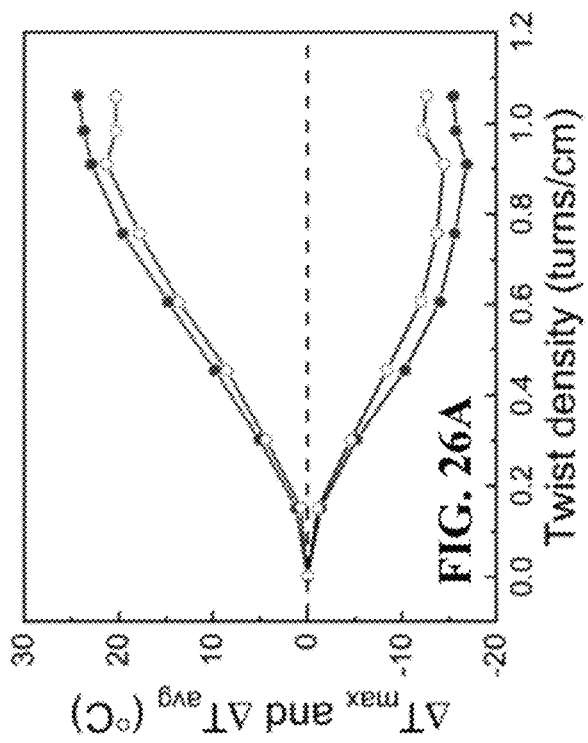
Figure 26D:
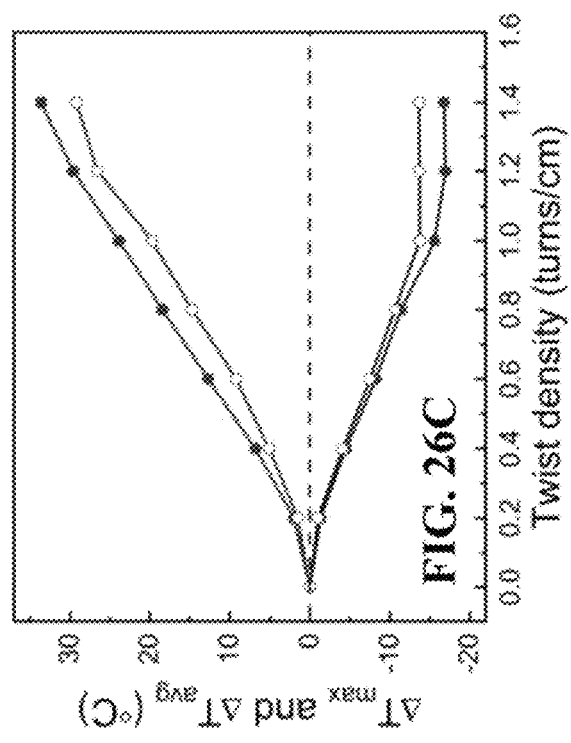
Figure 27:
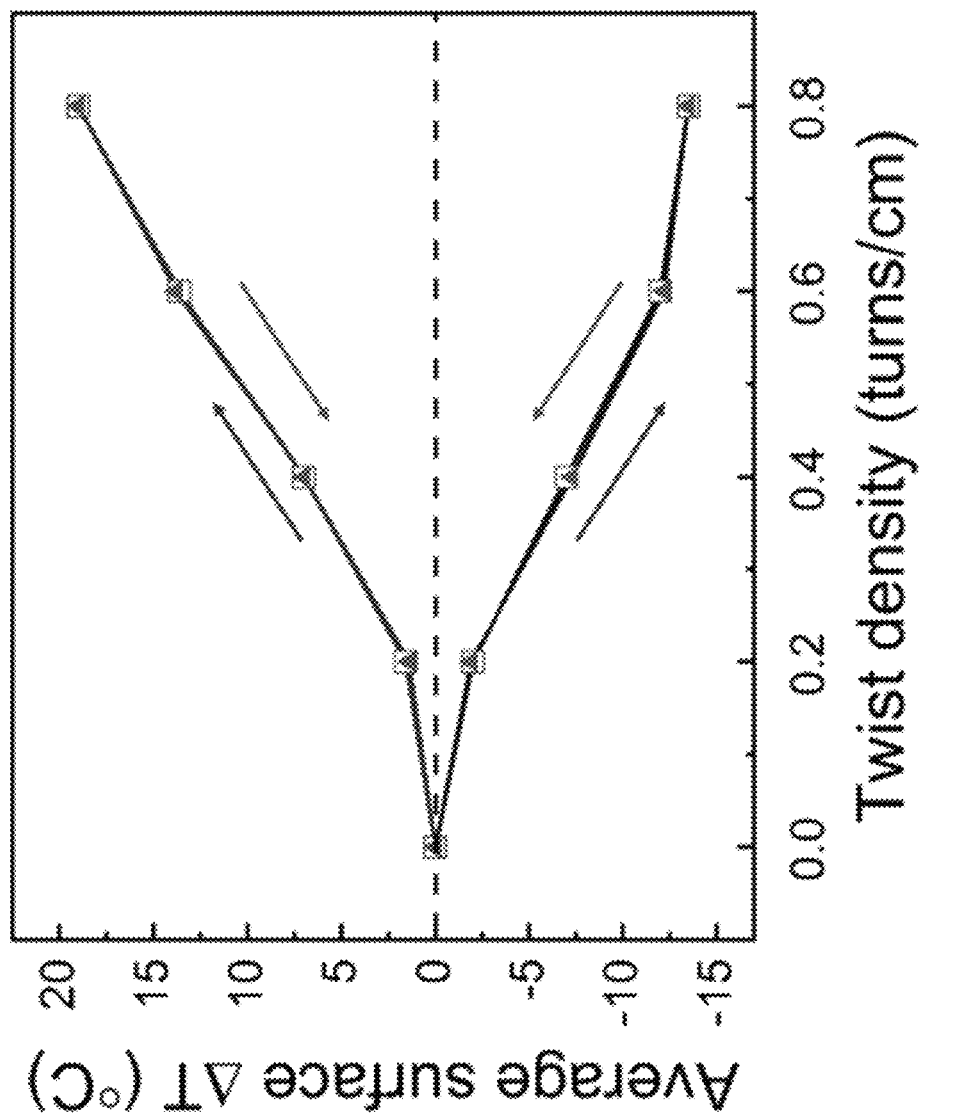
FIG. 27 is a graph showing the dependence of average twistocaloric surface temperature changes on twist density for a 0.7-mm-diameter single NiTi wire. The open squares are for twist insertion and twist removal steps that progressively increase in twist level and the closed triangles are for twist insertion and twist removal steps that progressively decrease in twist level.

As shown in FIG. 25D, the twist-produced temperature changes of a NiTi wire were used to provide visible indication of torsional rotation. This demonstration was enabled by coating a NiTi wire with a thermochromic paint that changes color from orange-to-yellow at 31° C., and from orange-to-green at 15° C. Twist-induced heating changes the color from orange at room temperature to yellow, and untwist-induced cooling changes the color from orange to green.

Twistocaloric Cooling and Heating Using Coiled Hollow Fibers

Since the twistocaloric cooling of a layer within a twisted or coiled fiber increases with increasing radius within a fiber, transitioning from solid fibers to hollow fibers can increase the ratio of surface-average cooling to volume-average cooling. Also, fluid flow within a hollow fiber can be used for heat transfer to-and-from the fiber. For evaluating these, the following materials were used: hollow NR fibers from inner and outer diameters of 2.0 and 5.0 mm, respectively, from Tianjin Zhixin Rubber Products Co., Ltd; hollow nylon 6 fishing line (Model 6.0 from SENSA Co., Ltd.); hollow nylon 6 fiber (Model 58027 from Hudson Extrusion Inc.); and hollow polytetrafluoroethylene fiber (PTFE, Manjialong Inc.).

Figure 33A:
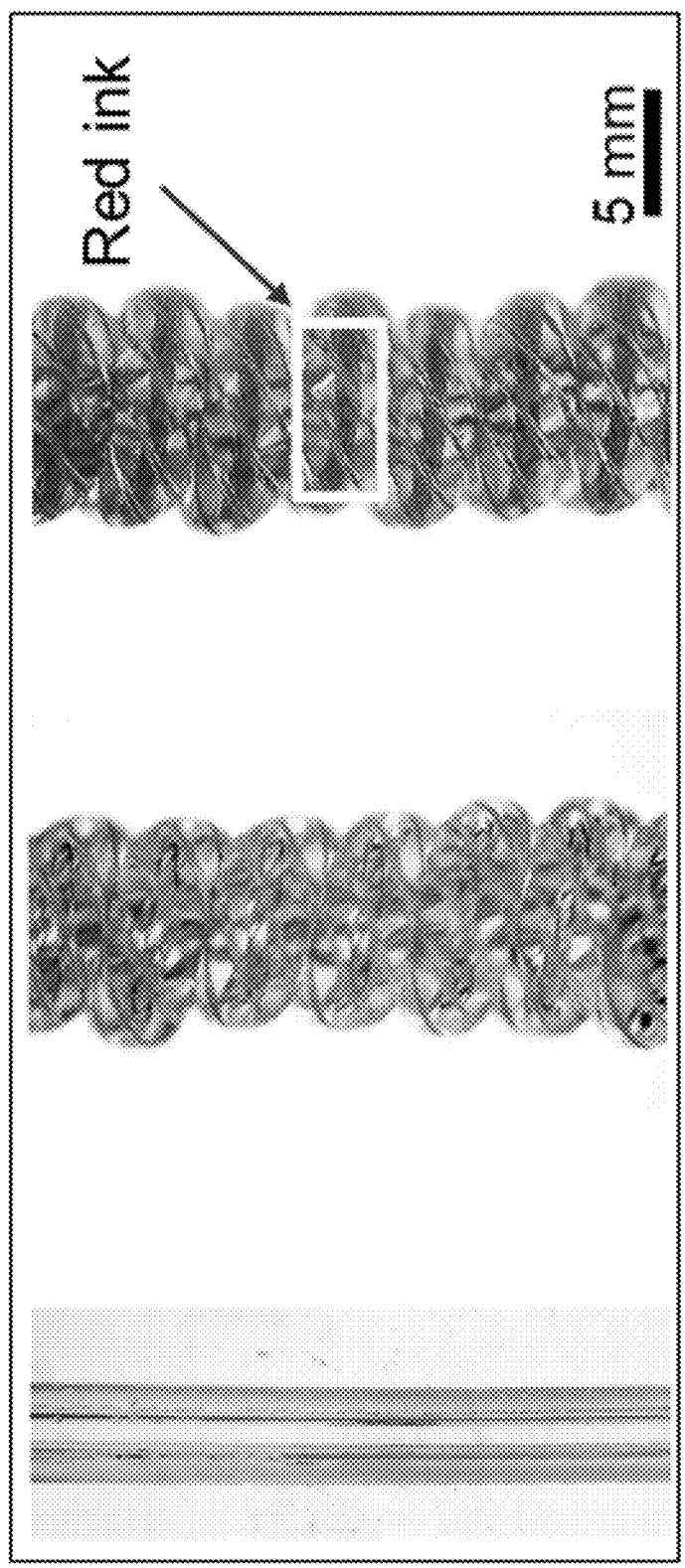
FIG. 33A is photographs of hollow nylon 6 fibers before twist insertion (left), after self-coiling (middle), and after self-coiling while filled with red ink (right). The fishing line was dyed green by the manufacturer in order to make it less visible to fish.

A 25-cm-long, hollow nylon 6 fishing line fiber (SENSA Co., Ltd.), which is shown in FIG. 33A, was used for initial experiments. The inner and outer diameters of the nylon 6 tube were 100 and 400 μm, respectively. These hollow fibers were fully self-coiled by twist insertion under different isobaric loads to produce different spring index coils. Since the resulting self-coiled nylon 6 hollow fibers were not collapsed or noticeably flattened by coil insertion, they enabled the free flow of injected liquids, as shown in FIG. 33A.

Like previously indicated, this spring index is defined as $(D_1-D_0)/D_0$, where $D_1$ is the outer diameter of the polymer coil and $D_0$ is the outer diameter of the hollow fiber within the coil (as measured optically). By inserting 11.5, 11.2, and 10 turns/cm of twist under loads of 24.9, 16.6, and 12.4 MPa, respectively, fully-coiled hollow fibers having spring indices of 1.0, 1.2, and 1.4, respectively, were obtained. Under these respective stresses, which are normalized to the cross-sectional area occupied by the polymer, the lengths of these coiled fibers were 5.9, 5.2, and 4.5 cm, respectively.

Figure 33B:
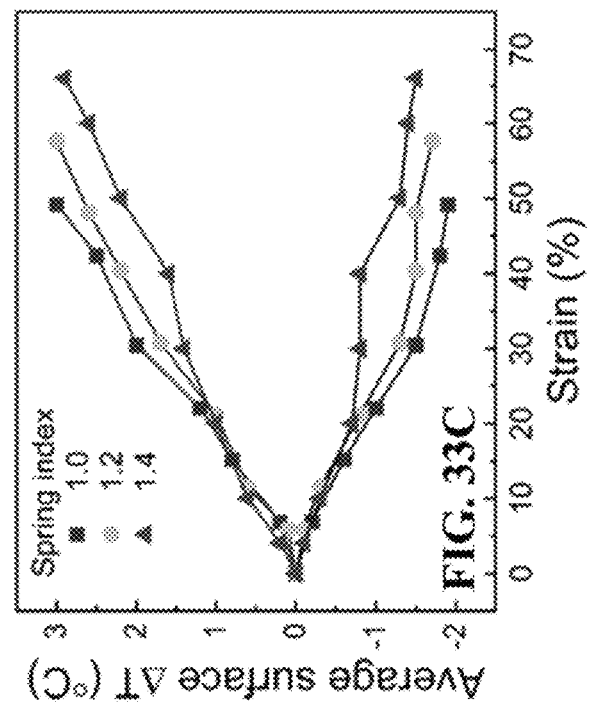
FIGS. 33B-33C are graphs showing the dependences of (FIG. 33B) maximum twistocaloric temperature changes and (FIG. 33C) average twistocaloric temperature changes on applied tensile strain for self-coiled hollow nylon 6 fibers having different spring indices for an ambient temperature of 25.6° C.
Figure 33C:
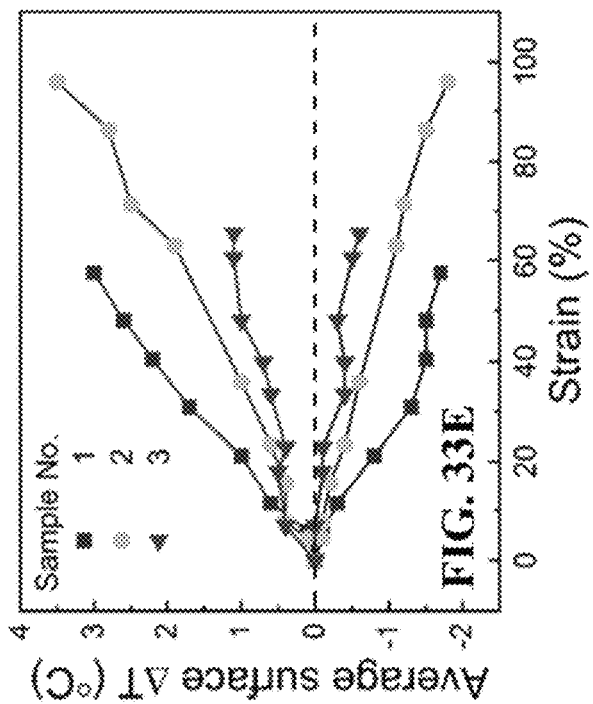

FIGS. 33B-33C show, for a stretch and stretch release rate of 42 cm/s and an ambient temperature of 25.6° C., the tensile strain dependences of heating during stretch and cooling during stretch release that result for coiled hollow fibers having different spring indices. Note that the fiber stretch that can be inserted without causing rupture of the hollow fiber (66%, 58%, and 49%) decreased with decreasing spring index (1.4, 1.2, and 1.0, respectively). For these hollow fibers having spring indices of 1.4, 1.2, and 1.0, the maximum heating during stretch were +4.6, +4.2, and +3.5° C., respectively; the maximum cooling during stretch release were −2.2, −2.6, and −2.2° C., respectively; the average heating during stretch were +2.9, +3.0 and +3.0° C., respectively; and the average cooling during stretch release were −1.5, −1.7, and −1.9° C., respectively.

Figure 33D:
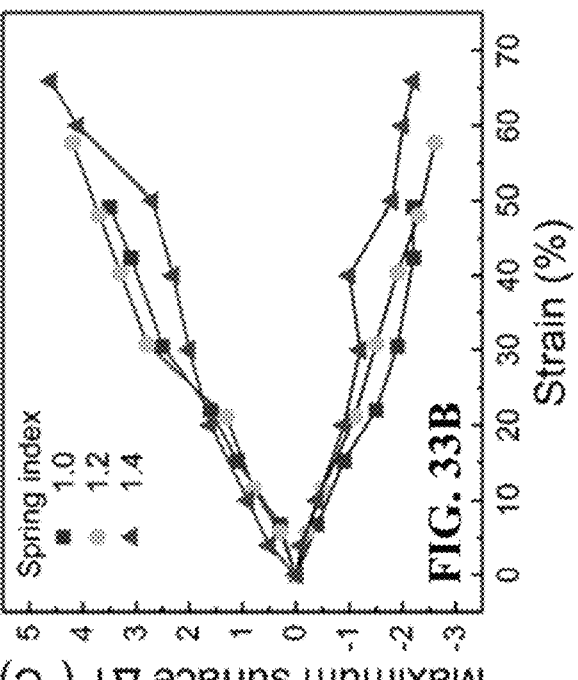
FIGS. 33D-33E are graphs showing comparison of the strain dependences (FIG. 33D) of the maximum twistocaloric surface temperature changes and (FIG. 33E) the average twistocaloric surface temperature changes for a self-coiled, non-annealed hollow nylon 6 fiber (sample 1) and for self-coiled hollow nylon 6 fiber that has been annealed for 2 hours at 180° C. (samples 2 and 3). Both ends of samples 1 and 2 are tethered, and one end of sample 3 is made free to rotate during stretch and stretch release, by tethering to a cotton yarn. The spring index of the different samples was 1.2.
Figure 33E:
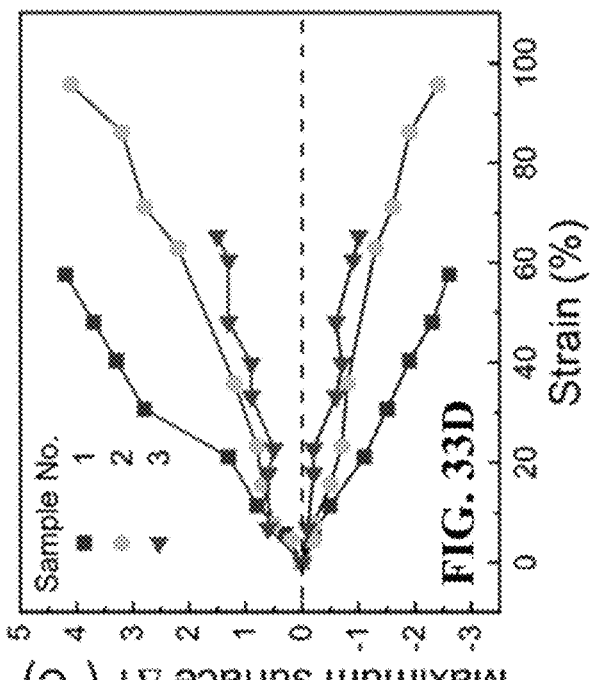

FIGS. 33D-33E show, for a stretch and stretch release rate of 42 cm/s and an ambient temperature of 25.6° C., the tensile strain dependences of heating during stretch and cooling during stretch release that resulted for a self-coiled, non-annealed hollow nylon 6 fiber (sample 1) and for self-coiled hollow nylon 6 fiber that had been annealed for 2 hours at 180° C. (samples 2 and 3). Samples 1 and 2 were both-end tethered, and one end of sample 3 was tethered and the other end was free to rotate during stretch and stretch release, by tethering to a cotton yarn. Note that the fiber stretch that can be inserted without causing rupture of the hollow fiber was 58%, 96%, and 65%, for samples 1, 2, and 3, respectively. For these self-coiled hollow fibers having a spring index of 1.2, the maximum heating during stretch were +4.2, +4.1 and +1.5° C., respectively; the maximum cooling during stretch release were −2.6, −2.4, and −1.0° C., respectively; the average heating during stretch were +3.0, +3.5 and +1.1° C., respectively; and the average cooling during stretch release were −1.7, −1.8, and −0.6° C., respectively.

Homochiral coiled hollow nylon 6 fibers with different spring indices were produced by wrapping S-twisted hollow nylon 6 fibers in the S direction around steel rods having different diameters (0.4, 1.0, and 2.0 mm), and then annealing under vacuum at 180° C. for 2 hours. The inner diameter, outer diameter, and length of the hollow nylon 6 fiber before twist insertion were 100 μm, 400 μm, and 20 cm, respectively. As before, the spring index of the coiled hollow fiber is defined as $(D_1-D_0)/D_0$, where $D_1$ is the outer diameter of the polymer coil and $D_0$ is the outer diameter of the hollow fiber within the coil. Heterochiral coiled hollow nylon 6 fibers were analogously prepared.

Figure 34A:
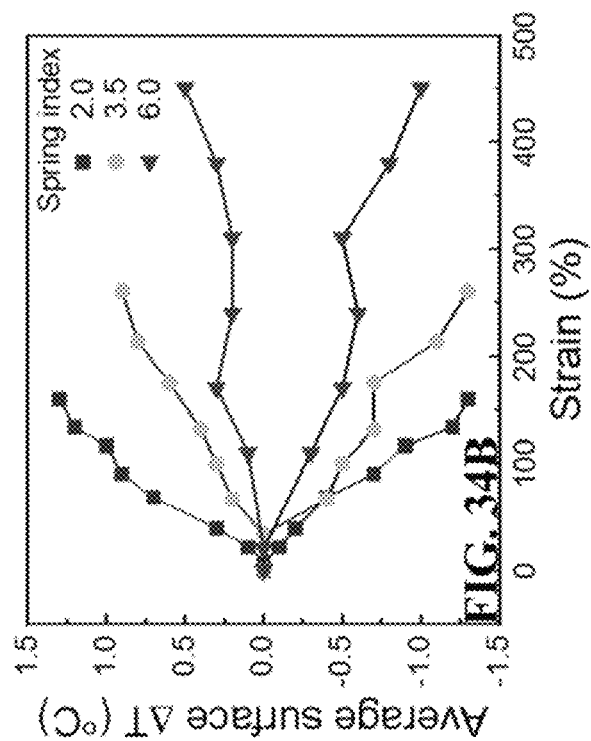
FIGS. 34A-34D are graphs showing the strain dependences of (FIGS. 34A and 34C) maximum twistocaloric surface temperature changes and (FIGS. 34B and 34D) average twistocaloric surface temperature changes for (FIGS. 34A-34B) homochiral and (FIGS. 34C-34D) heterochiral coiled hollow nylon 6 fibers having different spring indices.
Figure 34B:
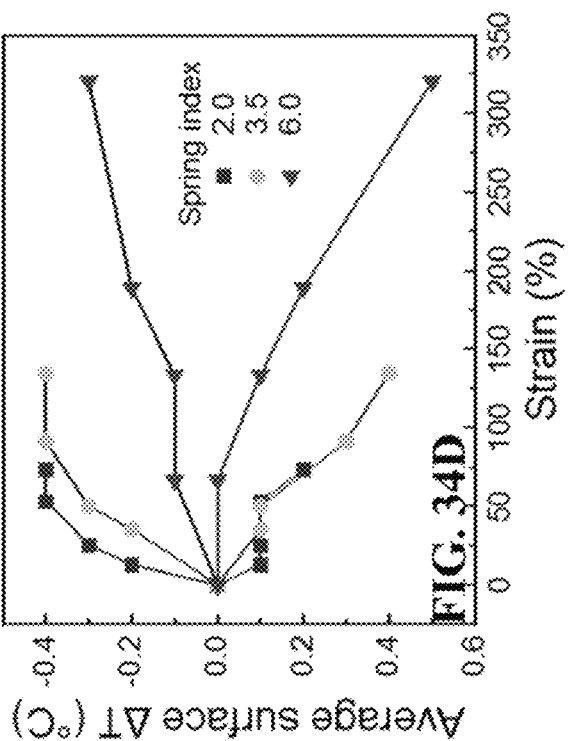
Figure 34C:
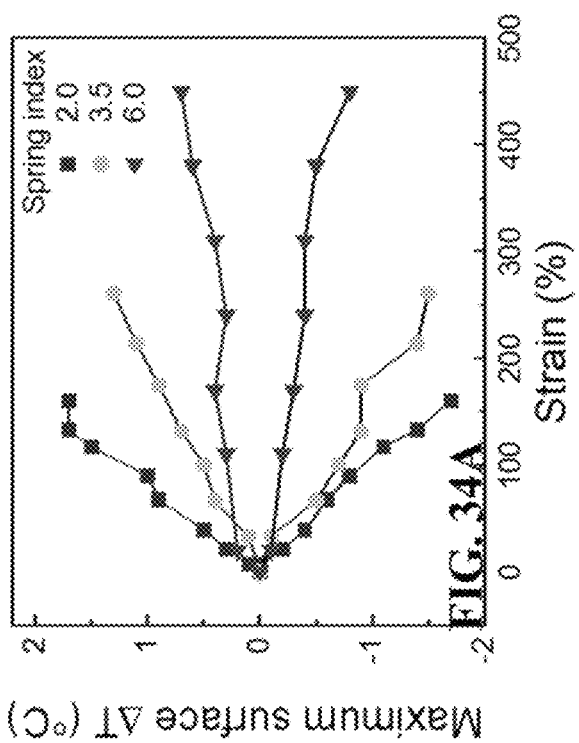
Figure 34D:
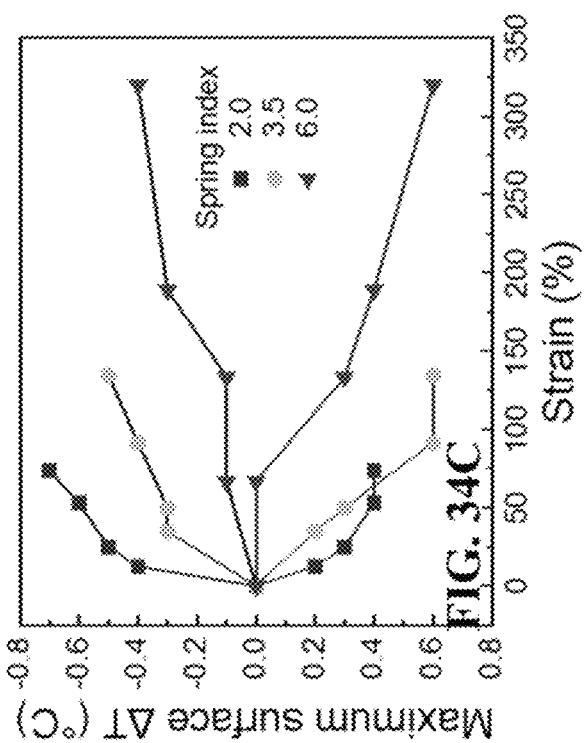

FIGS. 34A-34B provide measurements of the strain dependence of temperature changes during fiber stretch and stretch release for homochiral coiled hollow nylon 6 fibers having different spring indices. The observed maximum heating during stretch were +1.7, +1.3, and +0.7° C.; the average heating during stretch were +1.3, +0.9, and +0.5° C.;

the maximum cooling during stretch release were −1.7, −1.5, and −0.8° C.; and the average cooling during stretch release were −1.3, −1.3, and −1.0° C. for fibers having spring indices of 2.0, 3.5, and 6.0, respectively. FIG. 34C-34D provide measurements of the strain dependence of temperature changes during fiber stretch and stretch release for heterochiral coiled hollow nylon 6 fibers having different spring indices. The observed maximum cooling during stretch were −0.7, −0.5, and −0.4° C.; the average cooling during stretch were −0.4, −0.4, and −0.3° C.; the maximum heating during stretch release were +0.4, +0.6, and +0.6° C.; and the average heating during stretch release were +0.2, +0.4, and +0.5° C. for fibers having spring indices of 2.0, 3.5, and 6.0, respectively.

The next experiments on stretch-driven twistocaloric cooling used hollow nylon 6 fibers that are manufactured for use as transmission lines that transport either high pressure gases or liquids. These fibers, which have an inner diameter of 2.0 mm and an outer diameter of 3.2 mm, were obtained from Hudson Extrusion Inc. (Model 58027). The ratio of void volume to polymer volume for these fibers (0.64) is much larger than for the above hollow fishing line fibers (0.07). As shown in FIG. 35A, these mandrel coiled fibers were stretched to 130% strain, wrapped around a 1.8-mm-diameter mandrel to obtain either homochiral or heterochiral coiled fibers, and then thermally annealed at 100° C. for 6 hours. FIGS. 35B-35C show views of the coiled hollow fiber when liquid free and when filled with blue ink. Since these hollow fibers do not collapse during this mandrel coiling (although they do collapse during self-coiling) and since the void volume is large compared to the fiber volume, the channel within the coiled fiber provided a convenient pathway for cooling and heating transmitted liquids.

Figure 36A:
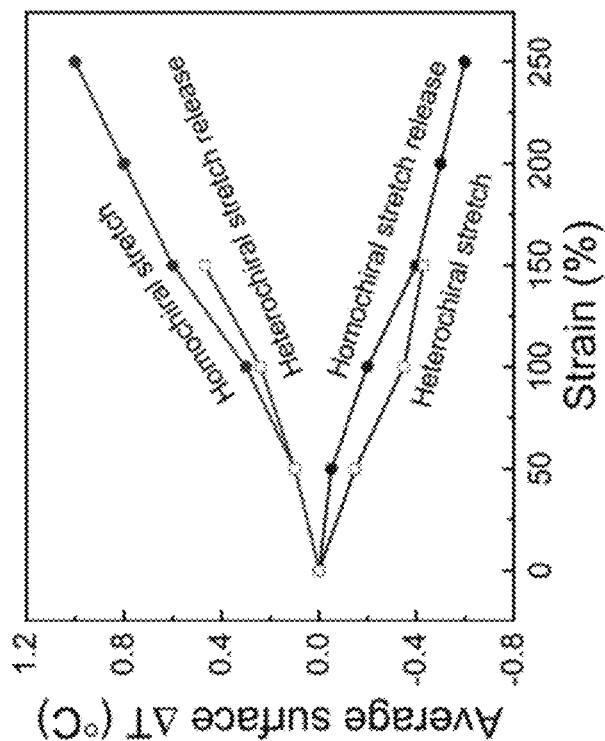
FIGS. 36A-36B are graphs showing the dependence of the average heating and cooling of (FIG. 36A) the coil exterior and (FIG. 36B) the coil interior of the coiled hollow nylon 6 fibers on strain changes for the homochiral coiled fiber and the heterochiral coiled fiber.
Figure 36B:
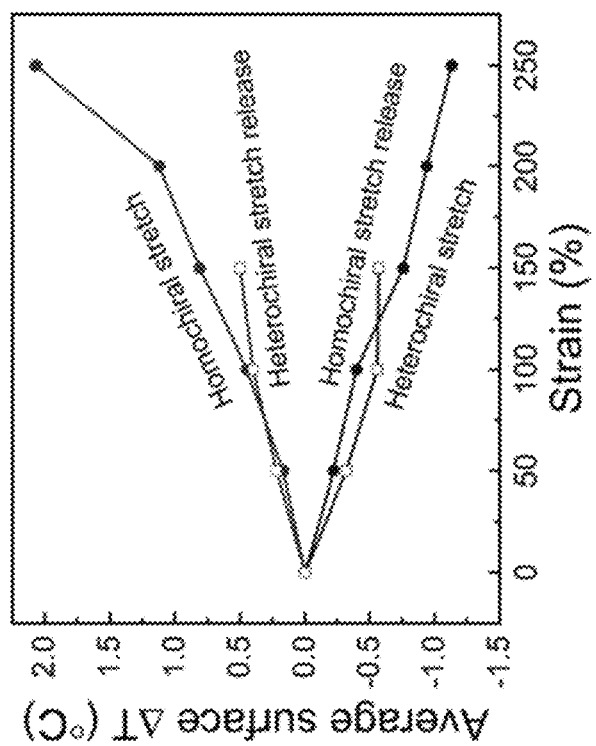

FIGS. 36A-36B show the average heating and cooling of the coil exterior that result from a stretch process for the homochiral hollow fiber (+2.1 and −1.1° C. for 250% strain change) and for the heterochiral hollow fiber (+0.5 and −0.6° C. for 150% strain change). The corresponding average heating and cooling were also measured for the interior of the coil during these strain changes for the homochiral coiled fiber (+1.0 and −0.6° C. for 250% strain change) and the heterochiral coiled fiber (+0.5 and −0.4° C. for 150% strain change). These separate measurements for interior and exterior coil temperature changes were made, rather than average temperature change measurements that include both coil exterior and interior, because of the difficulty of simultaneously collecting thermal images from both coil interior and exterior for such a large diameter coiled fiber.

Thermochromic materials can be inserted inside hollow fiber tubes to provide mechanochromic fibers for optical strain sensors and textiles that change color in a patterned manner when stretched. Because of their high temperature sensitivity, cholesteric liquid crystals are especially useful for this application.

Figure 37B:
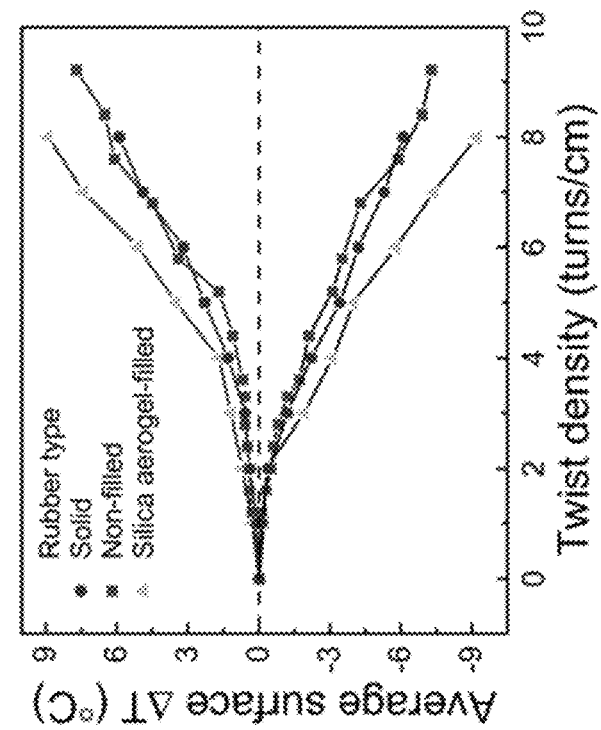
FIGS. 37A-37B are graphs showing the dependences of (FIG. 37A) maximum twistocaloric temperature change and (FIG. 37B) average twistocaloric temperature change on inserted twist for an isometrically twist-inserted solid NR fiber and a hollow NR fiber that is non-filled and filled with silica aerogel. The diameter of the solid NR fiber was 5.0 mm. The inner and outer diameters of the hollow NR tube were 2.0 and 5.0 mm, respectively. The isometric stretch was 50%.
Figure 37A:
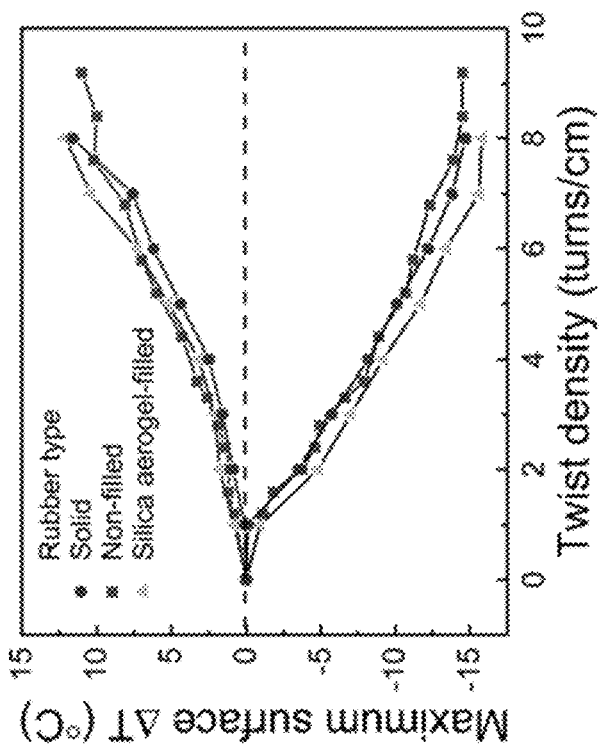

A hollow sealed NR fiber (with inner and outer diameter 2.0 and 5.0 mm) filled with water collapses upon coil initiation during isometric twist insertion, thereby forming water-filled balloons in the rubber tube. However, the same hollow NR fiber filled with granular $CaCO_3$ powder did not collapse. FIGS. 37A-37B show the dependences of maximum and average twistocaloric temperature changes on inserted twist during isometric twist insertion and twist release for a solid NR fiber, a hollow NR tube and a NR tube filled with silica aerogel (JN200 from JINNA TECH Co. Ltd.). These results show that the average surface cooling of the NR tube filled with silica aerogel (−9.2° C.) was higher than for the solid NR fiber (−6.1° C.) and the non-filled NR tube (−7.7° C.).

Figure 38:
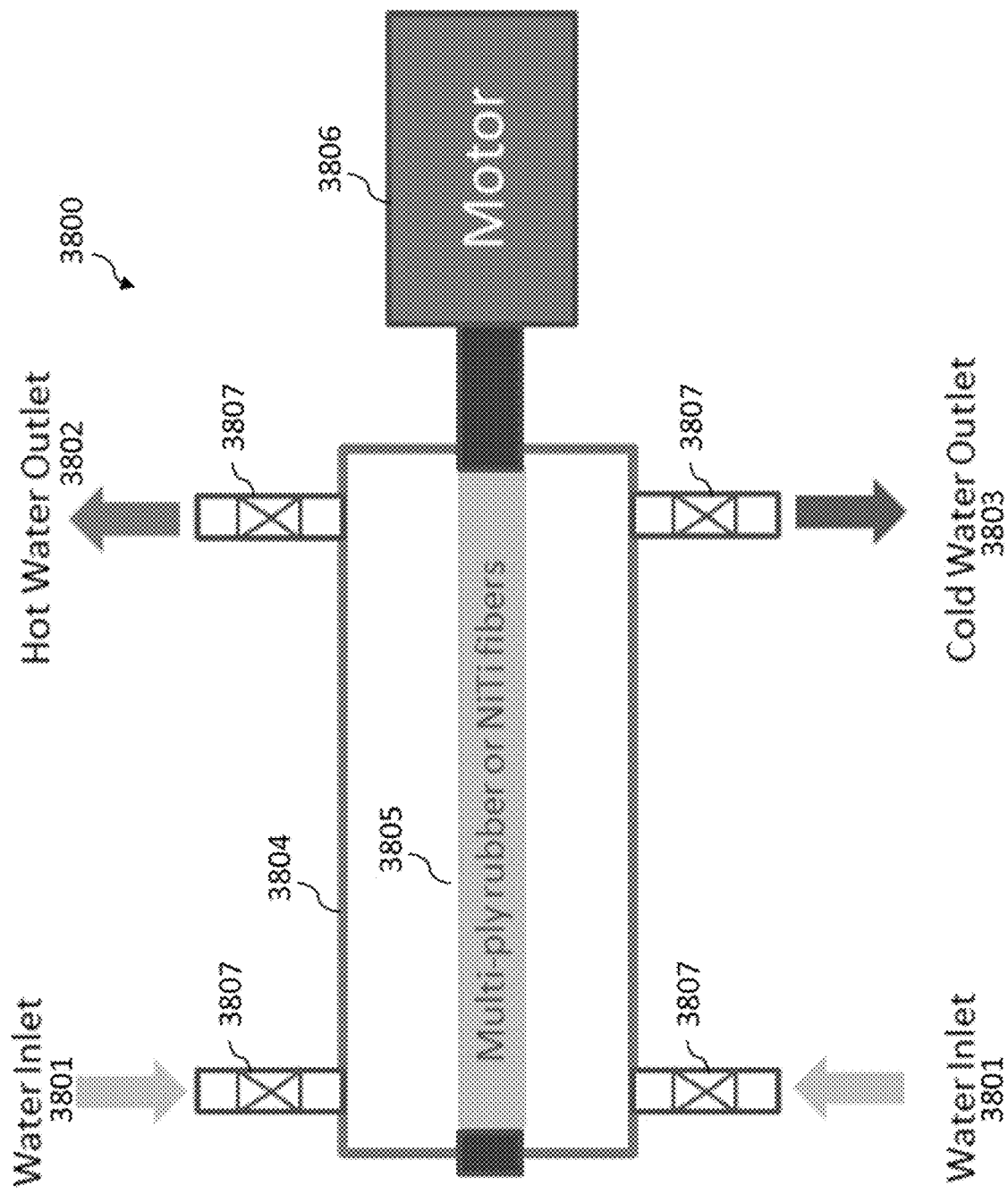
FIG. 38 is an illustration of a twist fridge that enables multiple cycles of heating and cooling of streams of ambient temperature water, in which the valves that can be opened and closed at will and the pictured motor inserts and removes twist.
Figure 39E:
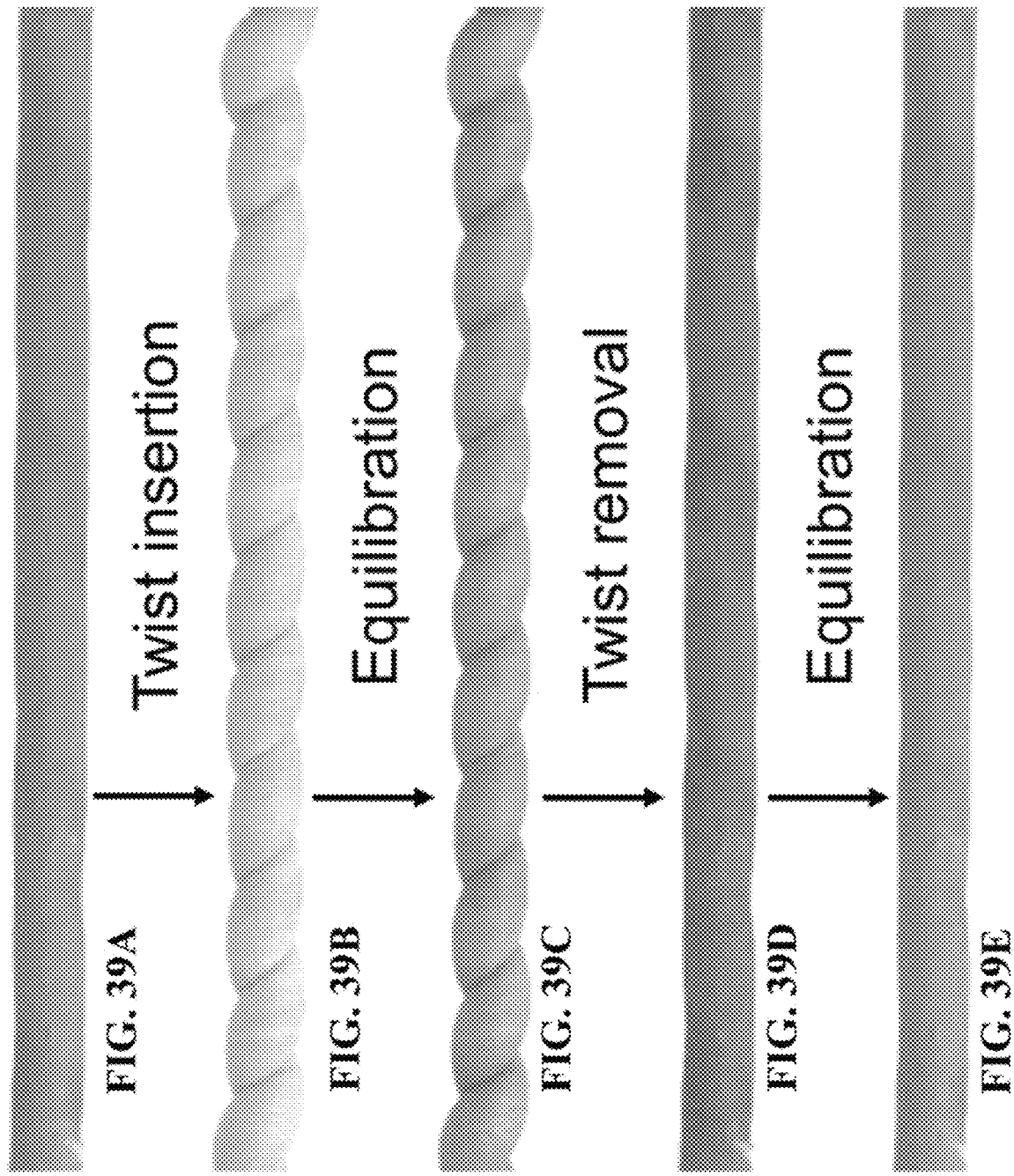

FIG. 38 shows a twist fridge that alternatively heats and cools separate outlet water streams.

FIG. 38 is an illustration of a twist fridge system 3800 that enables multiple cycles of heating and cooling of streams of ambient temperature water (via water inlet 3801, hot water outlet 3802, and cold water outlet 3803), in which the valves 3807 can be opened and closed at will and motor 3806 inserts and removes twist. When twist is inserted into the rubber fiber or NiTi fiber (or arrays of such fibers), the twist insertion generates heat that increases the temperature of the inputted water, which exits at the hot-water outlet. When this twist is released, the twistocaloric material cools the ambient temperature water, and this cooled water exits at the cold-water outlet.

If both a fluid input and a fluid outlet are separately provided for the inside and outside of a twistocaloric tube 3894 (which coils 3805 without twist-induced collapse), fluid heating can be accomplished at one site (inside the tube or outside it) and fluid cooling can be accomplished at the other site during different stages of the twistocaloric cycle (by controlling the site at which the fluid exists and flows). Alternatively, the same water stream can flow both inside and outside the tube to produce alternatively heating and cooling of this stream, which can be later separated into hot and cold steams by the timing of the opening and closing of valves that are external to the device.

General Means for Obtaining Twist Changes, Length Changes, and Combinations of Twist Change and Length Change Rotary actuators can provide the means for causing twist insertion, twist release, or the combination of twist insertion and twist release. Likewise, a linear actuator can provide the means for causing length changes. Using rotary electromagnetic motors for twist release and linear electromagnetic motors for stretch release can be advantageous in providing electrical energy harvesting during these processes, which can increase the energy conversion efficiency of a twist fridge. One example is a torsional electromagnetic motor, which generates electricity when its rotor is rotated. Another example is an electromagnetic linear actuator, which can generate electrical energy when tensile stress is released from a stretched twistocaloric material. The terms rotary actuator and a tensile actuator are used for steps of twist release and stretch release, respectively, even when used without external power (such as to harvest stored energy and to avoid deposition of stored mechanical energy in the cooler).

Twist-Fridges Powered by Artificial Muscle Fibers or Yarns

While conventional electromagnetic motors can drive the reversible torsional rotation, tensile stretch, and combination of torsional rotation and tensile stretch used for twist-fridges, such motors can be expensive and can have high volumes and weights compared with the cooler fibers or yarns. These considerations also make it difficult to downsize twist-fridges to the micron scales for computer chips and microfluidic circuits. Also, driving an array of torsionally driven coolers with one motor would normally necessitate a system of gears, whose cost and energy loss would mediate in favor of choosing large diameter cooling elements, which could decrease cycle rates of the cooler because of thermal transport times. If a cheap, lightweight artificial muscle were operated in series with each torsional mechanocaloric cooler in a large array of such coolers, convenient upscaling to the needs of large-scale refrigeration would be facilitated. Additionally, use of such fiber or yarn artificial muscles would enable cooler downsizing to below micron lengths.

The following embodiment is directed to the use of lightweight, low-volume artificial muscles, which can be cheap, to replace conventional motors for twist-fridges. Instead of using the electromagnetic twist insertion of a conventional motor, powerful electrostatically driven, electrochemically driven, liquid-absorption-driven, vapor-absorption-driven, photothermally driven, electrothermally driven, thermally driven, or magnetically driven artificial muscles can provide the needed twist and twist release for the cooling elements of twist fridges, as well as tensile deformations. Such muscles that can provide large tensile and torsional strokes are known in the prior art. [Haines 2014; Li '249 Patent; Lima 2012; Lee 2014; Lima 2015; Liu 2015; Kim 2015; Kim 2016; Haines 2016; Lee 2017; Kim 2018; Kim 2019; Mu 2019]. These muscles can be most simply be operated in series with the twist cooler fibers or yarns. In order to avoid heating effects associated with some of these muscles, the muscles can be remotely attached to the cooler.

Optical and Infrared Applications of Twist Fridge Fibers and Yarns

The use of the twist cooler fibers and yarns (and textiles woven from these fibers or yarns) for optical and infrared applications is enabled by the large temperature swing between maximum temperature and minimum temperature during a twistocaloric cycle, as well as the existence of non-uniform temperature changes along the fiber length. Such applications include remotely optically or infrared readable tensile or torsional strain sensors and mechanothermochromic fibers and textiles. By mechanically connecting a moisture-driven or chemically-driven artificial muscle to a twist cooler fiber, so that the artificial muscle causes tensile or torsional deformation of the twist cooler fiber, humidity or chemical environmental changes can be remotely detected.

FIG. 25D shows the mechanochromic color changes realized during twist and untwist of a thermochromic dye painted NiTi wires and FIGS. 39A-39E show the color changes of a NR fiber during twist insertion and removal. Use of thermochromic dyes having higher temperature sensitivity can enable vivid display of the spatial variation in temperature, and well as the presently observed changes in peak surface heating and peak surface cooling.

Changes in the infrared radiation emission of twistocaloric fibers can find application for attracting or repulsing infrared sensitive marine organism (such as migrating salmon) and for attracting insects. One possible application of the twist-based mechanocaloric heater is for an insect trap. Many blood-sucking insects, such as mosquitoes and bed bugs, use infrared emissions to find warm-blooded creatures for food. For example, coiled nylon 6 or polyethylene fishing line fibers can be used that heat during stretching and cool during stretch release, which the insect would perceive as a flickering infrared light. These fibers can be knitted into the web that is coated with a sticky adhesive. As the wind blows the web, the polymer coils are stretched and generate heat, attracting the insects and trapping them in the adhesive of the web. Alternatively, insects can be attracted to a trap by producing infrared light changes using fiber or yarn twist produced by an attached windmill. When operated underwater to attract or repulse marine of fresh water organisms, the twistocaloric cycle can be powered by water motion. Depending upon the application, the fiber diameter can be chosen to provide the desired time in which stretch or twist induced temperature changes are retained.

Twist Fridges Using Fluid Circulation that is Automatically Powered by the Twist and Untwist Used for the Twistocaloric Cycle In these embodiments, the twist and untwist used for the twistocaloric cooling cycle automatically provides fluid circulation, so this fluid is cooled by successive cycles of the twist fridge, and not significantly heated during any part of the cycle. The twistocaloric material can be a hollow NR tube. The presently used fluid (water) is rejected from the inside of this hollow NR tube by the twist-induced collapse of this tube during the heating part of the cycle and then sucked back into the tube during tube untwist, so that the water can be cooled. As result of this twist-untwist induced water circulation, the water in the tube was repeatedly cooled during successive cycles, while the heat generated by tube twist is released to the environment through transport to outside the hollow tube. As used herein, a hollow tube is called a hollow fiber or yarn independent of the inner or outer diameter of such hollow tube.

Figure 40A:
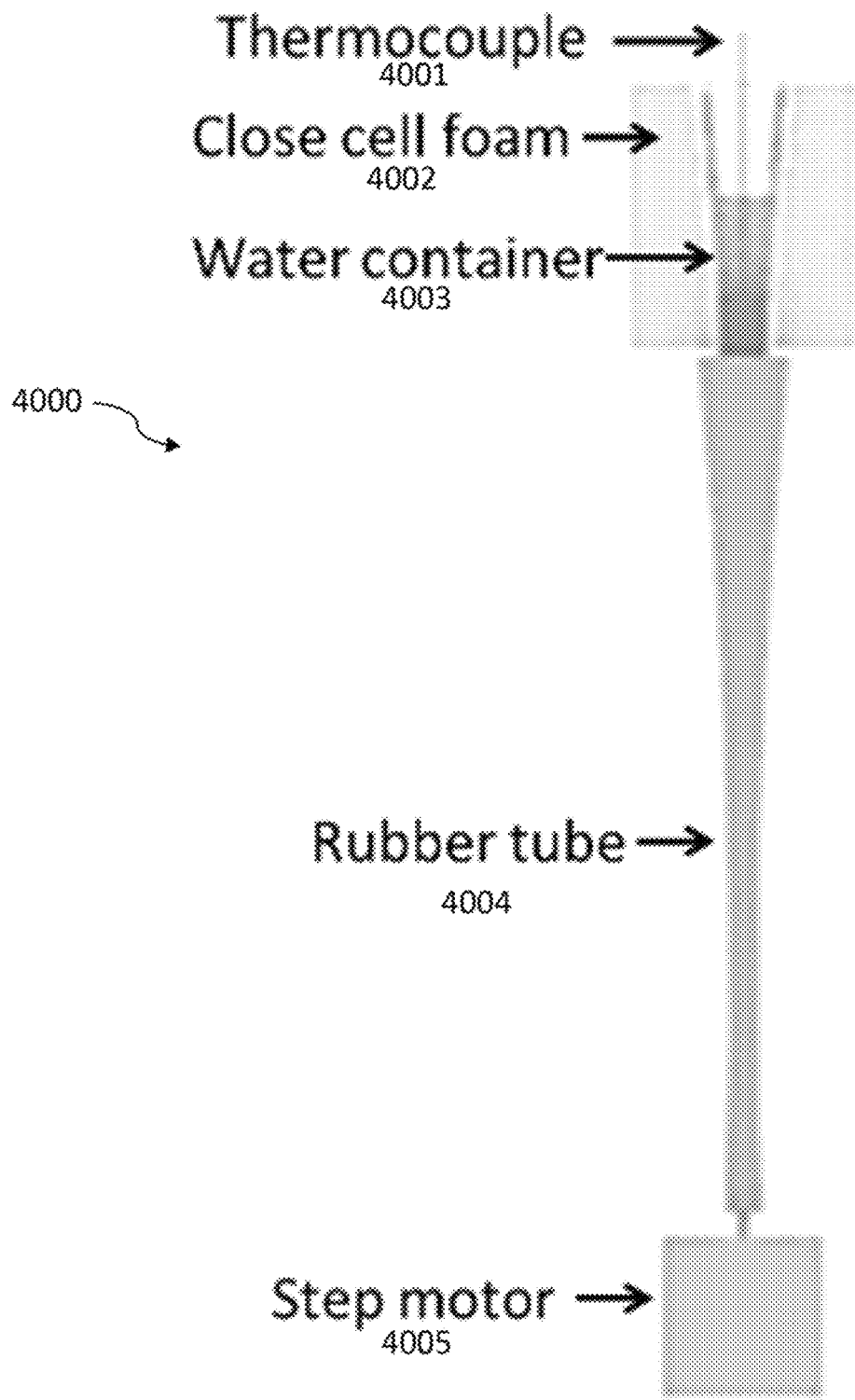
FIG. 40A is a schematic illustration of the device for NR-tube-based fluid circulation, which is automatically powered by the twist and untwist used for the twistocaloric cycle.

The outer diameter of the 9-cm-long hollow rubber tube (Foshan Bonlex Trading CO.), which is made for the rubber band of a slingshot, varied continuously from 4 mm at the thin end to 6 mm at the thick end, but the initial inner diameter (2 mm) was constant. The apparatus 4000 illustrated in FIG. 40A was used to cool water, which was stored in a conical reservoir 4003, which was located at the thick-diameter end of the rubber tube 4004. This thick-diameter end of the NR tube was torsionally tethered using a clamp and connected to the water reservoir, which was insulated from the environment using a surrounding closed-cell foam 4002. The thin-diameter opposite end of the NR tube was connected to a servo motor 4005 for twist insertion and twist removal. In order to prevent water leakage, the thin-diameter end of the NR tube was sealed by silicon glue. Temperature measurements were made using a thermal couple 4001 (K-type, 0.1 mm in diameter), which was located at the bottom of the water reservoir.

Figure 40B:
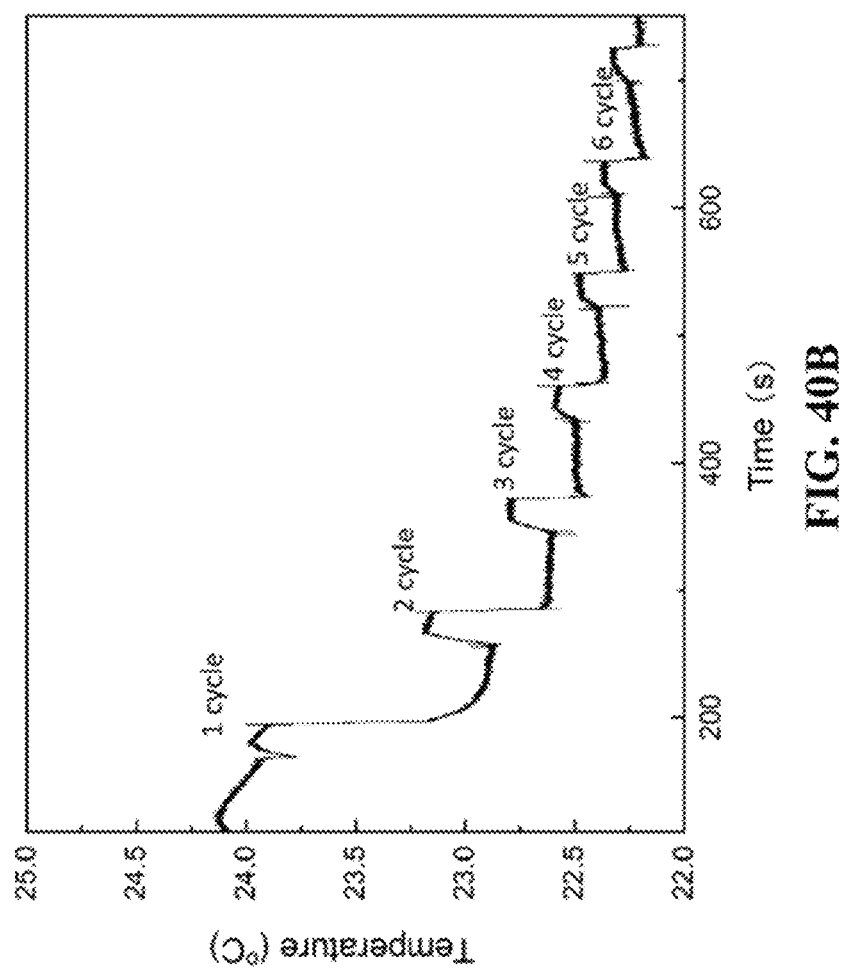
FIG. 40B is a graph showing the time dependence of the temperature of the water in the conical reservoir during cycling by the isometric (80% strain) insertion and removal of 20 turns/cm of twist from a NR tube having a gradient in external diameter. The smaller temperature increase after each temperature decrease occurs because the water is withdrawn from the reservoir, so this temperature corresponds to temperature of the air space in the water-free reservoir.

At the beginning, the NR tube was filled with water (24.12° C.) and pre-stretched by 80%. Twist was isometrically inserted into the NR tube, at a rotation speed of 25 turns/s, using a servo motor. Since higher twist, per length increment, was inserted into smaller diameter tube segments, tube collapse during twist insertion propagated from the small diameter end to the large diameter end, which pushed the water into the reservoir. Then the inserted twist was isometrically removed using the servo motor at a rotation speed of 25 turns/s to form a non-twisted, non-collapsed NR rubber, which drew the water into the non-twisted tube, thereby enabling the water to cool. During the start of the next cycle, the tube is again twisted, thereby pushing the cooled water into the water reservoir, where the water temperature was 22.89° C. after the first cycle. After 6 cycles, the temperature of water in the conical water reservoir decreased from the initial 24.12 ° C. to 22.20° C., as shown in FIG. 40B.

It is not necessary for the hollow elastomeric twistocaloric tube to have a gradient in diameter in order to obtain fluid circulation that is automatically powered by the twist and untwist used for the twistocaloric cycle. If fact, since coiling and resulting tube collapse is normally initialed at a tube end, all that is needed is to make one end of this tube much more susceptible to coil nucleation. For instance, this can be done by chemically modifying one tube end compared to the other tube end (such as by preferential radiation or chemically produced cross-linking or preferentially introducing a plasticizer), so that coil nucleation and occurs in the desired tube end.

More simply, a conical cylinder was inserted in the cylinder end that is closest to the motor, which has a smaller maximum tube-deforming diameter than for the cylindrical plug on the opposite tube end that leads to the fluid reservoir. In the present demonstration, the inner and outer diameters of the NR tube were 4 and 6 mm. Deploying the same twist and untwist process as used in the above embodiment for a tube having a gradient in tube diameter, and an initial pre-stretch of 80%, the temperature of water in the conical container decreased from 24.5 to 22.5° C. after 5 twistocaloric cycles. Compared with the above results of a tube having a gradient in the outer tube diameter, the ratio of void volume to rubber volume was higher and temperature changes were more uniform in the axial direction of the uniform diameter NR tube. Hence, the cooling rate of the water was faster for the uniform diameter NR tube.

The time required for a cooling cycle can be decreased by cooling the twisted rubber tube using the flow of ambient temperature air or, better yet, the flow of an ambient temperature liquid (like water) in a tube that surrounds the cooler tube. In fact, the decrease in the outer volume of the elastomer tube in the twisted state and its increase in the non-twisted state can be used for automatically pumping a fluid through this outer tube. It this twist/untwist powered mode, the direction of liquid flow can be valve controlled.

Alternative twist cooler configurations can also be used to automatically separate hot and cold fluids (gas or liquid) that result from twist insertion and twist removal from twistocaloric yarns, fibers, and combination thereof. For example, propellers can be configured along the length of such elements, so that the fluid is forced to flow in one direction during twist insertion and in the opposite direction during twist removal. Thereby, the separation between twist heated fluid and untwist cooled fluid can be realized.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or subranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described. The symbol "~" is the same as "approximately".

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

U.S. Pat. No. 9,784,249, entitled "Coiled and non-coiled twisted nanofiber yarn torsional and tensile actuators," issued to Li, N., et al., Oct. 10, 2017 ("Li '249 Patent").

Androsch, R., et al., "Mesophases in polyethylene, polypropylene, and poly(1-butene)," *Polymer* 51, 4639-4662 (2010) ("Androsch 2010").

Carvalhoa, A. M. G., et al., "Giant room-temperature barocaloric effects in PDMS rubber at low pressures," *Eur. Polym.* 1 99, 212-221 (2018) ("Carvalhoa 2018").

Chauhan, A., et al., "A review and analysis of the elastocaloric effect for solid-state refrigeration devices: Challenges and opportunities," *MRS Energy & Sustainability: A Review* Journal, 2, E16 (2015) DOI:10.1557/mre.2015.17 ("Chauhan 2015").

Cong, D., et al., "Colossal elastocaloric effect in ferroelastic Ni—Mn—Ti alloys," *Physical Review Letters* 122, 255703 (2019) ("Cong 2019").

Cui, J. et al., "Demonstration of high efficiency elastocaloric cooling with large ΔT using NiTi wires," *Appl. Phys. Lett.* 101, 073904 (2012) ("Cui 2012").

Dart, S. L., et al., "Rise of temperature on fast stretching of synthetics and natural rubbers," *Ind. Eng. Chem.* 34, 1340-1342 (1942) ("Dart 1942").

Defay, E., et al., "Enhanced electrocaloric efficiency via energy recovery," *Nat. Commun.* 9, 1827 (2018) ("Defay 2018").

Gaur, U., et al., "Heat capacity and other thermodynamic properties of linear macromolecules IV. Polypropylene," *J. Phys. Chem. Ref. Data.* 10, 1051-1064 (1981) ("Gaur 1981").

Gottschall, T., et al., "A multicaloric cooling cycle that exploits thermal hysteresis," *Nat. Mater.* 17, 929-934 (2018) ("Gottschall 2018").

Gough, J., "A description of a property of caoutchouc or Indian rubber; with some reflections on the cause of the elasticity of this substance," *Mem. Lit. Phil. Soc. Manchester* 1 ($2^{nd}$ Series), 288, 288-295 (1805) ("Gough 1805").

Haines, C. S., et al., "New Twist on Artificial Muscles," *Proceedings National Academy of Sciences* 113, 11709-11716 (2016) ("Haines 2016").

Haines, C. S., et al., "Artificial muscles from fishing line and sewing thread," *Science* 343, 868-872 (2014) ("Haines 2014").

Kim, K. J., et al., "Enhancing the work capacity of electrochemical artificial muscles by coiling plies of twist-released carbon nanotube yarns," *ACS Applied Materials & Interfaces* 11, 13533-13537 (2019) ("Kim 2019").

Kim, S. H., et al., "Harvesting Electrical Energy from Torsional Thermal Actuation Driven by Natural Convection," *Scientific Reports*, 8(1), 8712, DOI: 10.1038/s41598-018-26983-4 (2018) ("Kim 2018").

Kim, S. H., et al., "Bio-inspired, Moisture-Powered Hybrid Carbon Nanotube Yarn," *Scientific Reports* 6, 23016; DOI: 10.1038/srep23016 (2016) ("Kim 2016").

Kim, S. H., et al., "Harvesting temperature fluctuations as electrical energy using torsional and tensile polymer muscles," *Energy & Environmental Science* 8, 3336-3344 (2015) ("Kim 2015").

Lee, J. A., et al., "Electrochemically Powered, Energy-Conserving Carbon Nanotube Artificial Muscles," *Advanced Materials* 27, 1700870 (2017), DOI: 10.1002/adma.201700870 ("Lee 2017").

Lee, J. A., et al., "All Solid State Carbon Nanotube Torsional and Tensile Artificial Muscles," *Nano Letters* 14, 2664-2669 (2014) ("Lee 2014").

Li, Y., et al., "Energy-efficient elastocaloric cooling by flexibly and reversibly transferring interface in magnetic shape-memory alloys," *ACS Appl. Mater. Inter.* 10, 25438-25445 (2018) ("Li 2018").

Lima, M. D., et al., "Efficient, Absorption-Powered Artificial Muscles Based on Carbon Nanotube Hybrid Yarns," *Small* 11, 3113-3118 (2015) ("Lima 2015").

Lima, M. D., et al. "Electrically, Chemically, and Photonically Powered Torsional and Tensile Actuation of Hybrid Carbon Nanotube Yarn Muscles," *Science* 338, 928-932 (2012) ("Lima 2012").

Liu, Y., et al., "Giant room-temperature elastocaloric effect in ferroelectric ultrathin films," *Adv. Mater.* 26, 6132-6137 (2014) ("Liu 2014").

Liu, Z. F., et al., "Hierarchically buckled sheath-core fibers for superelastic electronics, sensors, and muscles," *Science* 349, 400-404 (2015) ("Liu 2015").

Ma, R., et al., "Highly efficient electrocaloric cooling with electrostatic actuation," *Science* 357, 1130-1134 (2017) ("Ma 2017").

Mañosa, L., et al., "Materials with giant mechanocaloric effects: cooling by strength," *Adv. Mater.* 29, 1603607 (2017) ("Mañosa 2017").

Moya, X., et al., "Caloric materials near ferroic phase transitions," *Nat. Mater.* 13, 439-450 (2014) ("Moya 2014").

Mu, J., et al., "Sheath-Run Artificial Muscles," *Science*, 12, 365(6449), 150-155. doi: 10.1126/science.aaw2403 ("Mu 2019")

Neese, B., et al., "Large electrocaloric effect in ferroelectric polymers near room temperature," *Science* 321, 821-823 (2008) ("Neese 2008").

Olsson, P. A. T., et al., "Ab initio investigation of monoclinic phase stability and martensitic transformation in crystalline polyethylene," *Phys. Rev. Mater.* 2, 075602 (2018) ("Olsson 2018").

Ossmer, H., et al., "Elastocaloric cooling using shape memory alloy films," *J. Phys. Conf. Ser.* 476, 012138 (2013) ("Ossmer 2013").

Pieczyska, E. A., et al., "Phase-transformation fronts evolution for stress-and strain-controlled tension tests in TiNi shape memory alloy," *Exp. Mech.* 46, 531-542 (2006) ("Pieczyska 2006").

Qian, S., et al., "Elastocaloric effect in CuAlZn and CuAlMn shape memory alloys under compression," *Phil. Trans. R. Soc. A* 374, 20150309 (2016) ("Qian 2016").

Quarini, J., et al., "Solid state refrigeration: cooling and refrigeration using crystalline phase changes in metal alloys," *P. I. Mech. Eng. C-J. Mec.* 218, 1175-1179 (2004) ("Quarini 2004").

Tadokoro, H. "Structure and properties of crystalline polymers," *Polymer* 25, 147-163 (1984) ("Tadokoro 1984").

Takeuchi, I., et al., "Solid-state cooling with caloric materials," *Phys. Today* 68, 48-54 (2015) ("Takeuchi 2015").

Trček, M., et al., "Electrocaloric and elastocaloric effects in soft materials," *Phil. Trans. R. Soc. A* 374, 20150301 (2016) ("Trček 2016").

Tušek, J., et al., A regenerative elastocaloric heat pump," *Nat. Energy* 1, 16134 (2016) ("Tušek 12016").

Tušek, J., et al., "Elastocaloric effect of a Ni—Ti plate to be applied in a regenerator-based cooling device," *Sci. Technol. Built En.* 22, 489-499 (2016) ("Tušek II 2016").

Tušek, J., et al., "Elastocaloric effect of Ni—Ti wire for application in a cooling device," *J. Appl. Phys.* 117, 124901 (2015) ("Tušek 2015").

Xie, Z., et al., "Temperature dependence of the elastocaloric effect in natural rubber," *Phys. Lett. A* 381, 2112-2116 (2017) ("Xie 2017").

Yoshida, Y., et al., "Elastocaloric effect in poly(vinylidene fluoride-trifluoroethylenechlorotrifluoroethylene) terpolymer," *Appl. Phys. Lett.* 108, 242904 (2016) ("Yoshida 2016").

Young, R. J., et al., "Twinning and martensitic transformations in oriented high-density polyethylene," *Philos. Mag.* 29, 1061-1073 (1974) ("Young 1974").

Zanotti, C., et al., "Chrysanthou, Thermal diffusivity of Ni—Ti SMAs," *J. Alloys Compd.* 473, 231-237 (2009) ("Zanotti 2009").

What is claimed is:

1. A mechanocaloric cooler comprising a cooling element, wherein the cooling element is selected from a group consisting of:
   (a) a fiber or yarn that is in a highly twisted state, a partially or fully coiled state, or a partially or fully supercoiled state during one part of a cooling cycle and in a substantially reduced twist state or non-twisted state in another part of the cooling cycle;
   (b) a fiber or yarn that is in a highly plied state in one part of the cooling cycle and in a largely non-plied state in another part of the cooling cycle, and
   (c) a fiber or yarn that is in a partially coiled, fully coiled, partially supercoiled, or fully supercoiled state, which either cools when stretched or cools when stretch is released.

2. The mechanocaloric cooler of claim 1, wherein the cooling element is operable to undergo a transition between crystalline phases when twisted or plied or when stretched when partially coiled, fully coiled, partially supercoiled, or fully supercoiled.

3. A mechanocaloric cooler comprising:
   (a) a cooling element that is selected from a group consisting of a fiber or yarn or an array of fibers, yarns, and combination thereof; and
   (b) a rotary actuator, wherein
      (i) the rotary actuator is operable to change twist of the cooling element, and
      (ii) the change in twist can be fiber or yarn twist or the twist of plying fibers, yarns, or combinations of fibers and yarns.

4. The mechanocaloric cooler of claim 3, wherein the rotary actuator is operable to cause largely isometric twist change.

5. The mechanocaloric cooler of claim 4, wherein the cooling element comprises a yarn or fiber cooler element that is operable to heat when twist is quasi-isometrically inserted and is operable to cool when twist is quasi-isometrically released.

6. The mechanocaloric cooler of claim 4, wherein the cooler element is operable to cool when fiber or yarn twist is inserted in the cooler element or when the fibers or yarns of the cooler element are twisted together to produce plying.

7. The mechanocaloric cooler of claim 3 further comprising a linear actuator, wherein the linear actuator is operable to change the length of the cooling element.

8. The mechanocaloric cooler of claim 3, wherein the cooling element comprises a fiber or yarn selected from a group consisting of non-elastomeric polymer fibers and yarns, rubber fibers and yarns, and shape memory metal alloy fibers and yarns.

9. The mechanocaloric cooler of claim 8, wherein the fiber or yarn is operable while in a stretched or non-stretched state to be partially coiled, fully coiled, partially supercoiled, or fully supercoiled by solely twist insertion.

10. The mechanocaloric cooler of claim 9, the cooling element comprises a non-elastomeric polymer or a rubber fiber or yarn that is partially coiled, fully coiled, partially supercoiled, or fully supercoiled.

11. The mechanocaloric cooler of claim 3, wherein the cooler element comprises a hollow fiber or yarn.

12. The mechanocaloric cooler of claim 11, wherein
   (a) a heat transfer material is within the hollow fiber; and
   (b) the heat transfer material is operable to be heated, cooled, or both heated and cooled by a mechanocaloric process of the mechanocaloric cooler.

13. The mechanocaloric cooler of claim 12 further comprising a second heat transfer material positioned on the exterior of the hollow fiber or yarn.

14. The mechanocaloric cooler of claim 13, wherein the second heat transfer material is a fluid.

15. The mechanocaloric cooler of claim 12, wherein the hollow fiber is coiled in at least one state of the cooler element.

16. The mechanocaloric cooler of claim 11, wherein
   (a) the cooler element is operable for twist induced changes in the external or internal volume to occur; and
   (b) the mechanocaloric cooler further comprises a displacement pump that is operable to utilize at least one of the volume changes for pumping a fluid for heat exchange.

17. The mechanocaloric cooler of claim 3, wherein the rotary actuator comprises an artificial muscle yarn or fiber that is operable to be driven by a driving process selected from a group consisting of electrostatically driven, electrochemically driven, liquid- absorption-driven, vapor-absorption-driven, photothermally driven, electrothermally driven, thermally driven, magnetically driven, and combinations thereof.

18. The mechanocaloric cooler of claim 3, wherein the fibers or yarns of the cooling element comprise a material selected from a group consisting of shape memory alloys, rubbers, organic polymers, keratin, elastocaloric materials, barocaloric materials, ferroelectric materials, magnetocaloric materials, and combinations thereof.

19. The mechanocaloric cooler of claim 3, wherein
   (a) the cooling element has one or more propellers along its length, and
   (b) the one or more propellers are operable to force fluid in one direction during a heating part of the mechanocaloric cycle of the mechanocaloric cooler and in the opposite direction during the cooling part of the mechanocaloric cycle of the mechanocaloric cooler.

20. An article comprising a mechanocaloric cooler, wherein
   (a) the mechanocaloric cooler comprises a cooling element selected from a group consisting of:
      (i) cooling elements comprising a fiber or yarn that is in a highly twisted state, a partially or fully coiled state, or a partially of fully supercoiled state during one part of a cooling cycle and in a low twisted or non-twist state in another part of the cooling cycle;
      (ii) cooling elements comprising a fiber or yarn array that is in a highly plied state in one part of the cooling cycle and in a largely non-plied state in another part of the cooling cycle;
      (iii) cooling elements that are partially coiled, fully coiled, partially supercoiled, or fully supercoiled, which either cool when stretched or cool when stretch is released,
   (b) the article is selected from a group consisting of (i) refrigerators, (ii) microfluidic circuits, (iii) thermochromic-coated fibers or textiles that undergo mechanothermochromic color changes when stretched, (iv) infrared emitting structures for attracting or repulsing infrared sensitive marine organisms, (v) infrared-emitting light sources for an insect trap, and (vi) remotely optically readable sensors for torsional strain, tensile strain, environmental conditions, or combinations thereof.

* * * * *